(12) United States Patent  
Nakagawa et al.

(10) Patent No.: US 7,703,031 B2  
(45) Date of Patent: Apr. 20, 2010

(54) APPARATUS, METHOD, AND COMPUTER PROGRAM FOR CONTROLLING DISPLAY

(75) Inventors: Noriaki Nakagawa, Tokyo (JP); Hidenori Yamaji, Tokyo (JP); Katsuhiro Takematsu, Kanagawa (JP)

(73) Assignee: Sony Corporation, Tokyo (JP)

( * ) Notice: Subject to any disclaimer, the term of this patent is extended or adjusted under 35 U.S.C. 154(b) by 408 days.

(21) Appl. No.: 11/695,790

(22) Filed: Apr. 3, 2007

(65) Prior Publication Data

US 2008/0282195 A1 Nov. 13, 2008

(30) Foreign Application Priority Data

Apr. 10, 2006 (JP) .............. 2006-107703

(51) Int. Cl.
  *G06F 13/00* (2006.01)
  *G06F 15/00* (2006.01)

(52) U.S. Cl. ..................... 715/765; 715/700

(58) Field of Classification Search ......... 715/763–765, 715/700, 761, 851–853; 348/333.01
  See application file for complete search history.

(56) References Cited

U.S. PATENT DOCUMENTS

2002/0030634 A1* 3/2002 Noda et al. ............... 345/5

2006/0177214 A1* 8/2006 Ozawa ..................... 396/374
2006/0250419 A1* 11/2006 Shiba et al. ............... 345/619

FOREIGN PATENT DOCUMENTS

JP  2003-92719  3/2003

* cited by examiner

*Primary Examiner*—Cao (Kevin) Nguyen
(74) *Attorney, Agent, or Firm*—Oblon, Spivak, McClelland, Maier & Neustadt, L.L.P.

(57) ABSTRACT

A display control apparatus includes a first display control unit for controlling displaying a first representative image in a first folder on a first area of a display screen with first content recorded on a recording medium thereof belonging to the first folder, a second display control unit for controlling displaying a second representative image in a second folder on a second area of the display screen with second content supplied from a partner apparatus connected thereto via a network and belonging to the second folder, and a third display control unit for controlling displaying, on a third area of the display screen, a thumbnail image of one of the first content and the second content corresponding to one of the first folder and the second folder selected using one of the first representative image and the second representative image.

11 Claims, 50 Drawing Sheets

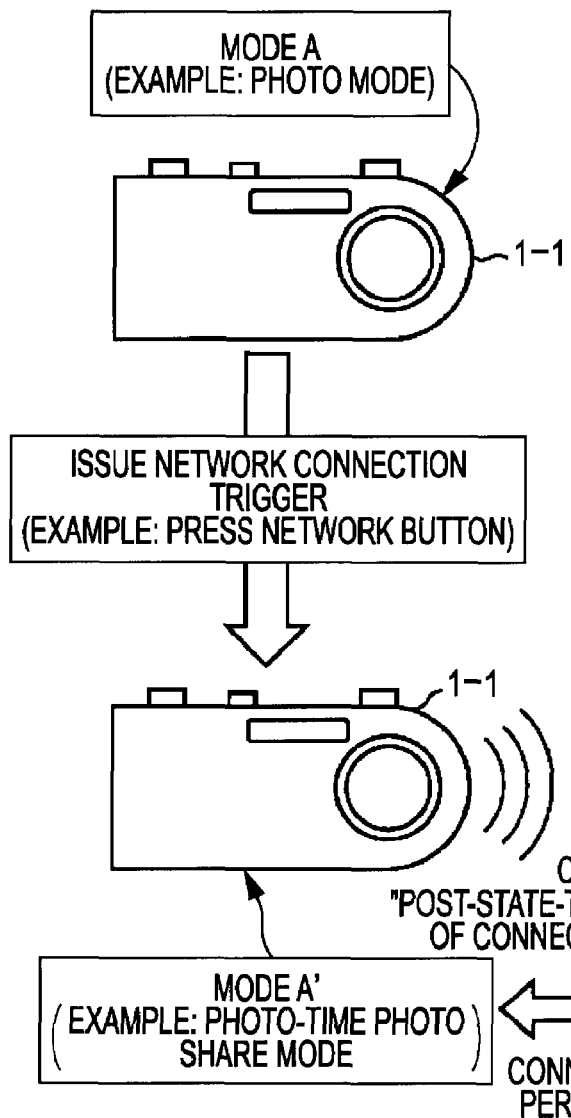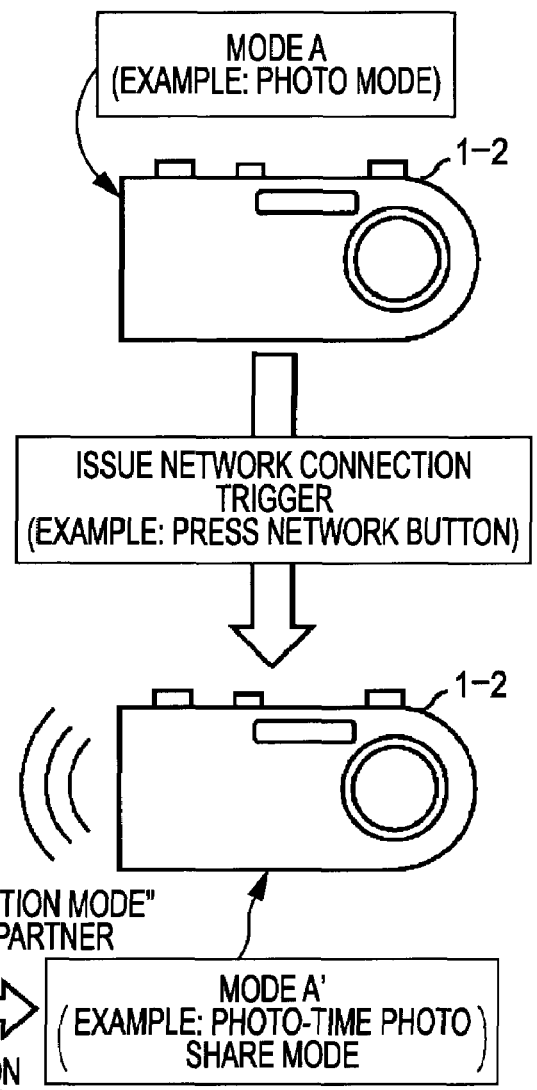

FIG. 10A
FIG. 10B
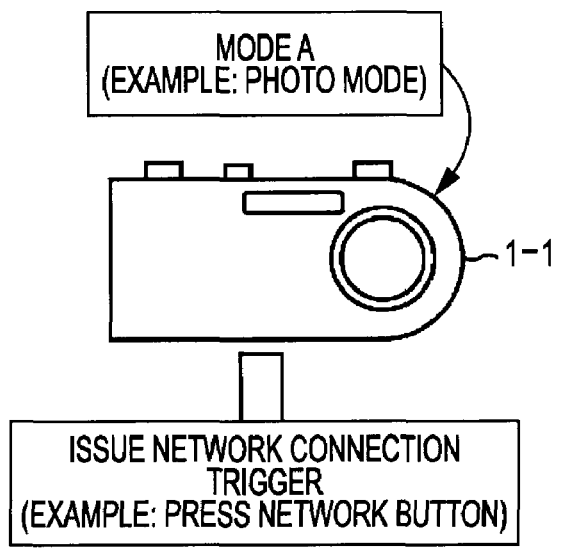
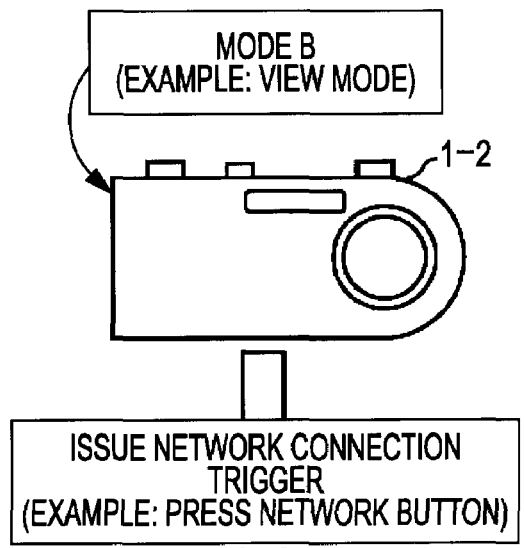
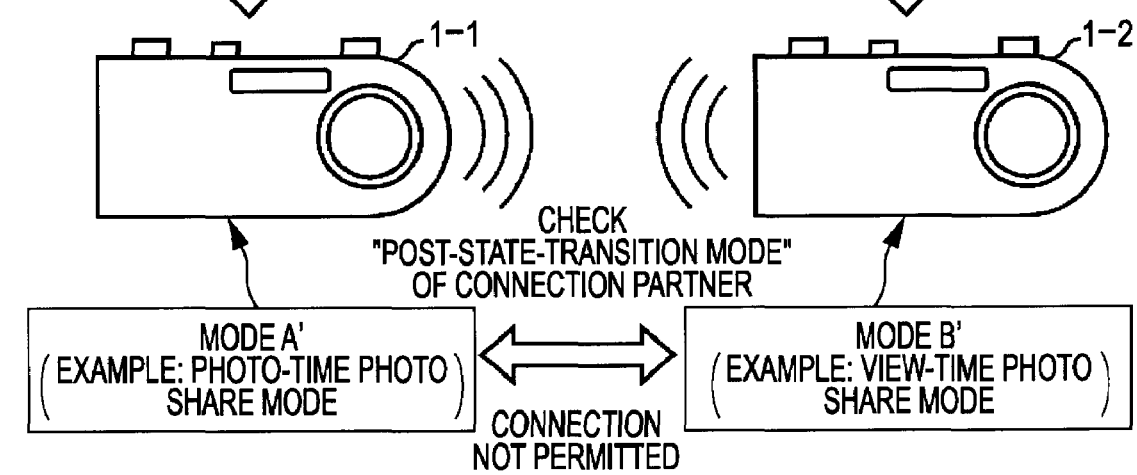

FIG. 18

| CONTENTS ID | |
|---|---|
| "00000001" | thumbnailPath path="xxxxx/xxxxx/xxxxxxxxxx.jpg"<br>originalPath path="xxxxxx/xxxxxx/xxxxxxxxxx.jpg"<br>imagetype id="large, 1024×768, JPEG" |
| "00000002" | thumbnailPath path="yyyyy/yyyyy/yyyyyyyyyy.jpg"<br>originalPath path="yyyyyy/yyyyyy/yyyyyyyyyyy.jpg"<br>imagetype id="small, 320×240, JPEG" |
| "00000003" | thumbnailPath path="zzzzz/zzzzz/zzzzzzzzzz.jpg"<br>originalPath path="zzzzzz/zzzzzz/zzzzzzzzzzz.jpg"<br>imagetype id="middle, 640×480, JPEG" |
| ... | |

FIG. 32

| GROUP ID | GROUP NAME | CONTENTS ID | CONTENTS |
|---|---|---|---|
| 0001 | "XXXXXXXXX" | 00001 | image type "xxxxxxxx"<br>thumbnailPath path="xxxxx/xxxxxx/xxxxxxx"<br>originalPath path="xxxxxxx/xxxxxxx/xxxxxxxx" |
|  |  | 00002 | image type "yyyyyyy"<br>thumbnailPath path="yyyyy/yyyyyyy/yyyyyyyy"<br>originalPath path="yyyyyyy/yyyyyyy/yyyyyyyyy" |
|  |  | 00003 | image type "zzzzzzz"<br>thumbnailPath path="zzzzz/zzzzzz/zzzzzzz"<br>originalPath path="zzzzzzz/zzzzzz/zzzzzzz" |
| 0002 | "AAAAAAAAA" | 00001 | image type "xxxxxxx"<br>thumbnailPath path="xxxxx/xxxxxx/xxxxxxx"<br>originalPath path="xxxxxxx/xxxxxxx/xxxxxxxx" |

FIG. 37
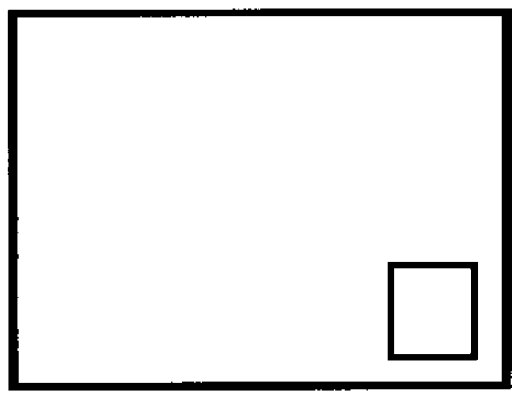
UNCHECKED
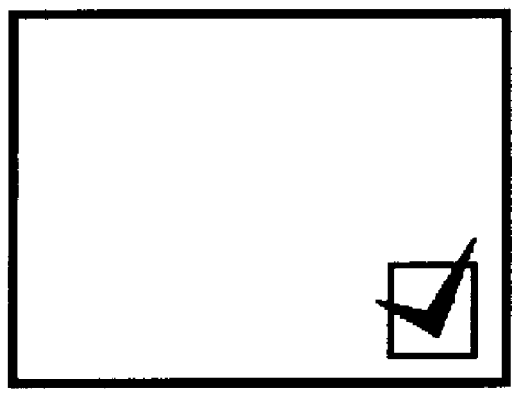
DISCLOSED
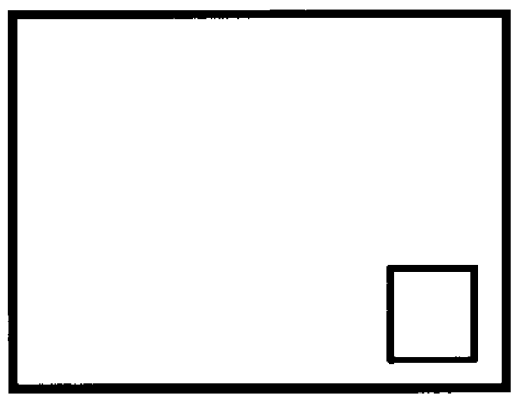
CHECK CANCELED

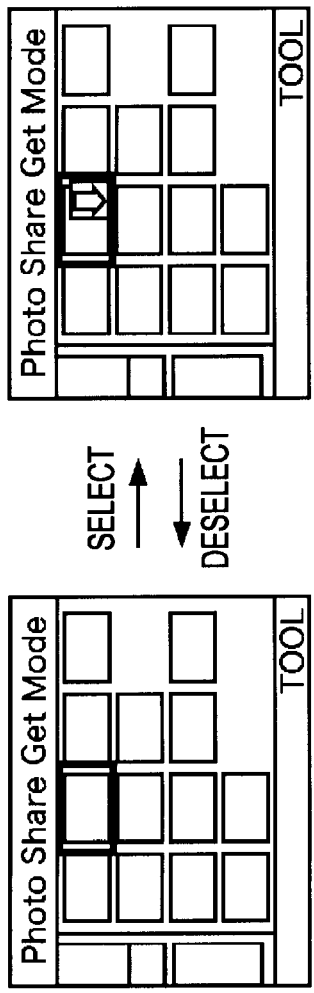
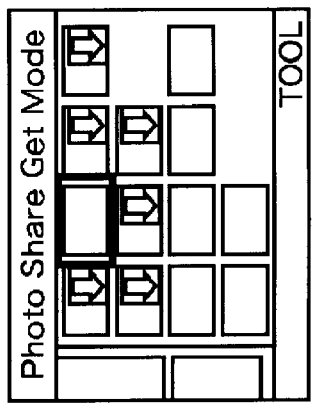
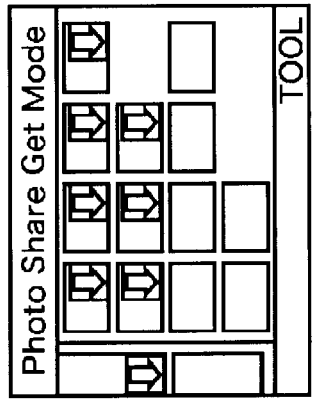
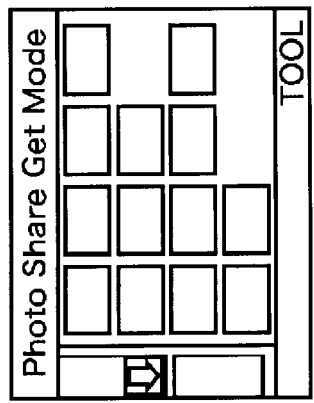
FIG. 40A
FIG. 40B
FIG. 40C
FIG. 40D
FIG. 40E
SELECT / DESELECT
TO FOLDER SELECTION
SELECT ON A PER FOLDER BASIS SUBSEQUENT TO IMAGE SELECTION
SELECT ON A PER FOLDER BASIS
SELECT / DESELECT
DESELECT ON AN INDIVIDUAL BASIS WHEN FOLDERS ARE CHECKED INDIVIDUALLY

APPARATUS, METHOD, AND COMPUTER PROGRAM FOR CONTROLLING DISPLAY

CROSS REFERENCES TO RELATED APPLICATIONS

The present invention contains subject matter related to Japanese Patent Application JP 2006-107703 filed in the Japanese Patent Office on Apr. 10, 2006, the entire contents of which are incorporated herein by reference.

BACKGROUND OF THE INVENTION

1. Field of the Invention

The present invention relates to an apparatus, method and computer program for display control and, in particular, to an apparatus, method, and computer program for controlling displaying content.

2. Description of the Related Art

Digital cameras for taking a picture are in widespread use.

Japanese Unexamined Patent Application Publication No. 2003-92719 discloses a digital camera that receives, without using a personal computer, only video data desired by a user out of video data of pictures taken by another digital camera and stored on an information recording medium therewithin.

SUMMARY OF THE INVENTION

One camera needs a video share function to exchange images with another digital camera. The video share function needs to present switchably two types of screen. The two types of screens include one type of screen on which an image to be supplied to a partner digital camera is selected from images on own apparatus and the other type of screen on which an image to be acquired from images on the partner digital camera is selected.

In a first operation, a user of the digital camera selects an image to be supplied to the partner digital camera on the screen for allowing a partner user to select the image from images of own digital camera. In a second operation, the user switches to the screen for allowing the user himself to select video data to be acquired from images supplied from the partner. In a third operation, the user selects the image to be acquired from the images supplied by the partner user. Such operations are complex and inconvenient to the user.

It is thus desirable to check images supplied from the partner and select an image to be acquired without the need for complex operations.

In accordance with one embodiment of the present invention, a display control apparatus includes a first display control unit for controlling displaying a first representative image in a first folder on a first area of a display screen with first content recorded on a recording medium thereof belonging to the first folder, a second display control unit for controlling displaying a second representative image in a second folder on a second area of the display screen with second content supplied from a partner apparatus connected thereto via a network and belonging to the second folder, and a third display control unit for controlling displaying, on a third area of the display screen, a thumbnail image of one of the first content and the second content corresponding to one of the first folder and the second folder selected using one of the first representative image and the second representative image.

The third display control unit may control displaying the thumbnail image on the third area interposed between the first area and the second area.

The display control apparatus may further include a cursor display control unit for controlling displaying a cursor indicating that one of the first folder, the second folder, the first content and the second content is selected wherein the cursor is displayed with respect to one of the first representative image, the second representative image and the thumbnail image.

The cursor display control unit may control displaying the cursor so that the cursor shifts from one area to another among the first area, the second area and the third area in order for the cursor to be displayed with respect to one of the first representative image, the second representative image and the thumbnail image.

The display control apparatus may further include an outline display control unit for controlling displaying an outline surrounding the first area and the third area having the thumbnail image of the first content displayed thereon when the first representative image is selected by the cursor and controlling displaying an outline surrounding the second area and the third area having the thumbnail image of the second content displayed thereon when the second representative image is selected by the cursor.

The display control apparatus may further include a content display control unit for controlling displaying one of the first content and the second content with the thumbnail image thereof selected by the cursor.

In accordance with one embodiment of the present invention, a display control method of a display control apparatus includes steps of controlling displaying a first representative image in a first folder on a first area of a display screen with first content recorded on a recording medium thereof belonging to the first folder, controlling displaying a second representative image in a second folder on a second area of the display screen with second content supplied from a partner apparatus connected thereto via a network and belonging to the second folder, and controlling displaying, on a third area of the display screen, a thumbnail image of one of the first content and the second content corresponding to one of the first folder and the second folder selected using one of the first representative image and the second representative image.

In accordance with one embodiment of the present invention, a computer program for causing a computer to perform a display control method of a display control apparatus includes steps of controlling displaying a first representative image in a first folder on a first area of a display screen with first content recorded on a recording medium thereof belonging to the first folder, controlling displaying a second representative image in a second folder on a second area of the display screen with second content supplied from a partner apparatus connected thereto via a network and belonging to the second folder, and controlling displaying, on a third area of the display screen, a thumbnail image of one of the first content and the second content corresponding to one of the first folder and the second folder selected using one of the first representative image and the second representative image.

In accordance with embodiments of the present invention, the displaying of the first representative image in the first folder on the first area of the display screen is controlled with the first content recorded on the recording medium belonging to the first folder. The displaying of the second representative image in the second folder on the second area of the display screen is controlled with the second content supplied from a partner apparatus connected thereto via the network and belonging to the second folder. The displaying of the thumbnail image of one of the first content and the second content on the third area of the display screen is controlled, with the first content and second content corresponding to one of the first folder and the second folder selected using one of the first representative image and the second representative image.

In accordance with embodiments of the present invention, a desired image can be acquired from the partner apparatus.

In accordance with embodiments of the present invention, images supplied from the partner apparatus are easily checked and an image to be acquired is selected easily without the need for complex operations.

BRIEF DESCRIPTION OF THE DRAWINGS

FIGS. 9A and 9B illustrate a determination process of a mode of a connection partner;

FIGS. 10A and 10B illustrate a determination process of a mode of the connection partner;

FIG. 18 illustrates an example of a photo-time disclosure list;

FIG. 32 illustrates an example of the view-time disclosure list;

FIG. 37 illustrates how a check box of the thumbnail image is checked in the image disclosure mode;

FIGS. 40A-40E illustrate a link selection of thumbnail images;

DESCRIPTION OF THE PREFERRED EMBODIMENTS

Figure 1:
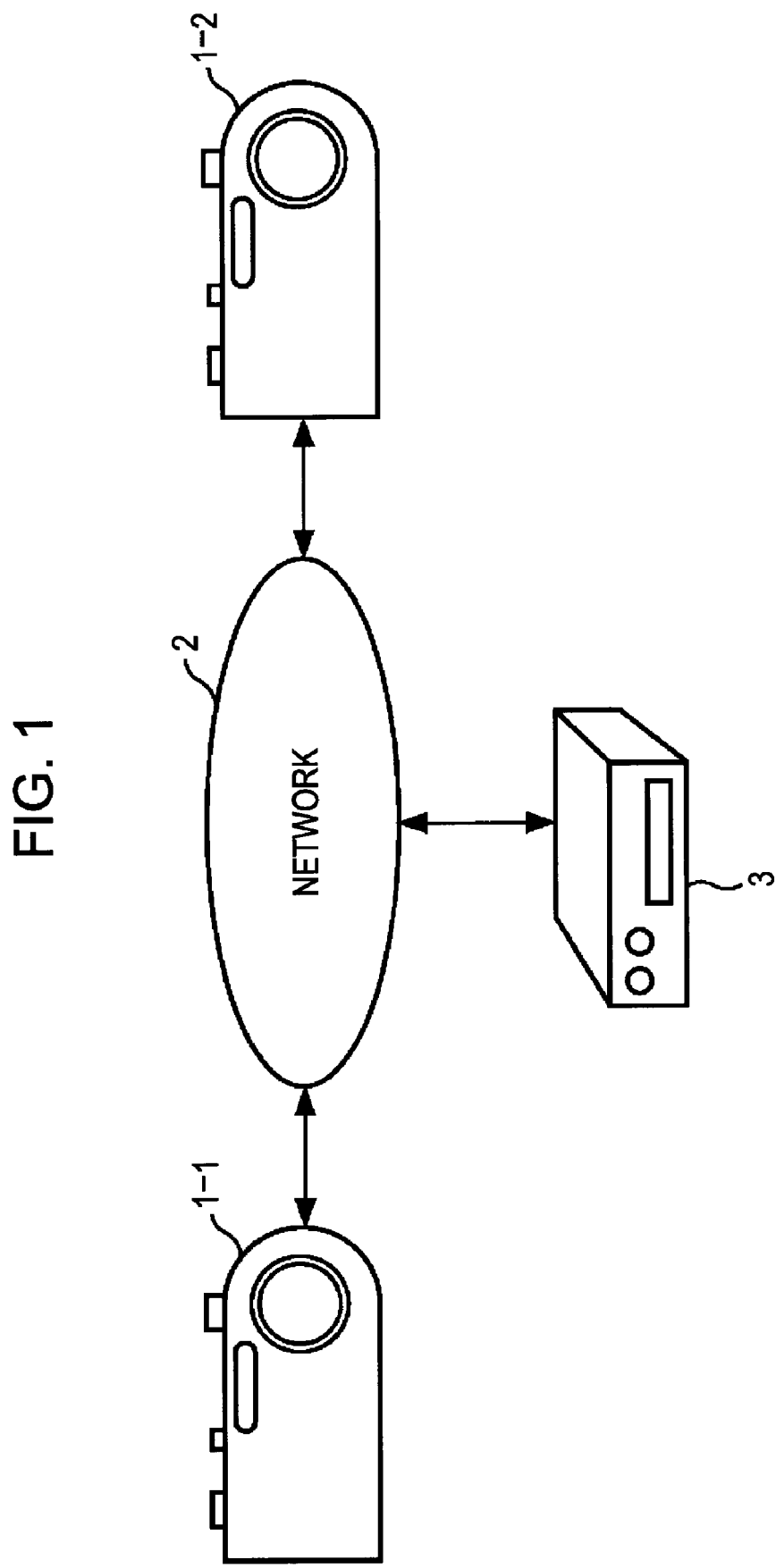
FIG. 1 illustrates a configuration of a communication system in accordance with one embodiment of the present invention.

Before describing an embodiment of the present invention, the correspondence between the features of the invention and the specific elements disclosed in an embodiment of the present invention is discussed below. This paragraph is intended to assure that embodiments supporting the claimed invention are described in this specification or the drawings. Thus, even if an element is described in the following embodiments or the drawings but not described as relating to a certain feature of the present invention, that does not necessarily mean that the element does not relate to that feature of the invention. Conversely, even if an element is described herein as relating to a certain feature of the invention, that does not necessarily mean that the element does not relate to other features of the invention.

In accordance with one embodiment of the present invention, a display control apparatus includes a first display control unit (for example, local folder area display controller 451 of FIG. 42) for controlling displaying a first representative image in a first folder on a first area of a display screen with first content recorded on a recording medium thereof belonging to the first folder, a second display control unit (for example, public folder area display controller 452 of FIG. 42) for controlling displaying a second representative image in a second folder on a second area of the display screen with second content supplied from a partner apparatus connected thereto via a network and belonging to the second folder, and a third display control unit (for example, thumbnail list area display controller 453 of FIG. 42) for controlling displaying, on a third area of the display screen, a thumbnail image of one of the first content and the second content corresponding to one of the first folder and the second folder selected using one of the first representative image and the second representative image.

The display control apparatus may further include a cursor display control unit (for example, cursor display controller 454 of FIG. 42) for controlling displaying a cursor indicating that one of the first folder, the second folder, the first content and the second content is selected wherein the cursor is displayed with respect to one of the first representative image, the second representative image and the thumbnail image.

The display control apparatus may further include an outline display control unit (for example, outline display controller 455 of FIG. 42) for controlling displaying an outline surrounding the first area and the third area having the thumbnail image of the first content displayed thereon when the first representative image is selected by the cursor and controlling displaying an outline surrounding the second area and the third area having the thumbnail image of the second content displayed thereon when the second representative image is selected by the cursor.

Figure 42:
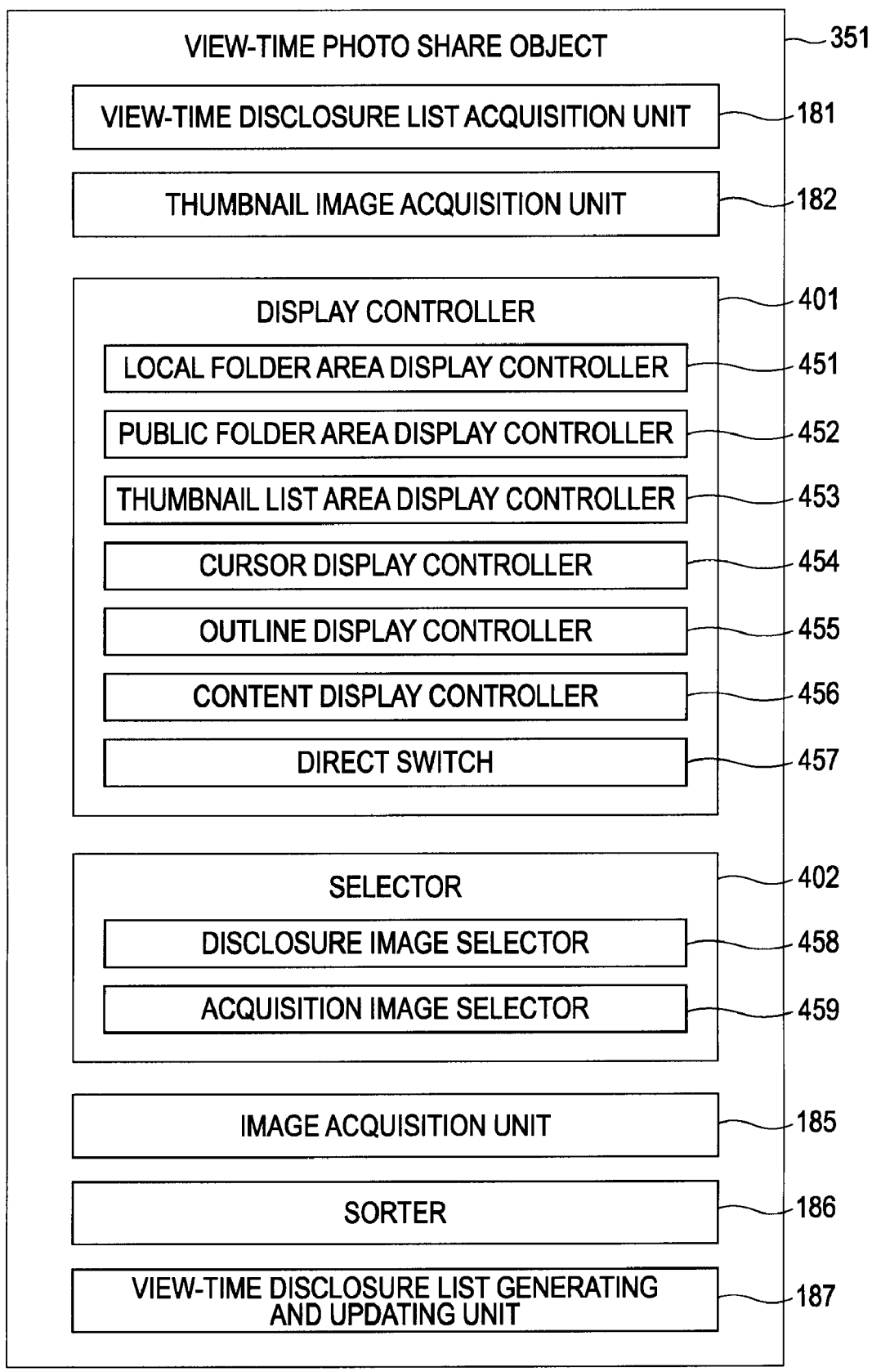
FIG. 42 is a block diagram of a view-time photo share object forming an application program.

The display control apparatus may further include a content display control unit content display controller 456 of FIG. 42) for controlling displaying one of the first content and the second content with the thumbnail image thereof selected by the cursor.

Figure 43:
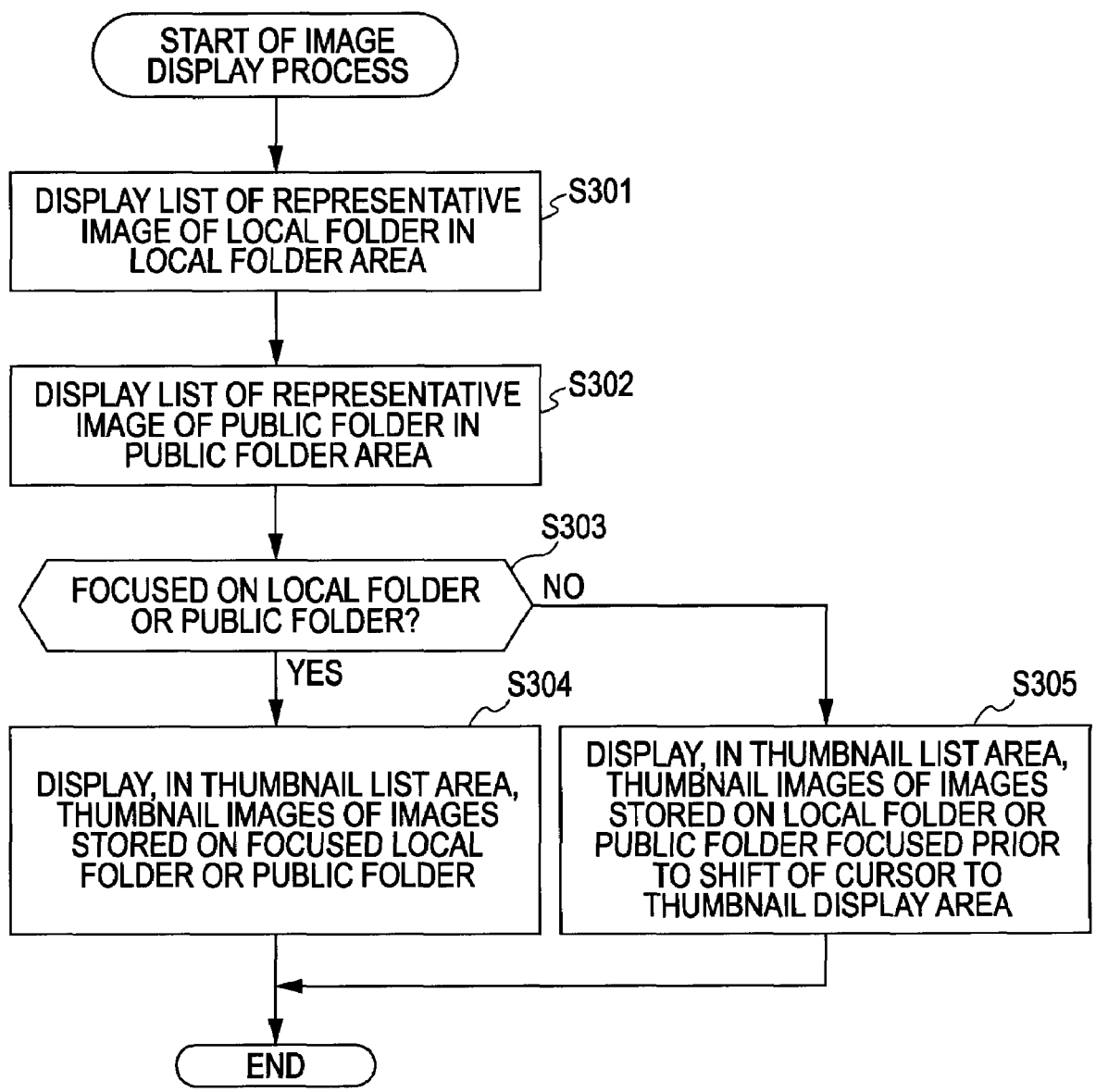
FIG. 43 is a flowchart illustrating an image display process.

In accordance with one embodiment of the present invention, one of a display control method and a computer program of a display control apparatus includes steps of controlling displaying a first representative image in a first folder on a first area of a display screen with first content recorded on a recording medium thereof belonging to the first folder (for example, in step S301 of FIG. 43), controlling displaying a second representative image in a second folder on a second area of the display screen with second content supplied from a partner apparatus connected thereto via a network and belonging to the second folder (for example, in step S302 of FIG. 43), and controlling displaying, on a third area of the display screen, a thumbnail image of one of the first content and the second content corresponding to one of the first folder and the second folder selected using one of the first representative image and the second representative image (for example, in one of steps S304 and S305 of FIG. 43).

FIG. 1 illustrates a communication system in accordance with one embodiment of the present invention. The communication system includes digital cameras 1-1 and 1-2, a network 2, and a printer 3.

The digital camera 1-1 photographs a subject. The digital camera 1-1 supplies to the digital camera 1-2 via the network 2 an image (video data) obtained as a result of photographing the subject. The digital camera 1-1 supplies the images (video data) stored therewithin to the digital camera 1-2 via the network 2.

The digital camera 1-2 photographs a subject. The digital camera 1-2 supplies to the digital camera 1-1 via a network 2 an image (video data) obtained as a result of photographing the subject. The digital camera 1-2 supplies the images (video data) stored therewithin to the digital camera 1-1 via the network 2.

One of the digital cameras 1-1 and 1-2 also photographs a subject as a still image or a moving image.

The network 2 includes a network including a wired medium complying with Universal Serial Bus (USB) or Institute of Electrical and Electronic Engineers (IEEE) 1394 Standard or a network including a wireless medium complying with IEEE802.11a, IEEE802.11b, or Bluetooth Standard. The network 2 interconnects the digital cameras 1-1 and 1-2. The digital cameras 1-1 and 1-2 and the printer 3 are mutually interconnected with each other according to the protocol defined by the Digital Living Network Alliance (DLNA) Standard.

The printer 3 prints out an image transmitted from one of the digital cameras 1-1 and 1-2.

Each of the digital cameras 1-1 and 1-2 is hereinafter referred to as digital camera 1 if there is no need for discriminating between the digital cameras 1-1 and 1-2.

Figure 2:
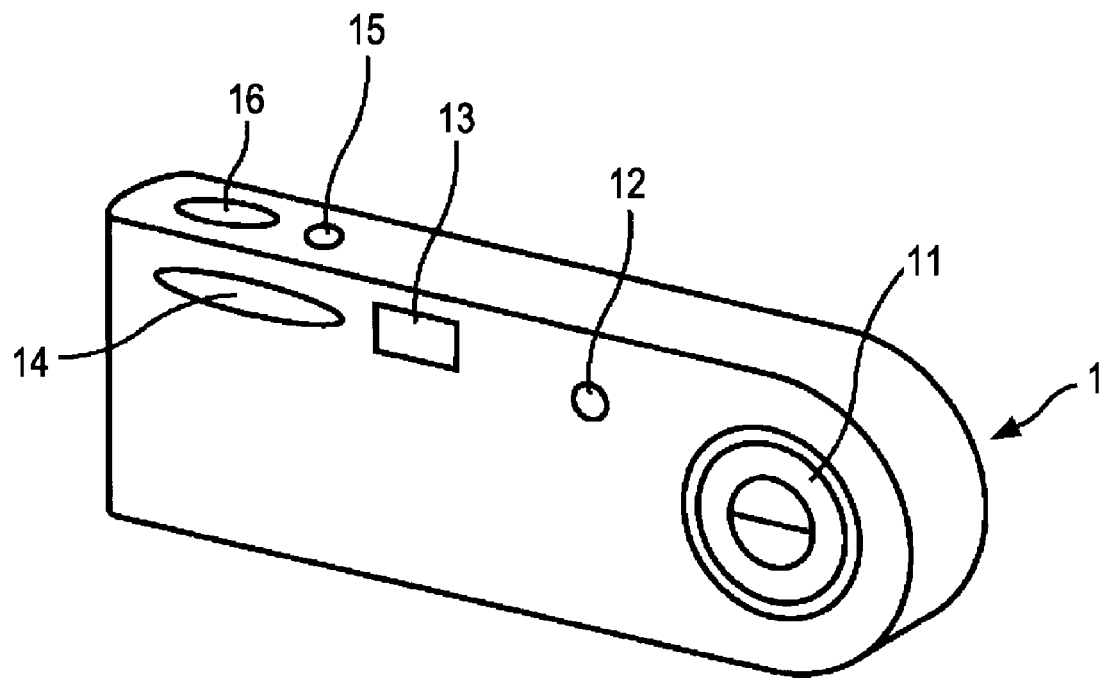
FIG. 2 is a perspective view of a digital camera.
Figure 3:
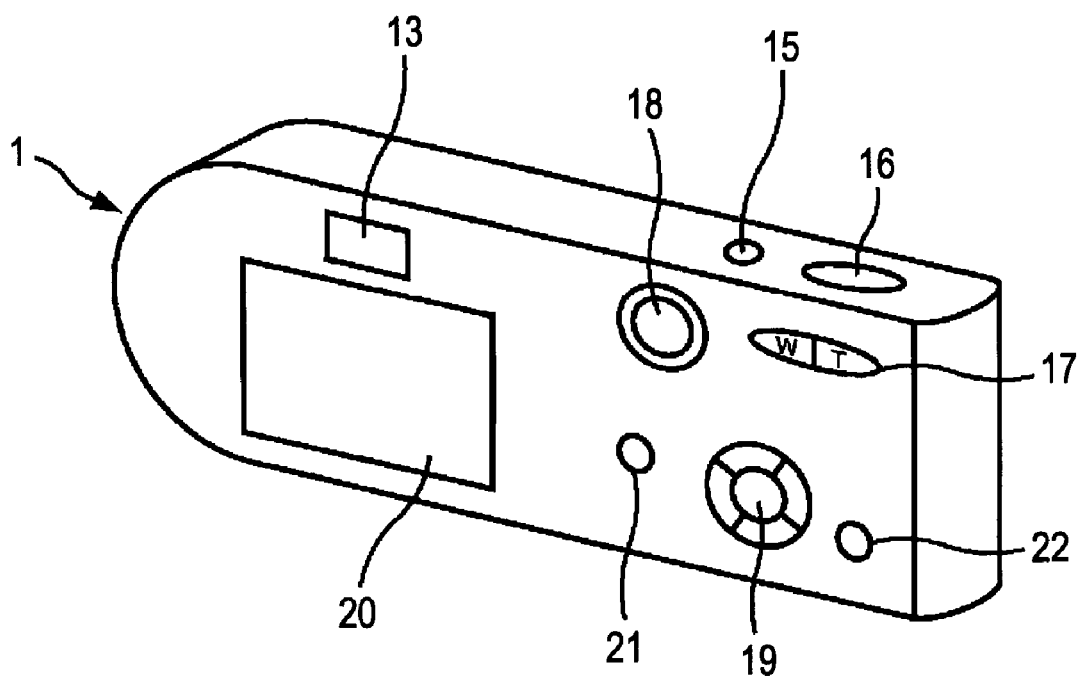
FIG. 3 is a perspective view of the digital camera.

FIGS. 2 and 3 are perspective views of the digital camera 1.

FIG. 2 shows the front side (the lens side facing the subject) of the digital camera 1 and FIG. 3 shows the rear side (the panel side facing a user of the digital camera 1) of the digital camera 1.

A lens unit 11 is arranged on the right front portion of the digital camera 1 as shown in FIG. 1. The lens unit 11 includes an optical system including a focus lens (not shown) for focusing light from a subject and a stop (not shown). When the digital camera 1 is powered on, the lens unit 11 is protruded from the body of the digital camera 1. When the digital camera 1 is powered off, the lens unit 11 is retracted back into the body of the digital camera 1. As shown in FIG. 2, the lens unit 11 remains retracted in the body of the digital camera 1.

An auto focus (AF) assistant flash 12 is arranged on the front center portion of the digital camera 1. The AF assistant flash 12 directs light as AF assistant light along an optical axis of the optical system of the lens unit 11, thereby illuminating the subject. For example, even in a dark place, the digital camera 1 captures an image of a subject, and then focuses on the subject. This function is called auto focusing function.

A viewfinder 13 is arranged on the upper center front portion of the digital camera 1. The viewfinder 13 extends to the rear side of the digital camera 1. Speed light 14 is arranged to the left of the viewfinder 13. The speed light 14 flashes light when the subject is photographed.

Arranged on the top left portion, if viewed from the front, are a power button 15 to be operated to power on and off the digital camera 1, and a shutter button (release button) 16 to be operated to photograph the subject (to record an image captured).

Arranged on the upper left rear portion of the digital camera 1 (FIG. 3) is a zoom button 17 that is used to adjust a zoom ratio. A mode dial 18 is arranged to the left of the zoom button 17. Operation buttons 19 are arranged below the zoom button 17. The mode dial 18 is used to select a mode from among a photo mode, a view mode, and a print mode. In the photo mode, the subject is photographed. In the view mode, the image of the subject photographed is displayed on a liquid-crystal display (LCD) 20. In the print mode, the image is printed. The operation buttons 19 include a direction button, an enter button, etc., and are operated to move a cursor that selects an item on a menu screen displayed on the LCD 20 or to enter an selected item.

The LCD 20 displays a variety of images.

A network button 21 is pressed to connect to the network 2. An option button 22 is pressed to display an option menu screen on the LCD 20.

Figure 4:
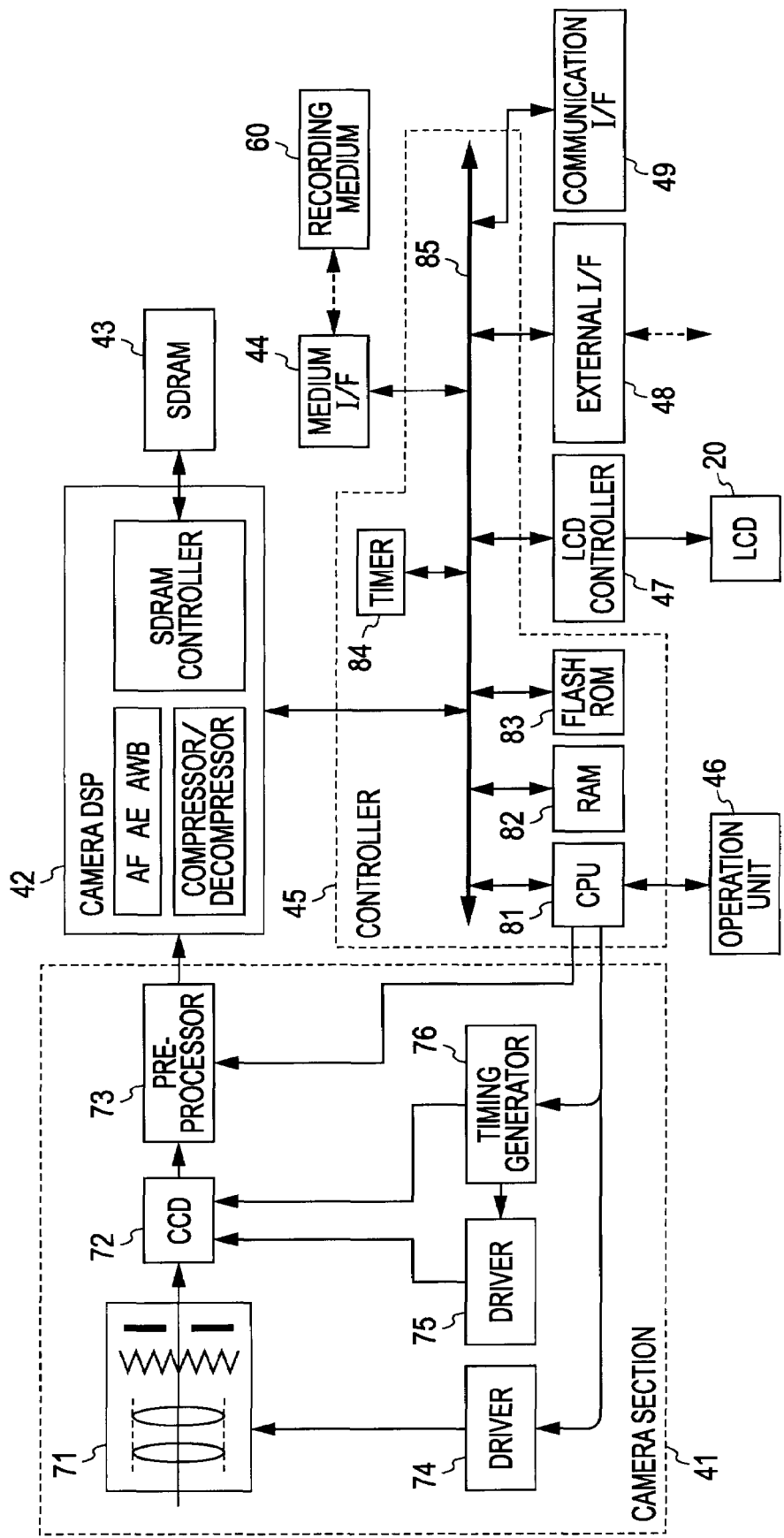
FIG. 4 is a block diagram of the digital camera.

FIG. 4 is a block diagram of the digital camera 1. As shown in FIG. 4, the digital camera 1 of this embodiment of the present invention includes a camera section 41, a camera digital signal processor (DSP) 42, a synchronous dynamic random access memory (SDRAM) 43, a medium interface (hereinafter referred to as I/F) 44, a controller 45, an operation unit 46, an LCD controller 47, the LCD 20, an external I/F 48, and a communication I/F 49. A recording medium 60 is removably loaded on the digital camera 1.

The recording medium 60 may be any of a variety of memory devices including a memory card such as a semiconductor memory, an optical memory device such as a recordable digital versatile disk (DVD), or a recordable compact disk (CD), or a magnetic disk. In one embodiment, the recording medium 60 is a memory card containing one of a semiconductor memory and a hard disk drive.

As shown in FIG. 4, the camera section 41 includes an optical block 71, a charge-coupled device (CCD) 72, a pre-processor 73, an optical-block driver 74, a CCD driver 75, and a timing generator 76. The optical block 71 includes a lens, a focusing mechanism, a shutter mechanism, a stop (iris) mechanism, etc. The optical block 71 includes the lens unit 11.

The controller 45 includes a central processing unit (CPU) 81, a random-access memory (RAM) 82, a flash read-only memory (ROM) 83, and a timer 84 with all these elements interconnected via a system bus 85. The controller 45 may be composed of a general-purpose built-in microcomputer or a dedicated system large scale integrated circuit (LSI). The controller 45 controls each element in the digital camera 1.

The RAM 82 operates as a working area for temporarily storing temporary results in the middle of each process. The flash ROM 83 stores a variety of programs to be performed by the CPU 81 and data required in each process. The timer 84 provides not only current date and month, day of the week, and present time but also photo date and time.

At photo time of images, the optical-block driver 74 under the control of the controller 45 generates a drive signal for operating the optical block 71 and then supplies the drive signal to the optical block 71 for operation. In response to the drive signal from the optical-block driver 74, the optical block 71 controls the focusing mechanism, the shutter mechanism, and the iris mechanism thereof. The optical block 71 captures an optical image of a subject, and causes the image to be focused on the CCD 72.

The CCD 72 photoelectrically converts the optical image into an electrical signal of the image. More specifically, the CCD 72 captures the optical image of the subject from the optical block 71 in response to the drive signal from the CCD driver 75, and supplies to the pre-processor 73 the image (video information) of the subject in the form of the electrical signal that is captured at a timing signal from the timing generator 76 under the control of the controller 45.

A photoelectrical conversion device such as a complementary metal-oxide semiconductor (CMOS) sensor may be substituted for the CCD 72.

The timing generator 76 under the control of the controller 45 generates the timing signal at a predetermined timing. The CCD driver 75 generates and supplies the drive signal to the CCD 72 in response to the timing signal from the timing generator 76.

The pre-processor 73 performs a correlated double sampling (CDS) process on the video information supplied in the form of the electrical signal from the CCD 72 to maintain a good signal-to-noise (S/N) ratio. The pre-processor 73 also performs an automatic gain control (AGC) process on the electrical signal to control gain. The pre-processor 73 also performs an analog-to-digital (A/D) conversion process on the electrical signal, thereby generating video data as a digital signal.

The video data in the form of the digital signal is supplied from the pre-processor 73 to the camera DSP 42. The camera DSP 42 performs, on the video data, camera signal processes such as an auto focus (AF) process, an auto exposure (AE) process, and an auto white balancing (AWB) process. The video data having undergone these processes is encoded in accordance with one of encoding schemes including Joint Photographic Experts Group (JPEG) and JPEG 2000. The resulting data is then supplied to the recording medium 60 loaded on the digital camera 1 of this embodiment via the system bus 85 and the medium I/F 44. A video data group may be encoded in accordance with Motion Picture Experts Group (MPEG) into a moving image file to be recorded on the recording medium 60.

When a user enters an operation input on the operation unit 46 using a touchpanel or a control key, any desired video data recorded on the recording medium 60 is read from the recording medium 60 via the medium I/F 44 and then supplied to the camera DSP 42. The operation unit 46 includes the zoom button 17, the mode dial 18, the operation buttons 19, the network button 21, and the option button 22.

The camera DSP 42 decodes the encoded video data read from the recording medium 60 and supplied via the medium I/F 44, and supplies the decoded video data to the LCD controller 47 via the system bus 85. The LCD controller 47 generates from the video data a video signal to be supplied to the LCD 20, and then supplies the video signal to the LCD 20. In this way, the video data recorded on the recording medium 60 is displayed on a display screen of the LCD 20.

The digital camera 1 of this embodiment includes an external I/F 48. The digital camera 1 is connected to an external personal computer via the external I/F 48. Upon receiving the video data from the personal computer, the digital camera 1 records the video data on the recording medium 60 loaded thereon and supplies the video data stored on the recording medium 60 to the external personal computer.

The communication I/F 49, composed of a network interface card (NIC), is connected to the network 2 and acquires a variety of video data and other information via the network 2.

As previously discussed, the digital camera 1 reads the video data acquired from the external personal computer via the network and recorded on a recording medium, and then reproduces and displays the video data on the LCD 20 for users.

The communication I/F 49 may be a wired interface complying with Universal Serial Bus (USB) or Institute of Electrical and Electronic Engineers (IEEE) 1394 Standard or a wireless interface using light or radio wave and complying with IEEE802.11a, IEEE802.11b, or Bluetooth Standard. The communication I/F 49 may be a wired interface or a wireless interface.

For example, the communication I/F 49 is a wireless LAN interface complying with IEEE802.11a, IEEE802.11b, or IEEE802.11g Standard.

Figure 5:
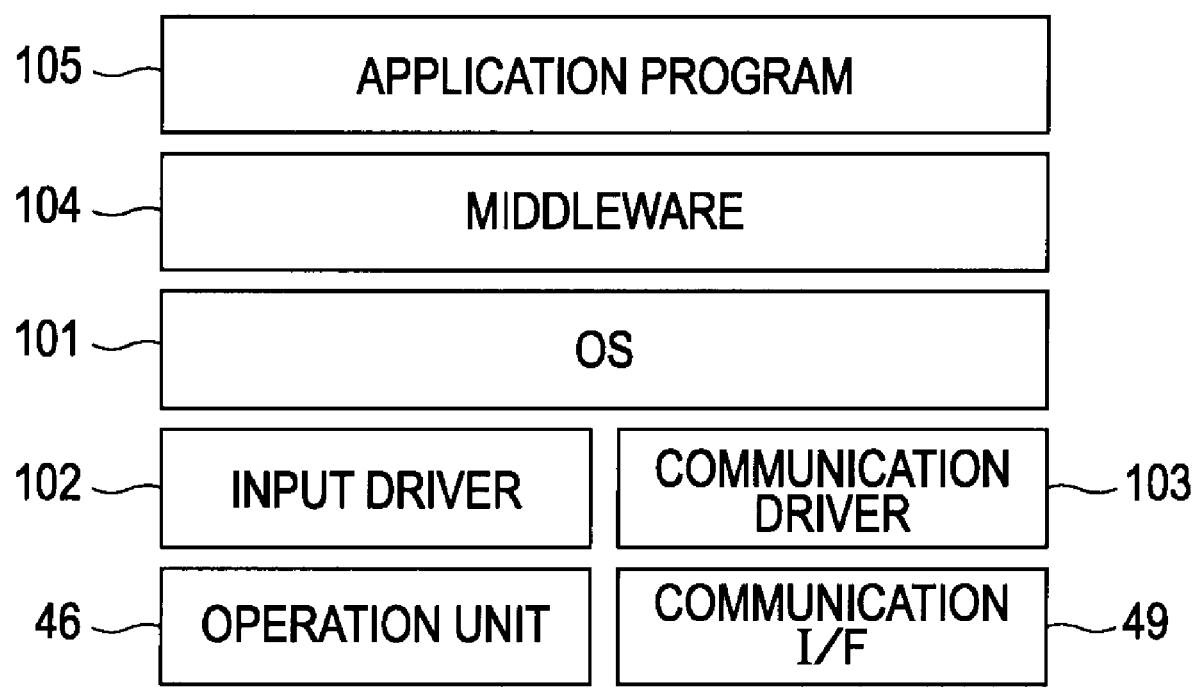
FIG. 5 illustrates a program executed by a central processing unit (CPU) of a controller of the digital camera.

FIG. 5 illustrates a program executed by the CPU 81 in the controller 45. The CPU 81 executes an operating system (OS) 101, an input driver 102, a communication driver 103, a middleware 104, and an application program 105.

The OS 101 manages the hardware of the digital camera 1 and provides a variety of interfaces. The input driver 102 controls the operation unit 46 through the OS 101, and acquires from the operation unit 46 a signal responsive to a user operation. The communication driver 103 controls the communication I/F 49 through the OS 101.

The middleware 104 runs on the OS 101 and provides the application program 105 with a function higher in level and more specific than the OS 101.

The application program 105 performs a predetermined process of the digital camera 1, including a photographing process, a view process for viewing a photographed image, and a print process.

Figure 6:
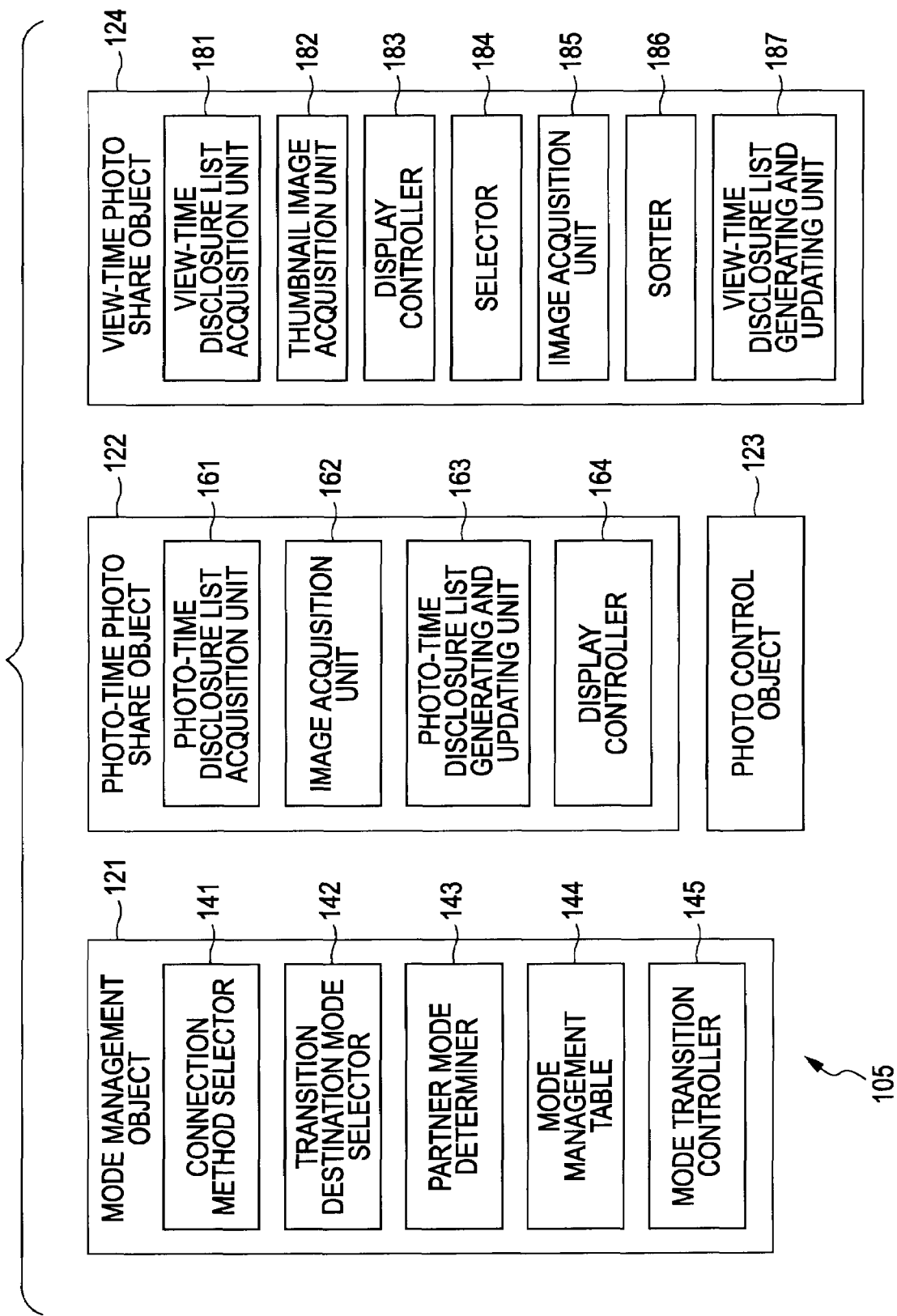
FIG. 6 is a block diagram of an application program.

FIG. 6 is a block diagram illustrating the application program 105. The application program 105 includes a mode management object 121, a photo-time photo share object 122, a photo control object 123, and a view-time photo share object 124. Each of the mode management object 121, the photo-time photo share object 122, the photo control object 123 and the view-time photo share object 124 is composed of a program and data required to execute the program.

The mode management object 121 manages the modes of the digital camera 1. More specifically, the modes include a photo mode, a view mode, a print mode, etc. and refer to a state under which each process of the digital camera 1 is determined. More specifically, the mode management object 121 controls mode transition of the digital camera 1.

The mode management object 121 includes a connection method selector 141, a transition destination mode selector 142, a partner mode determiner 143, a mode management table 144 and a mode transition controller 145.

The connection method selector 141 selects a communication method of the network 2. For example, the connection method selector 141 selects a communication method of the network 2 corresponding to a standalone process mode as a current mode. In the standalone process mode, no communications are performed with a partner apparatus via the network 2. When the communication method of the network 2 is selected, the communication driver 103 starts communication with the partner apparatus via the network 2 in accordance with the selected communication method of the network 2.

The partner apparatus is another apparatus connected to the network 2. For example, the partner apparatus may be one of the digital camera 1-2 and the printer 3 if viewed from the digital camera 1-1. The partner apparatus may be one of the digital camera 1-1 and the printer 3 if viewed from the digital camera 1-2.

The communication method of the network 2 refers to a communication method such as an adhoc mode or an infrastructure mode between the digital camera 1 and the network 2 or a communication method between the digital camera 1 and the printer 3 via the network 2. The communication method of the network 2 is hereinafter simply referred to as connection method. The adhoc mode is also referred to as adhoc connection method, and the infrastructure mode is also referred to as an infrastructure connection method.

The mode in which no communications are performed with the partner apparatus via the network 2 is hereinafter also referred to as the standalone process mode. A mode in which communications are performed with the partner apparatus via the network 2 is also referred to as a network process mode.

The transition destination mode selector 142 selects the mode of a transition destination. For example, the transition destination mode selector 142 selects a network process mode mapped to the standalone process mode as a current mode in accordance with predetermined mapping established between the standalone process mode of a plurality of modes and the network process mode of a plurality of modes through which communication is performed with the partner apparatus.

The partner mode determiner 143 determines a mode of the communication partner. For example, the partner mode determiner 143 determines whether a mode to which the communication partner is going to shift is a mode co-workable with the selected network process mode. The mode management table 144 describes a map of a predetermined standalone process mode, a communication method of the network 2, and a network process mode.

The mode transition controller 145 controls the mode transition. For example, if the mode to which the communication partner is going to shift is determined to be the mode co-workable with the selected network process mode, the mode transition controller 145 controls mode to transition to the selected network process mode.

The photo-time photo share object 122 controls transmission of an image obtained by photographing a subject to the partner apparatus via the network 2 in the photo-time photo share mode to be discussed later. The photo-time photo share object 122 also controls reception of an image obtained by photographing a subject and transmitted from the partner apparatus. The photo-time photo share object 122 includes a photo-time disclosure list acquisition unit 161, an image acquisition unit 162, a photo-time disclosure list generating and updating unit 163 and a display controller 164.

When a subject is photographed by the partner apparatus, the photo-time disclosure list acquisition unit 161 acquires from the partner apparatus via the network 2 a photo-time disclosure list made by the partner apparatus. The photo-time disclosure list includes addresses stored on the recording medium 60 that is one example of a storage medium of the partner apparatus storing the image and the thumbnail image obtained as a result of photographing. The address on the recording medium 60 may be a file path (hereinafter simply referred to as a path).

The image acquisition unit 162 acquires the photo image and the thumbnail image from the partner apparatus. The photo-time disclosure list generating and updating unit 163 generates and updates the photo-time disclosure list. For example, the photo-time disclosure list generating and updating unit 163 updates the photo-time disclosure list to add the address in the photo-time disclosure list on the recording medium 60 that has stored the photo image and the thumbnail image corresponding thereto.

The display controller 164 controls the displaying of the image photographed by own apparatus and the image captured by the partner apparatus on the LCD 20. For example, the display controller 164 displays the images photographed by own apparatus and the images photographed by the partner apparatus in the order of photographing on a single screen.

The photo control object 123 controls photographing of the subject.

The view-time photo share object 124 controls transmission of the image to the partner apparatus and reception of the image transmitted from the partner apparatus via the network 2 in the view-time photo share mode to be discussed later. The view-time photo share object 124 includes a view-time disclosure list acquisition unit 181, a thumbnail image acquisition unit 182, a display controller 183, a selector 184, an image acquisition unit 185, a sorter 186 and a view-time disclosure list generating and updating unit 187.

The view-time disclosure list acquisition unit 181 acquires view-time disclosure lists from a plurality of partner apparatuses via the network 2. The view-time disclosure list is generated by the partner apparatus that supplies the image. The view-time disclosure list includes an address in a memory space storing the image to be provided by the partner apparatus and an address in a memory space storing the thumbnail image of the image to be provided by the partner apparatus. The addresses are arranged by group according to which the partner apparatus sorts the images. For example, the sorting of the images into groups is performed by mapping a group ID identifying each group to each image. The images sorted in one group are handled as ones virtually (logically) stored on one folder mapped to that group.

The thumbnail image acquisition unit 182 acquires a thumbnail image via the network 2 from the address stored in the memory space storing the thumbnail image. The address is arranged in the view-time disclosure list acquired from the plurality of partner apparatuses.

The display controller 183 controls displaying of the thumbnail image on the LCD 20. For example, the display controller 183 displays the thumbnail images acquired from the plurality of partner apparatuses on the LCD 20 on a per group basis and on a per partner apparatus basis.

In response to a user operation, the selector 184 selects a displayed thumbnail image. For example, the selector 184 selects one thumbnail image indicated by a signal respective to the user operation input via the operation unit 46, from among the thumbnail images displayed on the LCD 20.

When a thumbnail image is selected, the image acquisition unit 185 acquires, via the network 2, an image provided by the partner apparatus in accordance with the address in the memory space storing the original image of the selected thumbnail image. The address is arranged in the view-time disclosure lists acquired from the plurality of partner apparatuses.

The sorter 186 sorts the image acquired from the partner apparatus into the group having the same group name as the group into which the partner apparatus has sorted that image. The group name is contained in the view-time disclosure list. The sorter 186 sorts the thumbnail image acquired from the partner apparatus into the group having the same group name as the group into which the partner apparatus has sorted the original image of that thumbnail image. The group name is contained in the view-time disclosure list.

The view-time disclosure list generating and updating unit 187 generates the view-time disclosure list. The view-time disclosure list includes an address in a memory space storing the image to be provided to the partner apparatus by own apparatus and an address in a memory space storing the thumbnail image of the image to be provided to the partner apparatus by own apparatus. The addresses are arranged by group according to which own apparatus sorts the images. The view-time disclosure list generating and updating unit 187 also updates the view-time disclosure list. The view-time disclosure list generating and updating unit 187 also generates the view-time disclosure list. For example, the view-time disclosure list generating and updating unit 187 generates the view-time disclosure list by arranging by image group the address in the memory space storing the image indicated by a signal responsive to the user operation from the operation unit 46, and the address in the memory space storing the thumbnail image of the image. For example, also, the view-time disclosure list generating and updating unit 187 generates the view-time disclosure list by adding to the view-time disclosure list by image group the address in the memory space storing the image indicated by a signal responsive to the user operation from the operation unit 46, and the address in the memory space storing the thumbnail image of the image.

The mode transition of the digital camera 1 is described below.

Figure 7:
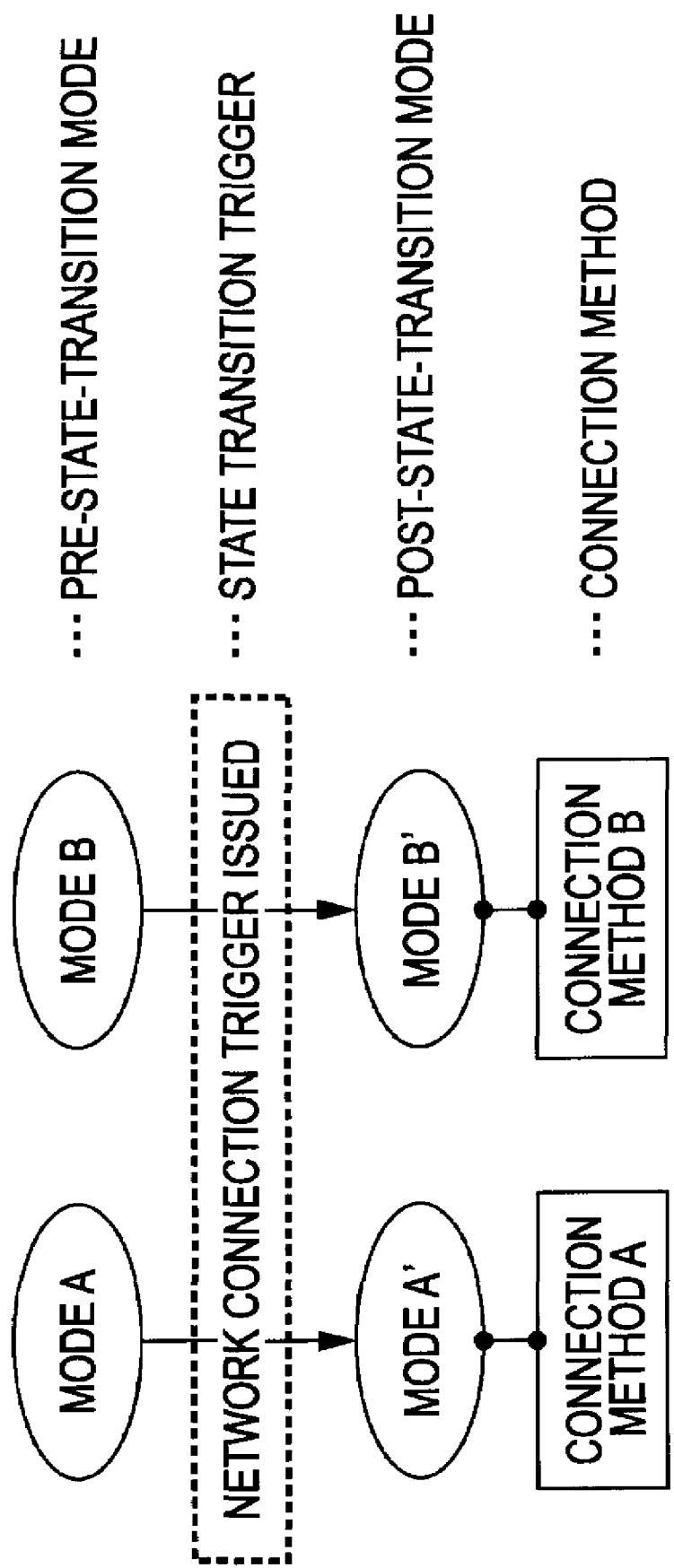
FIG. 7 illustrates a mode transition of the digital camera.

FIG. 7 illustrates a summary of the mode transition performed in the digital camera 1. The current mode of the digital camera 1 is a mode prior to mode transition. A trigger may be issued to the network 2 in a mode A (standalone process mode) in which no communications are performed with the partner apparatus. In response to the trigger as a state transition trigger, a mode A' is selected as the network process mode of the digital camera 1 for communicating with the partner apparatus via the network 2. In the mode A', a connection method A is selected from among connection methods with the network 2 and the digital camera 1 is connected to the network 2 at the connection method A.

The mode A, the mode A' and the connection method A are mapped beforehand to each other.

A pre-state-transition mode of the digital camera 1 may be a mode as the standalone process mode. When a trigger as a state-transition trigger for connecting the network 2 is issued, a mode B' is selected as the network process mode of the digital camera 1. In the mode B', a connection method B is selected from among connection methods of the network 2 and the digital camera 1 is connected to the network 2 at the connection method B.

The mode B, the mode B' and the connection mode B are mapped beforehand to each other.

When the digital camera 1 is transitioned to the network process mode as a mode using the network connection, the digital camera 1 is automatically connected to the network 2 at the correct connection method (communication method) appropriate for the mode which the digital camera 1 is transitioning to.

The standalone process mode as a mode for not communicating with the partner apparatus via the network 2 and the network process mode for communicating the partner apparatus via the network 2 are mapped to each other based on use case. A user simply issues an instruction to connect to the network 2 to perform automatically an application using the network 2 at the correct connection method. The operation is performed in an easy-to-understand manner.

Figure 8:
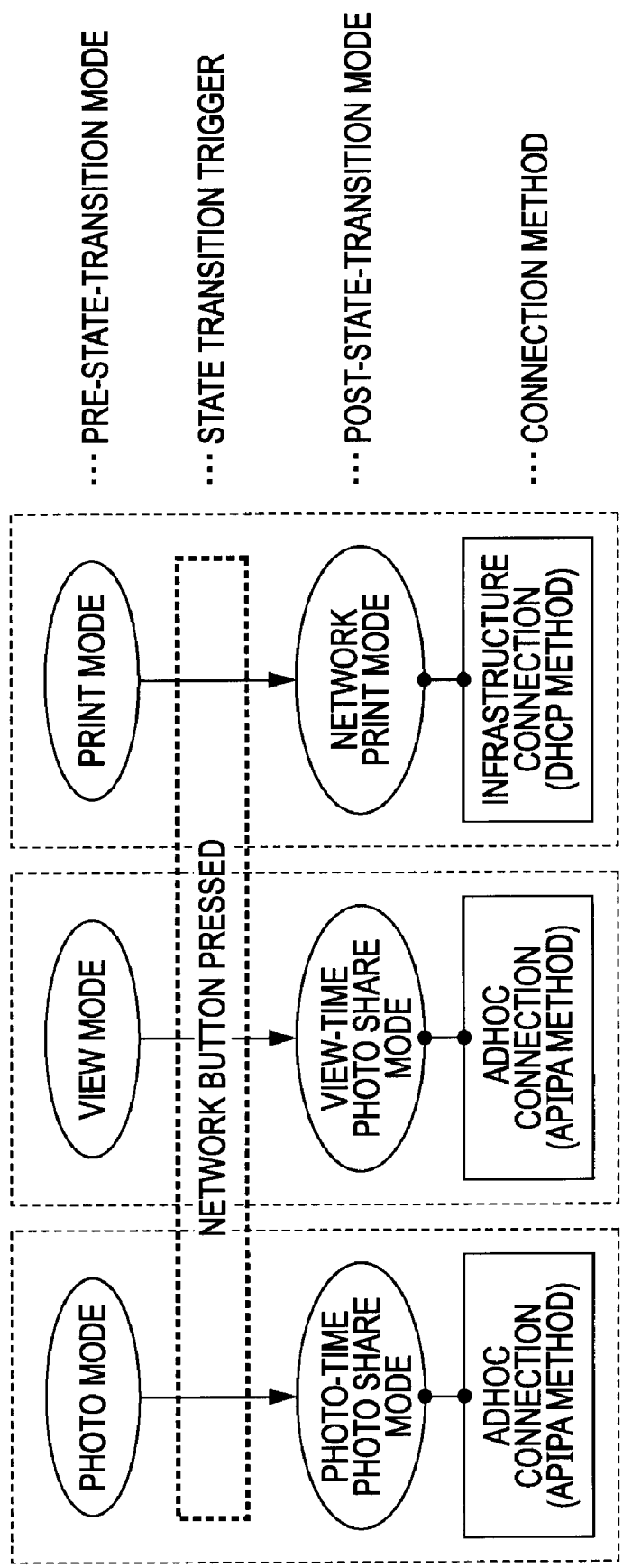
FIG. 8 illustrates a specific example of mode transition of the digital camera.

FIG. 8 specifically illustrates the mode transition of the digital camera 1. A state transition trigger for connecting with the network 2 may be issued with the digital camera 1 in the standalone process mode. In response to the state transition trigger, a photo-time photo share mode as the network process mode is selected as the mode of the digital camera 1.

In the photo mode, the digital camera 1 can photograph a subject. In the photo-time photo share mode, the digital camera 1 is in a ready state to photograph a subject while being enabled to acquire from the partner apparatus an image photographed by the partner apparatus. More specifically, in the photo-time photo share mode, the digital camera 1 photographs the subject while the photographed image is transmitted to the digital camera 1 via the network 2.

The use case of the photo mode is to photograph the subject and the use case of the photo-time photo share mode is to photograph the subject and to acquire the image photographed by the partner apparatus. The photo mode as the standalone process mode and the photo-time photo share mode as the network process mode have the use case of photographing the subject in common, and the two modes are thus mapped based on the use case.

In the photo-time photo share mode, the network 2 is used. The user may press the network button 21 to issue a trigger to connect the digital camera 1 to the network 2, thereby transitioning from the standalone process mode as the standard photo mode to the photo-time photo share mode. This operation is natural and straightforward (also easy to memorize).

As shown in FIG. 8, the standard photo mode prior to the connection to the network 2 and the photo-time photo share mode subsequent to the connection to the network 2 are associated with each other.

In the photo-time photo share mode, an adhoc connection is selected to assign an Internet Protocol (IP) address in Automatic Private IP Addressing (APIPA). The digital camera 1 is connected to the network 2 at the adhoc connection in which the IP address is assigned in the APIPA.

A subject is not always photographed where a wireless local area network (LAN) access point or a dynamic host configuration protocol (DHCP) server is installed. The adhoc connection requiring neither wireless LAN access point nor DHCP server is considered appropriate for the connection method with the network 2 in the photo-time photo share mode.

The photo-time photo share mode can thus be associated with the adhoc connection.

In this way, the photo mode, the photo-time photo share mode and the adhoc connection are mapped beforehand to each other.

A state transition trigger for connection with the network 2 may be issued with the digital camera 1 in the view mode as the standalone process mode for not communicating with the partner apparatus via the network 2. A view-time photo share mode as the network process mode is selected as the mode of the digital camera 1.

In the view mode, the digital camera 1 displays the image recorded on the recording medium 60 loaded thereon on the LCD 20. For example, the digital camera 1 displays a still image recorded on the recording medium 60 and a plurality of thumbnail images as a representative image of a moving image file. In the view-time photo share mode, the digital camera 1 displays the thumbnail image recorded on the recording medium 60 loaded thereon on the LCD 20 while also displaying the thumbnail image recorded on the recording medium 60 loaded on the partner apparatus on the LCD 20. The digital camera 1 thus acquires a desired image from the partner apparatus via the network 2 from among the original images with the thumbnail images thereof displayed. In the view-time photo share mode, the images photographed and stored on the recording medium 60 in the digital camera 1 are thus shared among a plurality of digital cameras 1.

The use case of the view mode is to view the displayed image, and the use case of the view-time photo share mode is to view the displayed image and to acquire the image recorded on the partner apparatus. The view mode as the standalone process mode and the view-time photo share mode as the network process mode have the use case of viewing the displayed image in common, and are mapped beforehand based on the use case.

In the view-time photo share mode, the network 2 is used. In the same manner as in the photo-time photo share mode, the user may press the network button 21 to issue a trigger to connect the digital camera 1 to the network 2, thereby transitioning from the standalone process mode as the standard photo mode to the view-time photo share mode. This operation is natural and straightforward (also easy to memorize).

As shown in FIG. 8, the standard photo mode prior to the connection to the network 2 and the view-time photo share mode subsequent to the connection to the network 2 are associated with each other.

In the view-time photo share mode, an adhoc connection is selected to assign an Internet Protocol (IP) address in Automatic Private IP Addressing (APIPA). The digital camera 1 is connected to the network 2 at the adhoc connection in which the IP address is assigned in the APIPA.

As in the case of photographing an image, viewing the image is not always performed where a wireless local area network (LAN) access point or a dynamic host configuration protocol (DHCP) server is installed. The adhoc connection requiring neither wireless LAN access point nor DHCP server is considered appropriate for the connection method with the network 2 in the view-time photo share mode.

The view-time photo share mode can thus be associated with the adhoc connection.

In this way, the view mode, the view-time photo share mode and the adhoc connection are mapped beforehand to each other.

A state transition trigger for connection with the network 2 may be issued with the digital camera 1 in the print mode as the standalone process mode for not communicating with the partner apparatus via the network 2. A network print mode as the network process mode is selected as the mode of the digital camera 1.

In the print mode, the digital camera 1 can print out the image recorded on the recording medium 60 on a connected printer not via the network 2. In the network print mode, the digital camera 1 can print out the image recorded on the recording medium 60 on a printer connected via the network 2. More specifically, in the network print mode, the image photographed and stored on the recording medium 60 in the digital camera 1 is printed on the printer connected to the network 2.

The use case of the print mode is to print the image, and the use case of the network print mode is to print the image. The print mode as the standalone process mode and the network print mode as the network process mode have the use case of printing the image in common, and are thus associated with each other based on the use case.

In the network print mode, the network 2 is used. The user may press the network button 21 to issue a trigger to connect the digital camera 1 to the network 2, thereby transitioning from the standalone process mode as the standard print mode to the network print mode. This operation is natural and straightforward (also easy to memorize).

As shown in FIG. 8, the print mode prior to the connection to the network 2 and the network print mode subsequent to the connection to the network 2 are associated with each other.

In the network print mode, an infrastructure connection is selected to assign an IP address in the DHCP. The digital camera 1 is connected to the network 2 at the infrastructure connection in which the IP address is assigned in the DHCP.

In the network print mode, the partner apparatus can be the printer 3 already connected to the network 2 arranged in a hot spot where a home service and a print service are available. The infrastructure connection is thus appropriate for the connection with the network 2 in the network print mode.

The network print mode and the infrastructure connection are thus associated each other.

In this way, the print mode, the network print mode and the infrastructure connection are mapped beforehand to each other.

The pre-state-transition mode and the post-state-transition mode are not limited to a combination of the photo mode and the photo-time photo share mode, a combination of the view mode and the view-time photo share mode, and a combination of the print mode and the network print mode but to any modes mapped by use case. For example, a storage mode for recording the image on the loaded recording medium 60 is combined with a network storage mode for recording the image on a storage or a personal computer connected to the network 2.

Before transitioning to the selected network print mode, it is determined whether the mode the partner apparatus is going to shift is a mode co-workable with the network process mode to which own apparatus is going to transition. If the destination mode of the partner apparatus is determined to be a mode co-workable with the network process mode as the destination mode of own apparatus, the digital camera 1 shifts to the selected network process mode.

The connection method (communication method) is not limited to the adhoc connection and the infrastructure connection. For example, the connection method may be selected from among wired communications and wireless communications including wireless LANs complying with IEEE802.11a, IEEE802.11b, or IEEE802.11g, or Bluetooth.

FIGS. 9A and 9B and 10A and 10B illustrate a process of determining whether the destination mode of the partner apparatus is co-workable with the network process mode own apparatus is going to transition to.

Referring to FIGS. 9A and 9B, the digital camera 1-1 may be in the photo mode as one example of modes A, namely, the standalone process mode in which no communications are performed with the network 2. When the network button 21 in the digital camera 1-1 is pressed, a trigger for connecting with the network 2 is issued. In response to the trigger as a state transition trigger, the digital camera 1-1 selects a photo-time photo share mode for communicating with the partner apparatus via the network 2.

On the other hand, the digital camera 1-2 may be in the photo mode as one example of modes A, namely, the standalone process mode in which no communications are performed with the network 2. When the network button 21 in the digital camera 1-2 is pressed, a trigger for connecting with the network 2 is issued. In response to the trigger as a state transition trigger, the digital camera 1-2 selects a photo-time photo share mode for communicating with the partner apparatus via the network 2.

The digital camera 1-1 determines whether the destination mode of the digital camera 1-2 as the partner apparatus is a mode co-workable with the photo-time photo share mode thereof.

The destination mode of the digital camera 1-1 is the photo-time photo share mode and the destination mode of the digital camera 1-2 is the photo-time photo share mode. In the photo-time photo share mode, a subject is photographed, and when the partner apparatus photographs a subject, own apparatus acquires via the network 2 the image photographed by the partner apparatus. The two photo-time photo share modes are co-workable with each other.

The digital camera 1-1 determines that the destination mode of the digital camera 1-2 as the partner apparatus is the co-workable mode with the photo-time photo share mode thereof, and then transitions to the photo-time photo share mode.

Similarly, the digital camera 1-2 determines that the destination mode of the digital camera 1-1 as the partner apparatus is the co-workable mode with the photo-time photo share mode thereof, and then transitions to the photo-time photo share mode.

As a result, the digital camera 1-1 and the digital camera 1-2 are connected to each other via the network 2. For example, at first, the digital camera 1-1 and the digital camera 1-2 may be in the photo mode as the standalone process mode requiring no communications with the partner apparatus. Afterward, when the network buttons 21 are pressed in the digital camera 1-1 and the digital camera 1-2 respectively, the two digital cameras are connected to each other via the network 2, and then transitioned to the photo-time photo share mode. Similarly, at first, the digital camera 1-1 and the digital camera 1-2 may be in the view mode as the standalone process mode requiring no communications with the partner apparatus. Afterward, when the network buttons 21 are pressed in the digital camera 1-1 and the digital camera 1-2 respectively, the two digital cameras are connected to each other via the network 2, and then transitioned to the view-time photo share mode.

FIGS. 10A and 10B illustrate the digital camera 1-1 and the digital camera 1-2, the two of which are not connected via the network 2.

As shown in FIGS. 10A and 10B, the digital camera 1-1 may be in the photo mode as one example of the mode A, namely, the standalone process mode. Similarly as shown in FIGS. 9A and 9B, a state transition trigger for connection with the network 2 is issued when the network button 21 in the digital camera 1-1 is pressed. In response to the state transition trigger, the digital camera 1-1 selects the photo-time photo share mode as a transition destination mode, namely the network process mode.

The digital camera 1-2 as the partner apparatus may be in the view mode as the standalone process mode A. When a state transition trigger for connection with the network 2 is issued in response to the pressing of the network button 21 in the digital camera 1-2, the digital camera 1-2 selects the view-time photo share mode as the network process mode.

The digital camera 1-1 determines whether the destination mode of the digital camera 1-2 as the partner apparatus is co-workable mode with the photo-time photo share mode thereof.

In this case, the destination mode of the digital camera 1-1 is the photo-time photo share mode and the destination mode of the digital camera 1-2 is the view-time photo share mode. In the photo-time photo share mode, the subject is photographed and when the partner apparatus photographs a subject, the image of the subject is acquired from the partner apparatus via the network 2. In the view-time photo share mode, a thumbnail image of an image recorded on the recording medium 60 in own apparatus is displayed on the LCD 20 while a thumbnail image of an image stored on the recording medium 60 in the partner apparatus is also displayed on the LCD 20. From among the original images with the thumbnail images thereof displayed, a desired image is acquired via the network 2. As a result, the photo-time photo share mode and the view-time photo share mode are not co-workable modes to each other.

The digital camera 1-1 determines that the destination mode of the digital camera 1-2 as the partner apparatus is not a co-workable mode with the photo-time photo share mode thereof, and does not transition to the photo-time photo share mode.

The digital camera 1-2 determines that the destination mode of the digital camera 1-1 as the partner apparatus is not a co-workable mode with the view-time photo share mode thereof, and does not transition to the photo-time photo share mode.

As a result, the digital camera 1-1 and the digital camera 1-2 are not connected to each other via the network 2.

Figure 11:
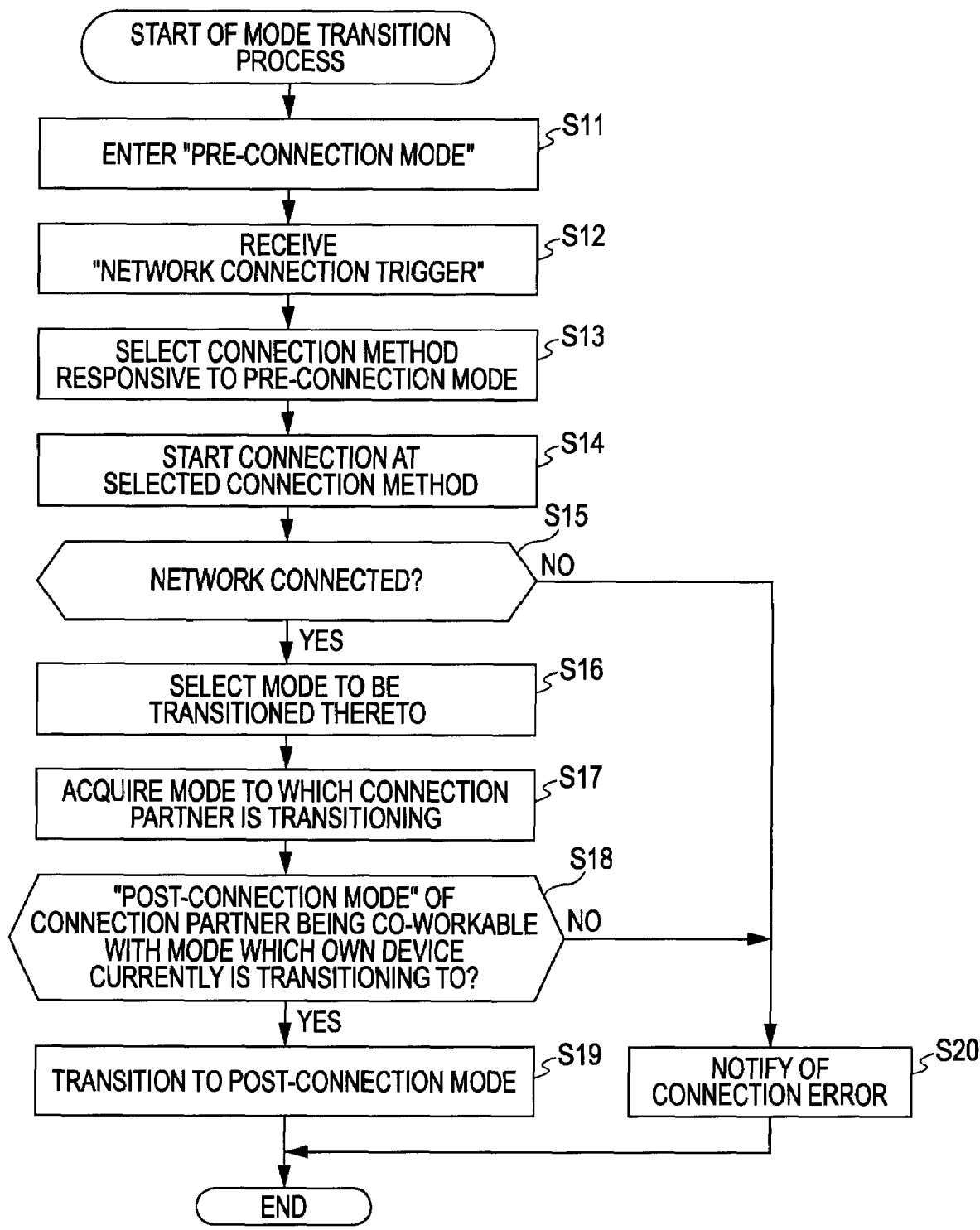
FIG. 11 is a flowchart illustrating a mode transition process.

The transition process of the digital camera 1-1 is described below with reference to a flowchart of FIG. 11. In step S11, the mode transition controller 145 in the mode management object 121 sets the digital camera 1-1 to a pre-connection mode as a standalone process mode indicated by a signal from the operation unit 46 in response to a user operation. The pre-connection modes include the photo mode, the view mode, and the print mode.

In step S12, the mode management object 121 receives a network connection trigger for connection with the network 2. For example, the network connection trigger is issued when the network button 21 in the digital camera 1-1 is pressed. The mode management object 121 receives the network connection trigger that is issued when the network button 21 is pressed by the user.

In step S13, the connection method selector 141 in the mode management object 121 selects the connection method of the network 2 in response to the pre-connection mode entered in step S11. For example, in step S13, the connection method selector 141 selects between the adhoc connection for assigning the IP address in the APIA method and the infrastructure connection for assigning the IP address in the DHCP method.

The pre-connection mode and the connection method of the network 2 are mapped beforehand. For example, the mode management table 144 stores the mapping of the standalone process mode, the communication method of the network 2, and the network process mode. In step S13, the connection method selector 141 references the mode management table 144, thereby selecting the connection method of the network 2 responsive to the pre-connection mode.

In step S14, the mode management object 121 uses the middleware 104 and the OS 101, thereby causing the communication driver 103 to start connection with the network 2 at the selected connection method. The communication driver 103 causes the communication I/F 49 to start connection with the network 2 or the partner apparatus via the network 2 at the selected connection method.

In step S15, the mode management object 121 acquires the connection status with the network 2 from the communication driver 103 via the middleware 104 and the OS 101, thereby determining whether the connection with the network 2 has been established.

If it is determined in step S15 that the connection with the network 2 has been established, processing proceeds to step S16. The transition destination mode selector 142 in the mode management object 121 selects a destination mode to which the digital camera 1-1 is going to transition subsequent to the establishment of the connection. More specifically, in step S16, the transition destination mode selector 142 selects a network communication mode to which the digital camera 1-1 is going to transition subsequent to the establishment of the connection with the network 2, in accordance with the pre-connection mode as the standalone process mode.

The pre-connection mode as the standalone process mode and the network communication mode to be transitioned to from the pre-connection mode are mapped beforehand to each other. For example, the mode management table 144 describes the predetermined mapping of the standalone process mode, the communication method of the network 2, and the network process mode. In step S15, the transition destination mode selector 142 references the mode management table 144, thereby selecting the network communication mode to be transitioned to in response to the pre-connection mode subsequent to the establishment of the connection with the network 2.

In step S17, the partner mode determiner 143 in the mode management object 121 acquires information indicating the destination mode of the digital camera 1-2 as the partner apparatus via the network 2.

More specifically, in step S17, the partner mode determiner 143 uses the middleware 104 and the OS 101, thereby causing the communication driver 103 to transmit to the digital camera 1-2 a request for information indicating the destination mode. The communication driver 103 causes the communication I/F 49 to transmit to the digital camera 1-2 the request for the information indicating the destination mode. The digital camera 1-2 transmits via the network 2 the information indicating the destination mode to which the digital camera 1-2 is going to transition. The communication driver 103 causes the communication I/F 49 to receive the information. The communication driver 103 supplies to the partner mode determiner 143 via the middleware 104 and the OS 101 the received information indicating the destination mode of the digital camera 1-2.

In step S18, the partner mode determiner 143 determines whether a post-connection mode, namely, the destination mode of the digital camera 1-2 as the partner apparatus is the co-workable mode to which own apparatus (digital camera 1-1) is going to transition.

For example, if the destination mode of own apparatus is one of the photo-time photo share mode and the view-time photo share mode, the partner mode determiner 143 determines whether the destination mode of the digital camera 1-2 is a co-workable mode matching the destination mode thereof (namely, identical to the destination mode thereof).

For example, the destination mode of own apparatus may be the network print mode. In step S18, the partner mode determiner 143 receives an image from the digital camera 1-2 in the network print mode and determines whether the destination mode of the printer 3 as the partner apparatus is a mode for printing the received image, namely, the mode co-workable with the network print mode.

The mode co-workable with the network print mode may be the one in sub-combination with the network print mode.

If it is determined in step S18 that the post-connection mode, namely, the destination mode of the partner apparatus is the mode co-workable with the destination mode of own apparatus (digital camera 1-1), processing proceeds to step S19. The mode transition controller 145 in the mode management object 121 transitions the digital camera 1-1 to the mode (post-connection mode) selected in step S16 and ends the process.

If it is determined in step S18 that the post-connection mode, namely, the destination mode of the partner apparatus is not the mode co-workable with the destination mode of own apparatus (digital camera 1-1), processing proceeds to step S20. The communication driver 103 cuts off the connection with the network 2, and the mode management object 121 displays an error message on the LCD 20, thereby notifying the user of a connection error. Processing ends with the digital camera 1-1 remaining in the original mode instead of transitioning to the destination mode thereof.

If it is determined in step S15 that the connection with the network 2 has not been established, processing proceeds to step S20. The mode management object 121 displays an error message on the LCD 20, thereby notifying the user of a connection error. Processing ends with the digital camera 1-1 remaining in the original mode instead of transitioning to the destination mode thereof.

Figure 12:
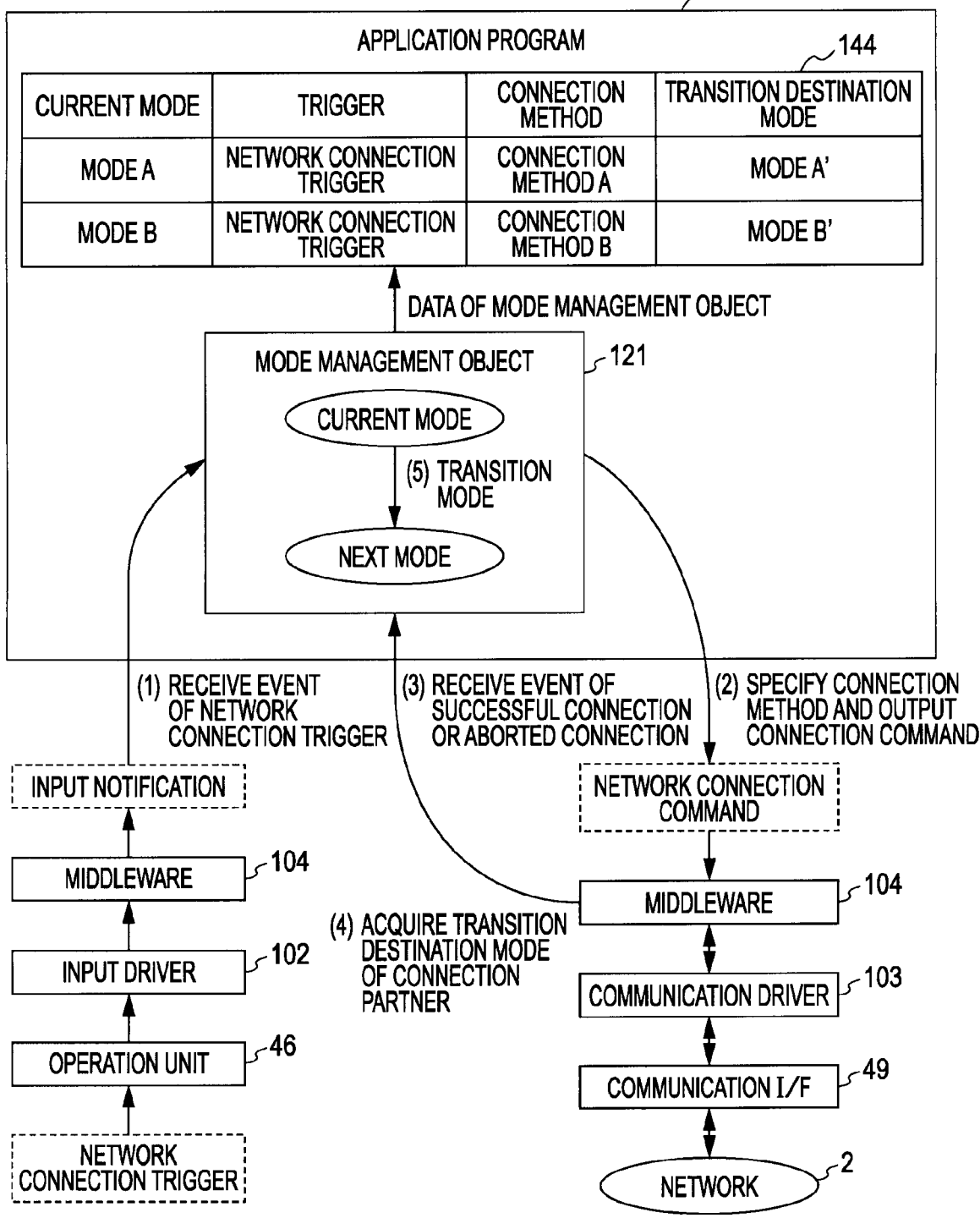
FIG. 12 illustrates the mode transition process.

When the network connection trigger is generated in the operation unit 46 in response to the pressing of the network button 21 in the mode transition process as shown in FIG. 12, an input notification as an event of the network connection trigger is supplied to the application program 105 via the input driver 102 and the middleware 104. Upon receiving the event of the network connection trigger, the application program 105 references the mode management table 144, thereby selecting the connection method responsive to the current mode. The application program 105 specifies the selected connection method, and then issues a connection command to the communication driver 103 via the middleware 104.

In the mode management table 144 of FIG. 12, the current mode as the mode A, the network connection trigger, the connection method as the connection method A, and the transition destination mode as the mode A' are mapped beforehand. Also in the mode management table 144 of FIG. 12, the current mode as the mode B, the network connection trigger, the connection method as the connection method B, and the transition destination mode as the mode B' are mapped beforehand.

The communication driver 103 causes the controller 45 to connect to the network 2. The application program 105 is supplied with an event that indicates whether the communication I/F 49, the communication driver 103 and the middleware 104 have established the connection with the network 2 or not. If the connection has been established, the communication I/F 49, the communication driver 103 and the middleware 104 acquires via the network 2 the transition destination mode as the mode to which the connected partner apparatus is going to transition. Information indicating the transition destination mode of the partner apparatus is thus supplied to the application program 105.

The application program 105 determines whether the transition destination mode of the partner apparatus is a mode co-workable with a next mode of own apparatus. If it is determined that the transition destination mode of the partner apparatus is the mode co-workable the next mode of own apparatus, the application program 105 transitions the mode of own apparatus to that mode.

The communication method of the network 2 mapped to the current mode as the standalone process mode is selected in accordance with the association mapped between the standalone process mode and the communication method of the network 2. The network process mode mapped to the current mode as the standalone process mode is selected in accordance with the association mapped between the standalone process mode and the network process mode. Communication starts with the partner apparatus via the network 2 at the selected communication method of the network 2. It is determined whether the destination mode of the partner apparatus is co-workable with the selected network process mode. If it is determined that the transition destination mode of the partner apparatus is co-workable with the selected network process mode, the mode transition is performed to the selected network process mode.

In this way, the digital camera 1 is reliably established with the network 2, and then with the partner apparatus via the network 2. The digital camera 1 is connected to the network 2 or the partner apparatus via the network 2 at the method appropriate for the network process mode, namely, at the method appropriate for the next process. The process via the network 2 is thus reliably performed.

The digital camera 1 is free from being connected to the network 2 or the partner apparatus via the network 2 at a method inappropriate for the network process mode. This arrangement avoids such a problem that any operation via the network 2 remains unexecutable on an apparently established connection with the network 2.

Figure 13:
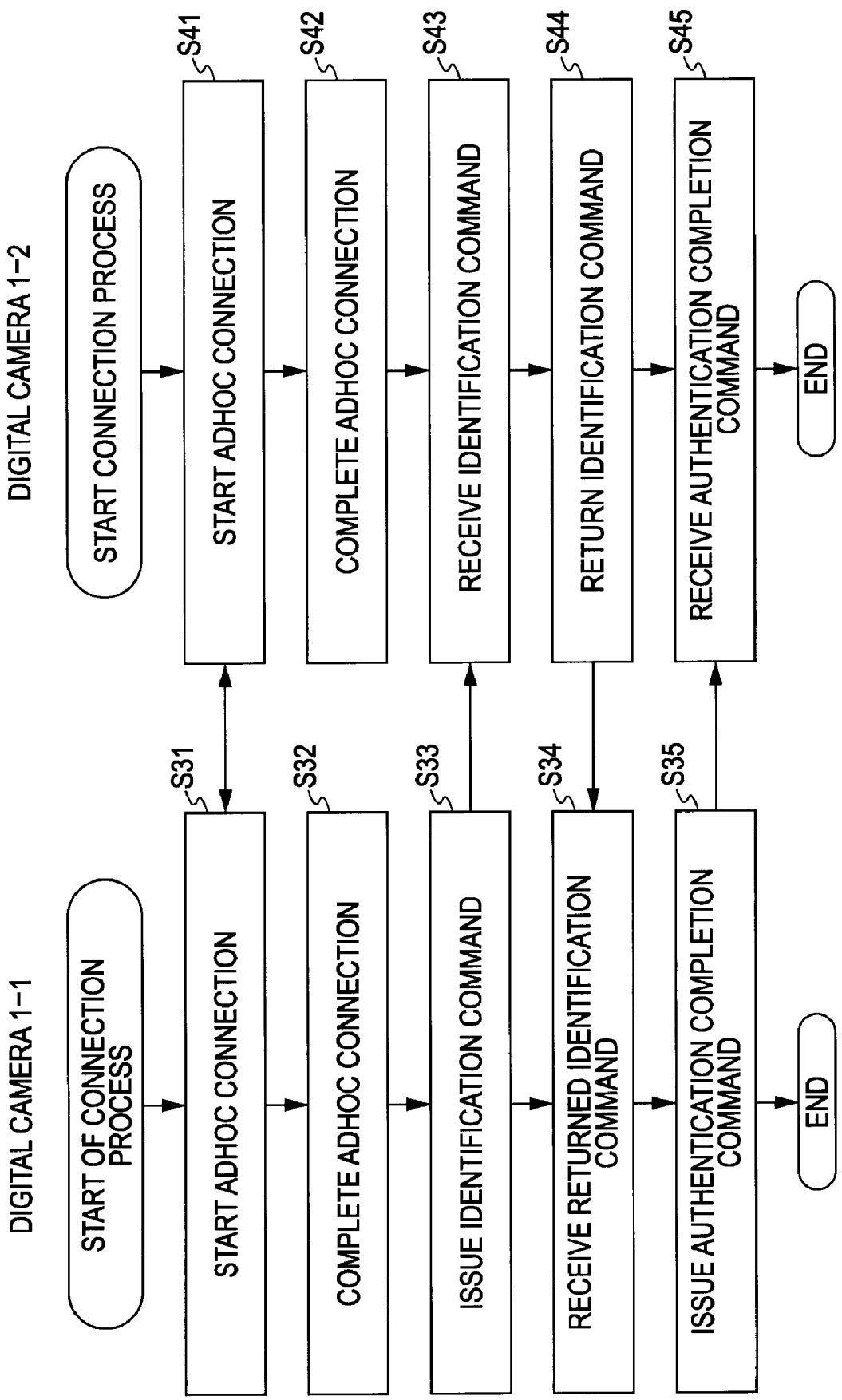
FIG. 13 is a flowchart illustrating in detail a connection process.

FIG. 13 is a flowchart of a connection process with the digital camera 1-2 via the network 2 corresponding to step S14 performed when the adhoc connection as the communication method of the network 2 is selected. In step S31, the communication driver 103 in the digital camera 1-1 starts the adhoc connection with the digital camera 1-2 via the network 2. For example, the communication driver 103 starts supplying power to the communication I/F 49, thereby causing the communication I/F 49 to start scanning peripheral devices.

In step S41, the communication driver 103 in the digital camera 1-2 starts the adhoc connection with the digital camera 1-1 via the network 2.

In step S32, the communication driver 103 in the digital camera 1-1 establishes the adhoc connection with the digital camera 1-2 via the network 2. In step S42, the communication driver 103 in the digital camera 1-2 establishes the adhoc connection with the digital camera 1-1 via the network 2.

In step S33, the communication driver 103 in the digital camera 1-1 issues an identification command and transmits the identification command to the digital camera 1-2 via the network 2. In step S43, the communication driver 103 in the digital camera 1-2 receives the identification command transmitted from the digital camera 1-1.

In step S44, the communication driver 103 in the digital camera 1-2 returns the identification command to the digital camera 1-1 via the network 2. In step S34, the communication driver 103 in the digital camera 1-1 receives the identification command returned from the digital camera 1-2.

In step S35, the communication driver 103 in the digital camera 1-1 issues an authentication completion command and transmits the issued authentication completion command to the digital camera 1-2 via the network 2. In step S45, the input driver 102 in the digital camera 1-2 receives the authentication completion command transmitted from the digital camera 1-1 and ends the process.

If the partner apparatus is successfully authenticated in the above connection process, step S15 and subsequent steps are performed. If the partner apparatus is not successfully authenticated in the above connection process, step S15 and subsequent steps are not performed.

The adhoc connection is preferably permitted only when two digital cameras 1 are concurrently connected. This arrangement is intended to prevent an unscrupulous third party from connecting to the system. For example, the number of apparatuses attempting to connect to the system may be counted in steps S31 and S41. If three apparatuses or more attempt to connect to the system, no further process is performed and connection is not permitted.

To connect a third digital camera 1, the network button 21 in one of the two digital cameras 1 already connected in the adhoc connection and the network button 21 in the third digital camera 1 may be concurrently pressed. The third digital camera 1 can be connected to the two digital cameras 1 already mutually connected in the adhoc connection. The three digital cameras 1 are thus mutually connected to each other. By repeating this operation, three or more digital cameras 1 can be mutually connected to each other.

After the partner apparatus is authenticated and then connected, the digital camera 1 can acquire metadata regarding the partner apparatus, such as a name of the partner apparatus.

Figure 14:
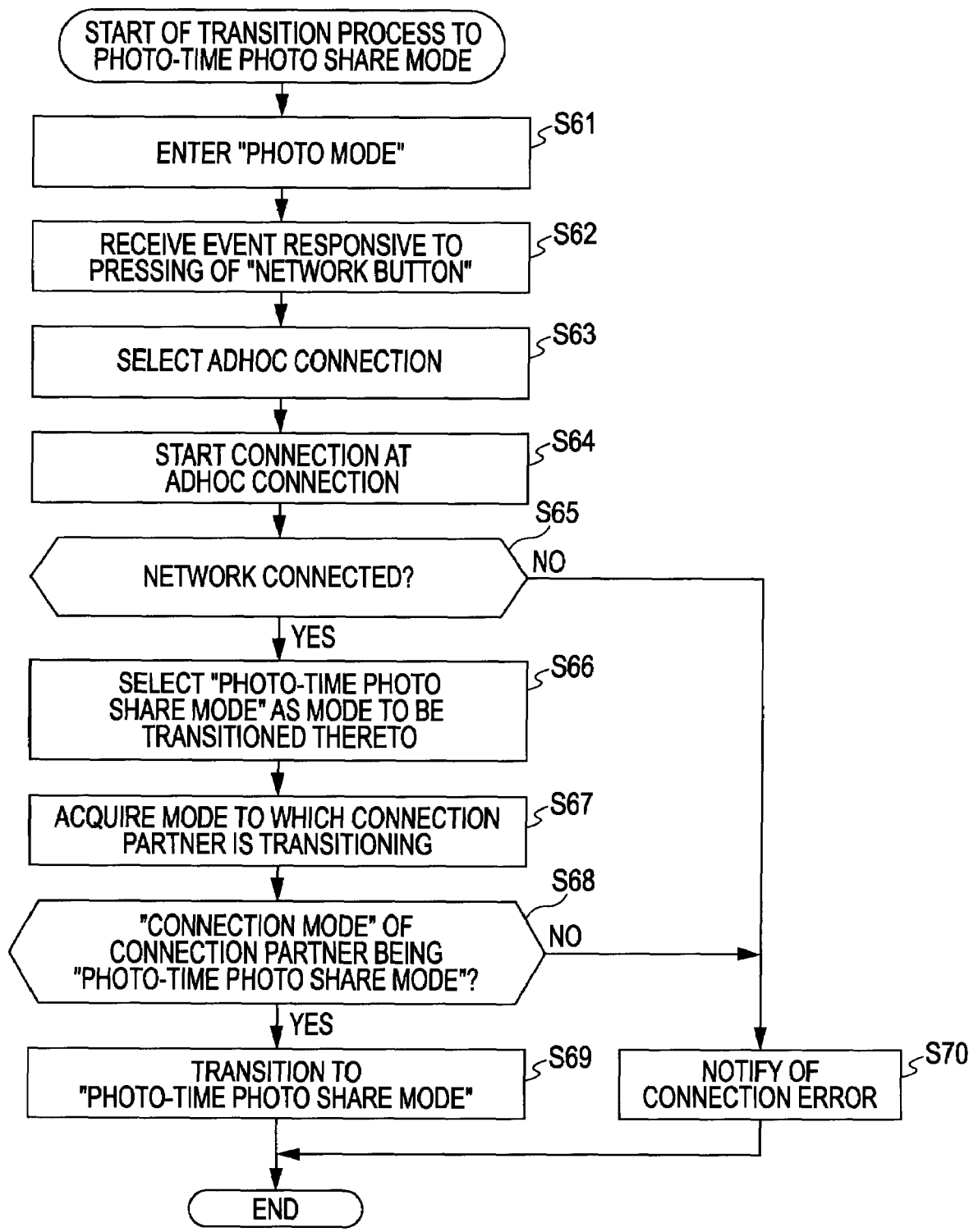
FIG. 14 is a flowchart specifically illustrating a mode transition process to a photo-time photo share mode.

The mode transition process of the digital camera 1-1 from the photo mode to the photo-time photo share mode is described below with reference to a flowchart of FIG. 14. In step S61, the mode transition controller 145 in the mode management object 121 transitions the digital camera 1-1 to the photo mode indicated by a signal from the mode dial 18 in the operation unit 46 in response to an input operation of the user.

Figure 15:
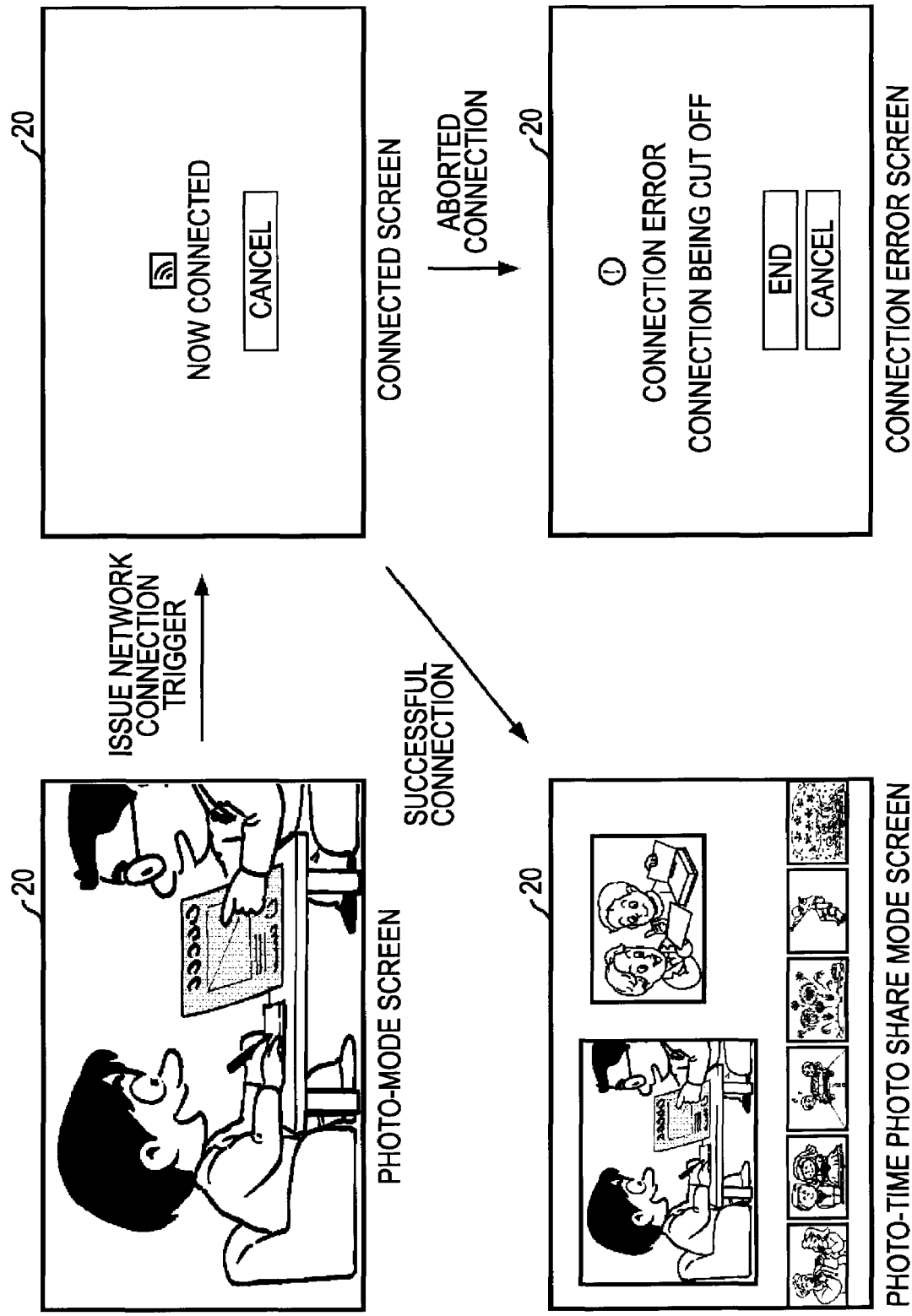
FIG. 15 illustrates image examples displayed on a liquid-crystal display (LCD)

As shown in FIG. 15, the LCD 20 displays an image of a subject going to be photographed in the photo mode.

In step S62, the mode management object 121 receives the event of the network connection trigger responsive to the pressing of the network button 21.

For example, the network button 21 in the digital camera 1-1 and the network button 21 in the digital camera 1-2 are concurrently pressed.

In step S63, the connection method selector 141 in the mode management object 121 references the mode management table 144 that describes the mapping between the photo mode and the adhoc connection for assigning the IP address in the APIPA method. The connection method selector 141 thus selects the adhoc connection for assigning the IP address in the APIPA method as the connection method of the network 2 corresponding to the photo mode input in step S61.

In step S64, the mode management object 121 uses the middleware 104 and the OS 101, thereby causing the communication driver 103 to start the connection with the digital camera 1-2 via the network 2 at the adhoc connection for assigning the IP address in the APIPA method.

If the digital camera 1-1 and the digital camera 1-2 are within a coverage area of a wireless LAN and are connected to each other in the adhoc connection, connection in the IP layer of the network 2 between the digital camera 1-1 and the digital camera 1-2 is completed.

When the connection with the digital camera 1-2 starts as shown in FIG. 15, the digital camera 1-1 displays an image indicative of a connection process in progress on the LCD 20. The user can abort the connection with the digital camera 1-2 by operating the operation buttons 19 to press a cancel button on the operation unit 46 displayed on the LCD 20 in the digital camera 1-1.

In step S65, the mode management object 121 acquires the connection status of the network 2 from the communication driver 103 via the middleware 104 and the OS 101 and determines whether the connection with the network 2 has been established.

If it is determined in step S65 that the connection with the network 2 has been established, processing proceeds to step S66. The transition destination mode selector 142 in the mode management object 121 references the mode management table 144 that stores the mapping between the photo mode and the photo-time photo share mode. The transition destination mode selector 142 thus selects the photo-time photo share mode as a destination mode subsequent to the connection.

After completion of the IP layer connection, the digital camera 1-1 verifies via network 2 that the transition destination mode of the partner apparatus is the photo-time photo share mode.

In step S67, the partner mode determiner 143 in the mode management object 121 acquires information indicating the destination mode of the digital camera 1-2 as the partner apparatus.

In step S68, the partner mode determiner 143 determines whether the post-connection mode, namely, the transition destination mode of the digital camera 1-2 as the partner apparatus is the photo-time photo share mode.

If it is determined in step S68 that the post-connection mode of the partner apparatus, namely, the digital camera 1-2 is the photo-time photo share mode, processing proceeds to step S69. The mode transition controller 145 in the mode management object 121 transitions the digital camera 1-1 to the photo-time photo share mode selected in step S66. Processing thus ends.

When subjects are going to be photographed by the digital camera 1-1 and the digital camera 1-2 in the photo-time photo share mode as shown in FIG. 15, the digital camera 1-1 acquires via the network 2 the image photographed by the digital camera 1-2. The digital camera 1-1 displays on the LCD 20 the image of the subject going to be photographed, together with the image photographed by the digital camera 1-1 and the image photographed by the digital camera 1-2 and acquired via the network 2.

If it is determined in step S68 that the post-connection mode of the digital camera 1-2 as the partner apparatus is not the photo-time photo share mode, namely, the destination modes of the apparatuses are not co-workable with each other, processing proceeds to step S70. The communication driver 103 cuts off the connection. The photo-time photo share object 122 displays an error message on the LCD 20, thereby notifying the user of a connection error. Processing ends with the digital camera 1-1 remaining in the photo mode.

As shown in FIG. 15, an error message such as "connection error: connection is cut off" is displayed on the LCD 20 in step S68. The user may operate the operation button 19, namely, select a cancel button or an end button on the LCD 20 using the operation unit 46. The digital camera 1-1 thus suspends or quits the mode transition or performs a next process.

If it is determined in step S65 that the connection with the network 2 has not been established, processing proceeds to step S70. The mode management object 121 displays an error message on the LCD 20, thereby notifying the user of a connection error. The digital camera 1-1 remains in the photo mode, and ends the process.

Figure 16:
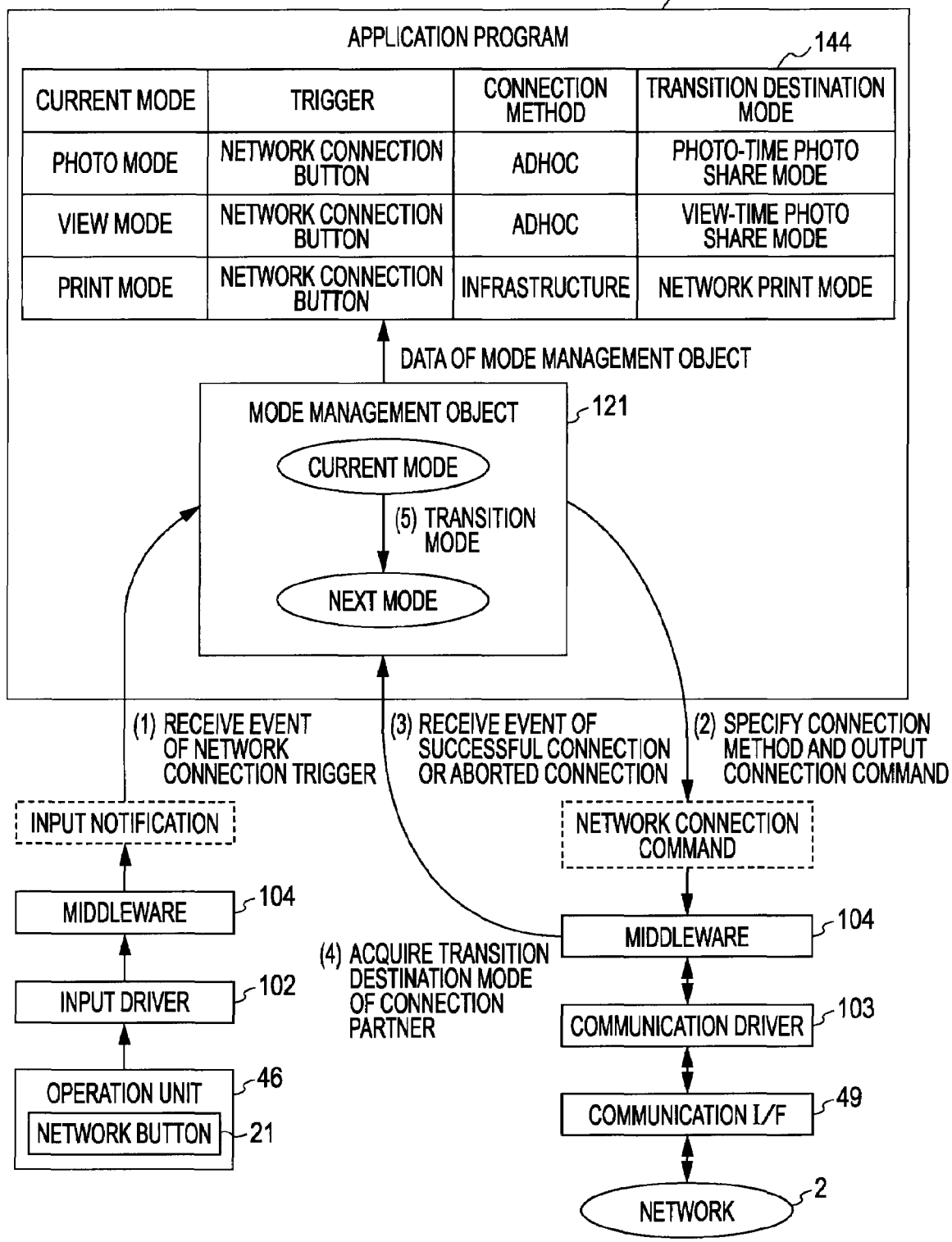
FIG. 16 illustrates a specific example of the mode transition process.

The mode transition may be performed from the photo mode to the photo-time photo share mode when a network connection trigger is caused in the operation unit 46 in response to the pressing of the network button 21 as shown in FIG. 16. An input notification as the event of the network connection trigger is supplied to the application program 105 via the input driver 102 and the middleware 104. Upon receiving the event of the network connection trigger, the application program 105 references the mode management table 144. The application program 105 thus selects the adhoc connection corresponding to the photo mode as the current mode, specifies the selected connection method, and transmits a connection command to the communication driver 103 via the middleware 104.

In the mode management table 144 of FIG. 16, the photo mode as the current mode, the trigger responsive to the pressing of the network connection button, the adhoc connection, and the photo-time photo share mode as the transition destination mode are mutually mapped to each other. Further in the mode management table 144 of FIG. 16, the view mode as the current mode, the trigger responsive to the pressing of the network connection button, the adhoc connection, and the view-time photo share mode as the transition destination mode are mutually mapped to each other. Further in the mode management table 144 of FIG. 16, the print mode as the current mode, the trigger responsive to the pressing of the network connection button, the infrastructure connection, and the network print mode as the transition destination mode are mutually mapped to each other.

The communication driver 103 causes the communication I/F 49 to connect to the network 2. An event indicating whether the communication I/F 49, the communication driver 103 and the middleware 104 have established the connection or not is issued to the application program 105. If the connection has been established, the communication I/F 49, the communication driver 103 and the middleware 104 acquire the transition destination mode of the connected partner apparatus via the network 2. Information indicating the transition destination mode is then supplied to the application program 105.

The application program 105 determines whether the transition destination mode of the partner apparatus is the photo-time photo share mode. If it is determined that the transition destination mode of the partner apparatus is the photo-time photo share mode, the application program 105 transitions the mode of own apparatus to the photo-time photo share mode.

From the standpoint of the user, if the destination mode of the application program 105 of each of the digital cameras 1 including own digital camera 1 is the photo-time photo share mode, the user simply transitions the digital camera 1-1 to the photo mode, and presses the network button 21. The user can use the function of the digital camera 1 in the photo-time photo share mode without being aware of the connection method with the network 2.

The transition process from the view mode to the view-time photo share mode is identical to the transition process from the photo mode to the photo-time photo share mode. More specifically, the mode transition controller 145 in the mode management object 121 sets the digital camera 1-1 into the view mode indicated by a signal from the mode dial 18 in the operation unit 46 in response to a user operation.

The mode management object 121 receives the event of a network connection trigger responsive to the pressing of the network button 21.

The connection method selector 141 in the mode management object 121 references the mode management table 144 describing the mapping between the view mode and the adhoc connection for assigning the IP address in the APIPA method and selects the adhoc connection for assigning the IP address in the APIPA method as the connection method of the network 2 corresponding to the view mode.

The mode management object 121 uses the middleware 104 and the OS 101, thereby causing the communication driver 103 to connect to the digital camera 1-2 via the network 2 at the adhoc connection for assigning the IP address in the APIPA method.

With the connection via the network 2 starting, the mode management object 121 uses the middleware 104 and the OS 101, thereby acquiring the connection status of the network 2 from the communication driver 103 to determine whether the connection via the network 2 has been established.

When the connection via the network 2 has been established, the transition destination mode selector 142 in the mode management object 121 references the mode management table 144 storing the mapping between the view mode and the view-time photo share mode, and selects the view-time photo share mode as the mode to transition to subsequent the establishment of the connection.

With the IP layer connection established, the digital camera 1-1 verifies via the network 2 that the transition destination mode of the partner apparatus is the view-time photo share mode. More specifically, the partner mode determiner 143 in the mode management object 121 acquires via the network 2 information regarding the mode to which the digital camera 1-2 as the partner apparatus is going to transition.

The partner mode determiner 143 determines whether the post-connection mode of the digital camera 1-2 as the partner apparatus, namely, the transition destination mode of the partner apparatus is the view-time photo share mode.

If it is determined that the post-connection mode of the digital camera 1-2 as the partner apparatus, namely, the transition destination mode of the partner apparatus is the view-time photo share mode, the mode transition controller 145 in the mode management object 121 transitions the digital camera 1-1 to the selected view-time photo share mode. Processing then ends.

If it is determined that the post-connection mode of the digital camera 1-2 as the partner apparatus, namely, the transition destination mode of the partner apparatus is not the view-time photo share mode, i.e., the destination modes of the apparatuses are not co-workable, the communication driver 103 cuts off the connection. The mode management object 121 causes the LCD 20 to display an error message, thereby notifying the user of a connection error. The digital camera 1-1 remains in the view mode rather than transitioning to the view-time photo share mode and ends the process.

If it is determined that the connection with the network 2 has not been established, the mode management object 121 causes the LCD 20 to display an error message, thereby notifying the user of a connection error. The digital camera 1-1 remains in the view mode rather than transitioning to the view-time photo share mode and ends the process.

The mode transition from the view mode to the view-time photo share mode is performed as shown in FIG. 16 when a network connection trigger is caused in the operation unit 46 in response to the pressing of the network button 21. An input notification of the event of the network connection trigger is then supplied to the application program 105 via the input driver 102 and the middleware 104. Upon receiving the event of the network connection trigger, the application program 105 references the mode management table 144 and selects the adhoc connection corresponding to the view mode as the current mode. The application program 105 then specifies the selected connection method and transmits a connection command to the communication driver 103 via the middleware 104.

The communication driver 103 causes the communication I/F 49 to connect to the network 2. An event indicating whether the communication I/F 49, the communication driver 103 and the middleware 104 have established the connection or not is issued to the application program 105. If the connection has been established, the communication I/F 49, the communication driver 103 and the middleware 104 acquire the transition destination mode of the connected partner apparatus via the network 2. Information indicating the transition destination mode is then supplied to the application program 105.

The application program 105 determines whether the transition destination mode of the partner apparatus is the view-time photo share mode. If it is determined that the transition destination mode of the partner apparatus is the view-time photo share mode, the application program 105 transitions the mode of own apparatus to the view-time photo share mode.

From the standpoint of the user, if the destination mode of the application program 105 of each of the digital cameras 1 including own digital camera 1 is the view-time photo share mode, the user simply transitions the digital camera 1-1 to the view mode as the standalone process mode, and presses the network button 21. The user can use the function of the digital camera 1 in the view-time photo share mode without being aware of the connection method with the network 2.

The transition process from the print mode to the network print mode is identical to the transition process from the photo mode to the photo-time photo share mode. More specifically, the mode transition controller 145 in the mode management object 121 sets the digital camera 1-1 into the print mode indicated by a signal from the mode dial 18 in the operation unit 46 in response to the user operation.

The mode management object 121 receives the event of a network connection trigger responsive to the pressing of the network button 21.

The connection method selector 141 in the mode management object 121 references the mode management table 144 describing the mapping between the print mode and the infrastructure connection for assigning the IP address in the DHCP method and selects the adhoc connection for assigning the IP address in the DHCP method as the connection method of the network 2 corresponding to the print mode.

The mode management object 121 uses the middleware 104 and the OS 101, thereby causing the communication driver 103 to connect via an access point (not shown) of the network 2 connected to the printer 3 at the infrastructure connection for assigning the IP address in the DHCP.

The above operation is performed on the premise that the printer 3 is switched beforehand on and that the printer 3 is connected to the access point of the network 2.

In the infrastructure connection, the communication driver 103 detects the access point, thereby establishing the IP layer connection of the network 2 with the detected access point. In accordance with the protocol defined in the DLNA standard, one of the middleware 104 and the application program 105 verifies through the communication driver 103 that the printer 3 connected to the network 2 is present.

Communication via the IP layer of the network 2 between the digital camera 1-1 and the printer 3 becomes possible after the establishment of the PI layer connection of the network 2 between the access point (not shown) and the digital camera 1-1 and the verification that the printer 3 connected to the printer 3 is present.

With the connection via the network 2 starting, the mode management object 121 uses the middleware 104 and the OS 101, thereby acquiring the connection status of the network 2 from the communication driver 103 to determine whether the connection with the network 2 has been established.

If it is determined that the connection with the network 2 has been established, the transition destination mode selector 142 in the mode management object 121 references the mode management table 144 describing the mapping between the print mode and the network print mode and selects the network print mode as the destination mode subsequent to the connection.

With the IP layer connection established, the digital camera 1-1 verifies via the network 2 that the transition destination mode of the partner apparatus is a mode accepting a print operation from the network print mode. More specifically, the partner mode determiner 143 in the mode management object 121 acquires via the network 2 information regarding the mode to which the printer 3 as the partner apparatus is going to transition.

The partner mode determiner 143 determines whether the post-connection mode of the printer 3 as the partner apparatus is the mode accepting the print operation from the network print mode.

If it is determined that the transition destination mode of the printer 3 is the mode accepting the print operation from the network print mode, the mode transition controller 145 in the mode management object 121 transitions the digital camera 1-1 to the selected network print mode. Processing then ends.

If it is determined that the transition destination mode of the printer 3 as the partner apparatus is not the mode accepting the print operation from the network print mode, i.e., the destination modes of the apparatuses are not co-workable, the communication driver 103 cuts off the connection. The mode management object 121 causes the LCD unit to display an error message, thereby notifying the user of a connection error. The digital camera 1-1 remains in the print mode rather than transitioning to the network print mode and ends the process.

If it is determined that the connection with the network 2 has not been established, the mode management object 121 causes the LCD unit to display an error message, thereby notifying the user of a connection error. The digital camera 1-1 remains in the photo mode and ends the process.

The mode transition from the print mode to the network print mode is performed as shown in FIG. 16 when a network connection trigger is caused in the operation unit 46 in response to the pressing of the network button 21. An input notification of the event of the network connection trigger is then supplied to the application program 105 via the input driver 102 and the middleware 104. Upon receiving the event of the network connection trigger, the application program 105 references the mode management table 144 and selects the infrastructure connection corresponding to the print mode as the current mode. The application program 105 then specifies the selected connection method and transmits a connection command to the communication driver 103 via the middleware 104.

The communication driver 103 causes the communication I/F 49 to connect to the network 2. An event indicating whether the communication I/F 49, the communication driver 103 and the middleware 104 have established the connection or not is issued to the application program 105. If the connection has been established, the communication I/F 49, the communication driver 103 and the middleware 104 acquire the transition destination mode of the connected partner apparatus via the network 2. Information indicating the transition destination mode is then supplied to the application program 105.

The application program 105 determines whether the transition destination mode of the partner apparatus is the mode receiving a print operation from the network print mode. If it is determined that the transition destination mode of the partner apparatus is the mode accepting the print operation from the network print mode, the application program 105 transitions the mode of own apparatus to the network print mode.

From the standpoint of the user, if the destination mode of the printer 3 connected to the network 2 is the mode accepting the print operation from the network print mode, the user simply transitions the digital camera 1-1 to the print mode as the standalone process mode and presses the network button 21. The user can use the function of the digital camera 1 in the network print mode without being aware of the connection method with the network 2.

In the foregoing discussion, it is determined whether the mode of the printer 3 as the partner apparatus is the mode accepting the print operation from the network print mode. Alternatively, it is determined beforehand whether the mode of the printer 3 is set to be the mode accepting the print operation from the network print mode.

In this way, the network applications (using the network 2) are limited based on the use case regarding the mode of the digital camera 1 used by the user. The adhoc connection or the infrastructure connection, whichever is appropriate for the network application, is determined. With the IP layer connection established, the final connection process is completed after determining whether the network application of own apparatus and the network application of the partner apparatus can be co-workably combined. Even with slight knowledge of the communication method of the network 2, the user can still connect apparatuses via the network 2 with a simple operation, and use the network application.

Since the connection method is automatically determined, the apparatus is free from any trouble that apparatus connection fails due to a connection setting error created by the user.

The trigger for connection with the network 2 is generated not only by the pressing of the network button 21 as a physical button but also by using a menu screen such as a graphical user interface (GUI). For example, when a connection command is selected and entered on the GUI menu screen, a radio frequency identification (RFID) is incorporated in the digital camera 1. When communication is established between RFIDs, the trigger for connecting with the network 2 may be issued. For example, when the digital camera 1 is mounted on a cradle having an interface with the network 2, the trigger for connecting with the network 2 may be issued.

The photo-time photo share mode is described below. In the photo-time photo share mode, the digital camera 1 operates as a server while also operating as a client at the same time. More specifically, each of the digital camera 1-1 in the photo-time photo share mode and the digital camera 1-2 in the photo-time photo share mode operates as a server as well as a client.

In the photo-time photo share mode, at the moment the partner apparatus photographs an image, the photographed image is transmitted via the network 2. Upon receiving the image photographed by the partner apparatus, the received image is displayed together with an image indicating the partner apparatus or a name of the partner apparatus. The user can thus view images photographed by someone else.

Figure 17:
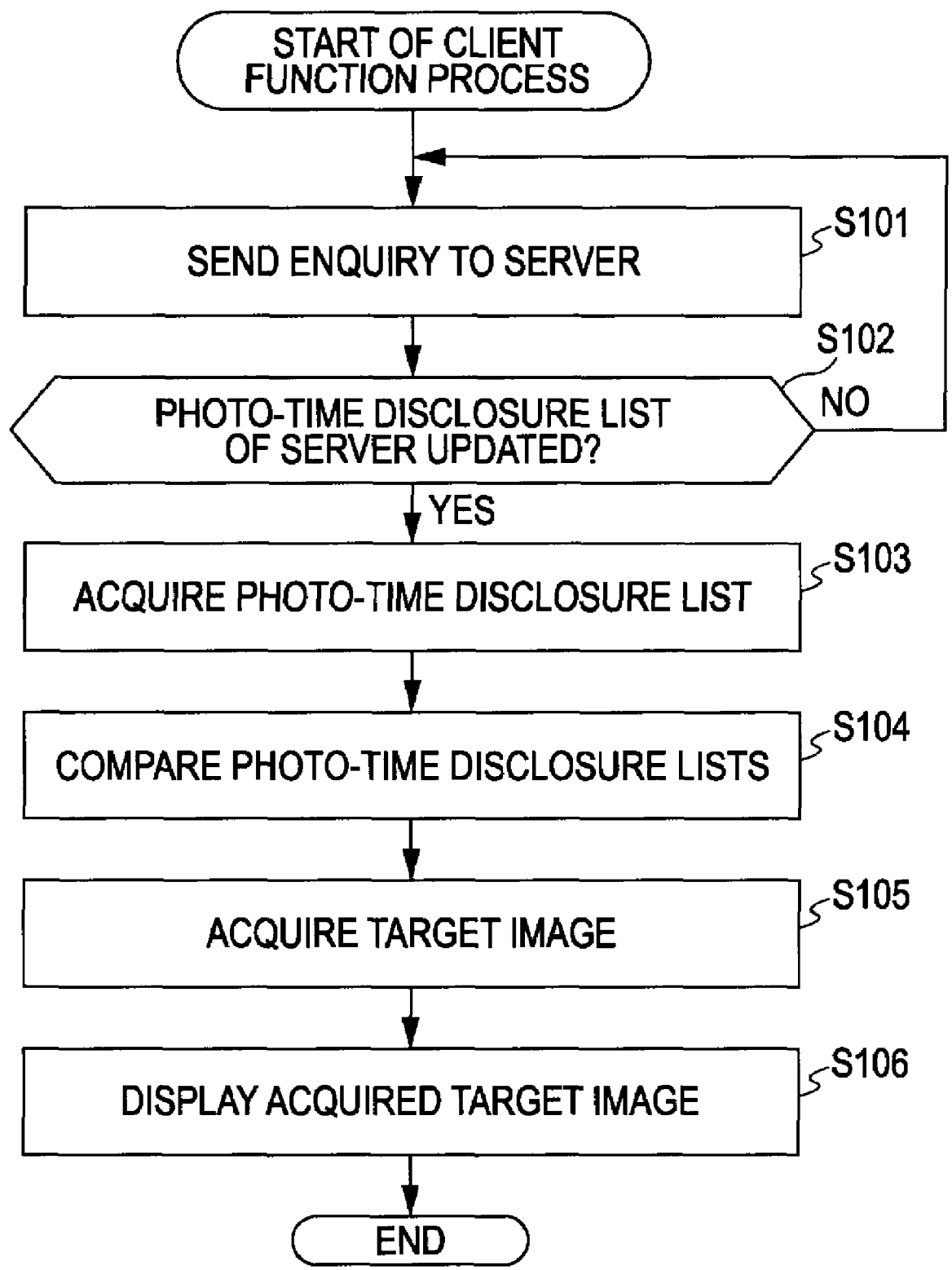
FIG. 17 is a flowchart illustrating a client function process in the photo-time photo share mode.

FIG. 17 is a flowchart illustrating a client function process of the digital camera 1-1 in the photo-time photo share mode. In step S101, the photo-time disclosure list acquisition unit 161 in the photo-time photo share object 122 inquires the digital camera 1-2 via the network 2 whether a photo-time disclosure list is updated. Inquiry in step S101 may be preformed at regular intervals, for example, every 5 seconds.

The photo-time disclosure list is arranged to be read in accordance with the DLNA standard.

FIG. 18 illustrates the photo-time disclosure list. The photo-time disclosure list contains an address in the recording medium 60, corresponding to a content identification (ID) identifying a predetermined image photographed, and storing the image, an address in the recording medium 60 storing a thumbnail image of the photographed image, classification of image size, definition of the image, and information indicating an encoding method of the image.

In the photo-time disclosure list of FIG. 18, the address is described by a path composed of a file name of a file storing the photographed image and/or the thumbnail image thereof and a folder storing the file.

The photo-time disclosure list of FIG. 18 includes xxxxx/ xxxxxxx/xxxxxxxxxxxxx.jpg corresponding to a content ID 0000001 as a path (address) storing the thumbnail image, xxxxxxx/xxxxxxx/xxxxxxxxxxxxxxx.jpg as a path (address) storing the photographed image, large as the classification of the image size, 1024×768 pixels as the definition of the image, and JPEG as information indicating the encoding method of the image. The photo-time disclosure list of FIG. 18 also includes yyyy/yyyyyy/yyyyyyyyyyyy.jpg corresponding to a content ID 0000002 as a path (address) storing the thumbnail image, yyyyyyy/yyyyyyy/ yyyyyyyyyyyyyy.jpg as a path (address) storing the photographed image, small as the classification of the image size, 320×240 pixels as the definition of the image, and JPEG as information indicating the encoding method of the image.

The photo-time disclosure list of FIG. 18 includes zzzzz/ zzzzzz/zzzzzzzzzzzz.jpg corresponding to a content ID 0000003 as a path (address) storing the thumbnail image, zzzzzzz/zzzzzzz/zzzzzzzzzzzzzz.jpg as a path (address) storing the photographed image, middle as the classification of the image size, 640×480 pixels as the definition of the image, and JPEG as information indicating the encoding method of the image.

In step S102, the photo-time disclosure list acquisition unit 161 determines whether the photo-time disclosure list in the digital camera 1-2 as the server is updated. If it is determined in step S102 that the photo-time disclosure list is not updated, processing returns to step S101 to repeat the inquiry and determination process until the photo-time disclosure list is updated.

If it is determined in step S102 that the photo-time disclosure list is updated, processing proceeds to step S103. The photo-time disclosure list acquisition unit 161 acquires the photo-time disclosure list from the digital camera 1-2 via the network 2.

The photo-time disclosure list acquisition unit 161 acquires the photo-time disclosure list via the network 2 by reading the address designed to pre-store the photo-time disclosure list in a memory space in the digital camera 1-2 as the server. More in detail, the photo-time disclosure list acquisition unit 161 instructs the communication driver 103 to read the photo-time disclosure list. The communication driver 103 reads the photo-time disclosure list at the address storing the photo-time disclosure list in the memory space in the digital camera 1-2 as the server via the network 2. The communication driver 103 supplies the read photo-time disclosure list to the photo-time disclosure list acquisition unit 161.

For example, the photo-time disclosure list acquisition unit 161 requests via the network 2 the digital camera 1-2 as the server to transmit the photo-time disclosure list. The digital camera 1-2 transmits the requested photo-time disclosure list to the digital camera 1-1 via the network 2. The photo-time disclosure list acquisition unit 161 causes the communication driver 103 and the communication I/F 49 to receive the transmitted photo-time disclosure list, thereby acquiring the photo-time disclosure list.

In step S104, the photo-time disclosure list acquisition unit 161 compares a previously acquired photo-time disclosure list with the currently acquired photo-time disclosure list. The photo-time disclosure list acquisition unit 161 acquired an address storing an image added as a result of updating, namely, an address storing the photographed image.

In step S105, the image acquisition unit 162 in the photo-time photo share object 122 acquires a target image added as a result of updating from the digital camera 1-2 via the network 2. In other words, the image acquisition unit 162 acquires, via the network 2, the photographed image from the address storing the photographed image and described in the photo-time disclosure list.

The image acquisition unit 162 acquires the image photographed by the digital camera 1-2 as the server by reading the image from the address storing the photographed image in the memory space in the digital camera 1-2 as the server. More in detail, the image acquisition unit 162 specifies to the communication driver 103 the address described in the photo-time disclosure list, thereby requesting the communication driver 103 to read the image. The communication driver 103 reads into the communication I/F 49 via the network 2 the image from the address storing the photographed image in the memory space in the digital camera 1-2 as the server. The communication driver 103 supplies the read image to the image acquisition unit 162.

The image acquisition unit 162 causes the digital camera 1-2 as the server via the network 2 to identify the address described in the photo-time disclosure list and requests the digital camera 1-2 to transmit the photographed image. The digital camera 1-2 as the server transmits the requested image to the digital camera 1-1 via the network 2. The image acquisition unit 162 causes the communication driver 103 and the communication I/F 49 to receive the transmitted image. The image photographed by the digital camera 1-2 as the server is thus acquired.

In step S106, the display controller 164 in the photo-time photo share object 122 causes the LCD 20 to display the thumbnail image of the acquired image. Processing thus ends.

If at least three digital cameras 1 in the photo-time photo share mode are connected to each other, each digital camera 1 performs the process of FIG. 17 to each of the other digital cameras 1 and acquires the photo-time disclosure list and then images from each of the other digital cameras 1.

For example, if four digital cameras 1 in the photo-time photo share mode are mutually connected, each digital camera 1 can acquire all images photographed by any of the four digital cameras 1 substantially at the same time as the images are photographed.

In the above-discussion, the photographed image is acquired in step S105. The photographed image and the thumbnail image may be acquired in accordance with the photo-time disclosure list. In such a case, the acquired thumbnail image may be displayed in step S106.

Figure 19:
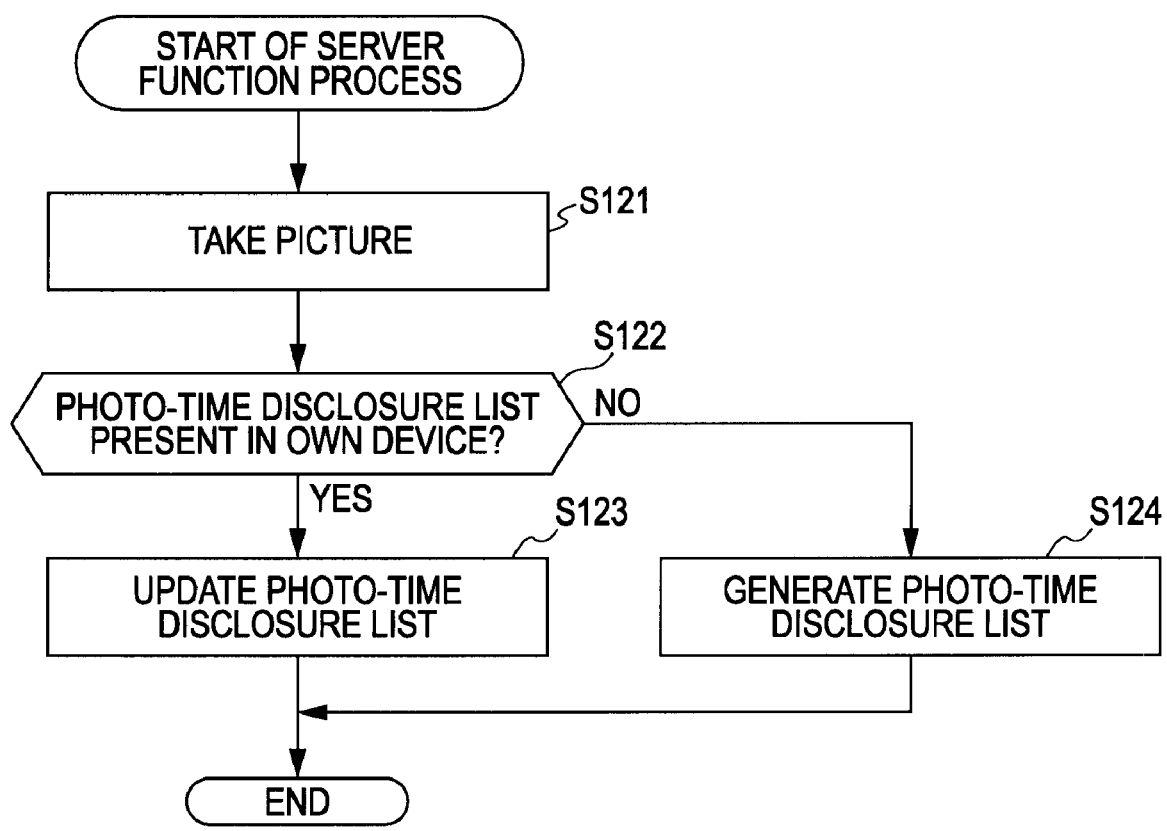
FIG. 19 is a flowchart illustrating a server function process in the photo-time photo share mode.

FIG. 19 is a flowchart illustrating a server function of the digital camera 1-1 in the photo-time photo share mode. In step S121, the photo control object 123 causes the camera section 41 to photograph a subject. In response to the pressing of the shutter (release) button 16, the photo control object 123 controls the camera section 41, thereby generating an image of the subject. The photo control object 123 controls the camera DSP 42, the SDRAM 43, and the medium I/F 44, thereby performing the predetermined process on the generated image and recording the resulting image onto the recording medium 60.

At the moment the image is photographed, the photo control object 123 generates a thumbnail image of the photographed image. The photo control object 123 causes the recording medium 60 to record the generated thumbnail image.

In step S122, the photo-time disclosure list generating and updating unit 163 determines whether own apparatus has already stored a photo-time disclosure list. If it is determined in step S122 that own apparatus has already stored the photo-time disclosure list, processing proceeds to step S123. The photo-time disclosure list is updated and processing thus ends. More specifically, added to the photo-time disclosure list in step S123 are an address in the recording medium 60, corresponding to a content identification (ID) identifying a predetermined image photographed in step S121, and storing the image, an address in the recording medium 60 storing a thumbnail image of the photographed image, a classification of image size, definition of the image, and information indicating an encoding method of the image.

If it is determined in step S122 that no photo-time disclosure list is present, processing proceeds to step S124. The photo-time disclosure list generating and updating unit 163 generates a photo-time disclosure list containing an address in the recording medium 60, corresponding to a content identification identifying a predetermined image photographed in step S121, and storing the image, an address in the recording medium 60 storing a thumbnail image of the photographed image, a classification of image size, definition of the image, and information indicating an encoding method of the image. Processing thus ends.

Figure 20:
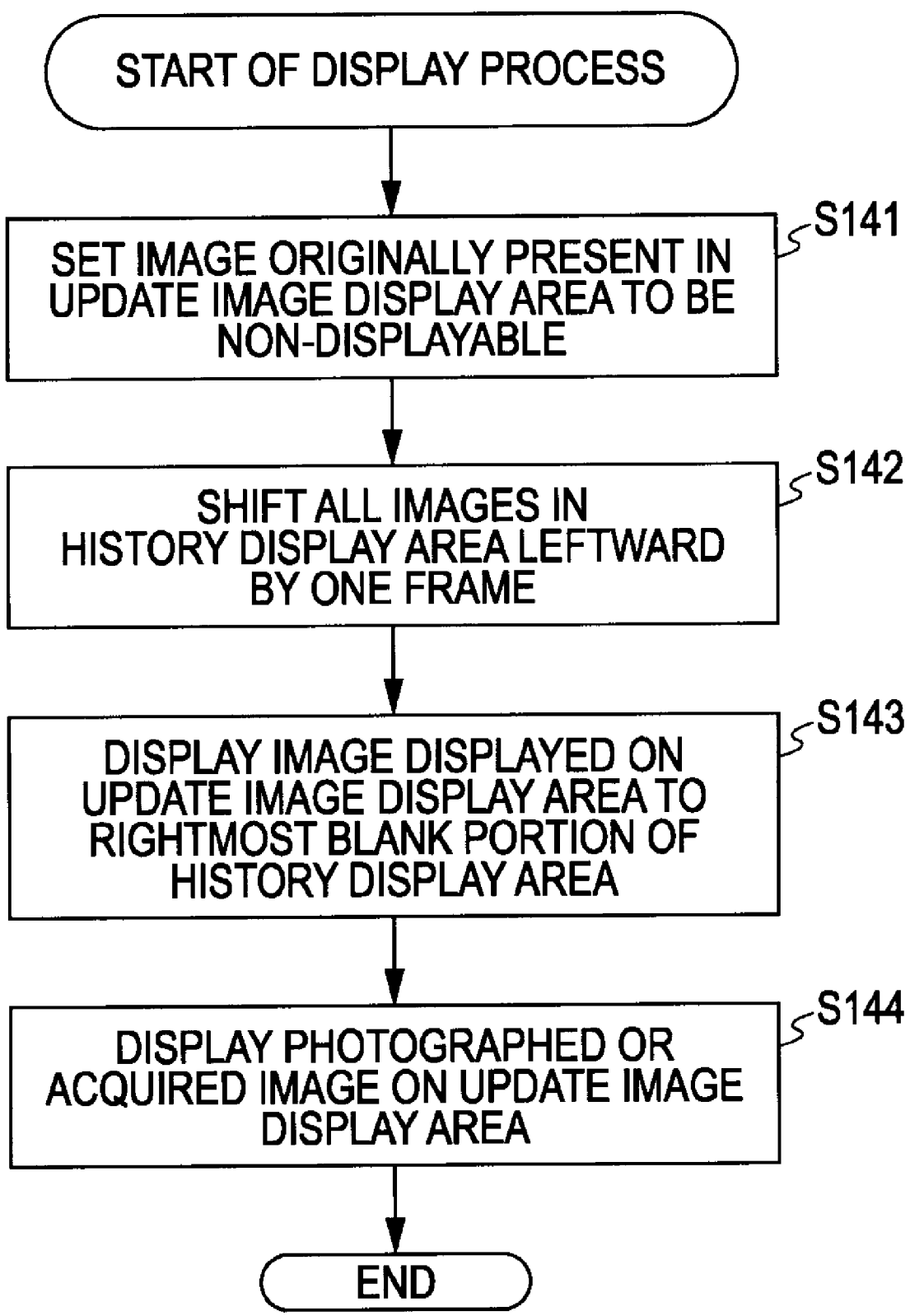
FIG. 20 is a flowchart illustrating a display process.

FIG. 20 is a flowchart illustrating a display process performed when the digital camera 1-1 photographs a subject in the photo-time photo share mode or the digital camera 1-1 acquires an image from the digital camera 1-2.

In step S141, the display controller 164 makes non-displayable an image originally displayed on an update image display area.

Figure 21:
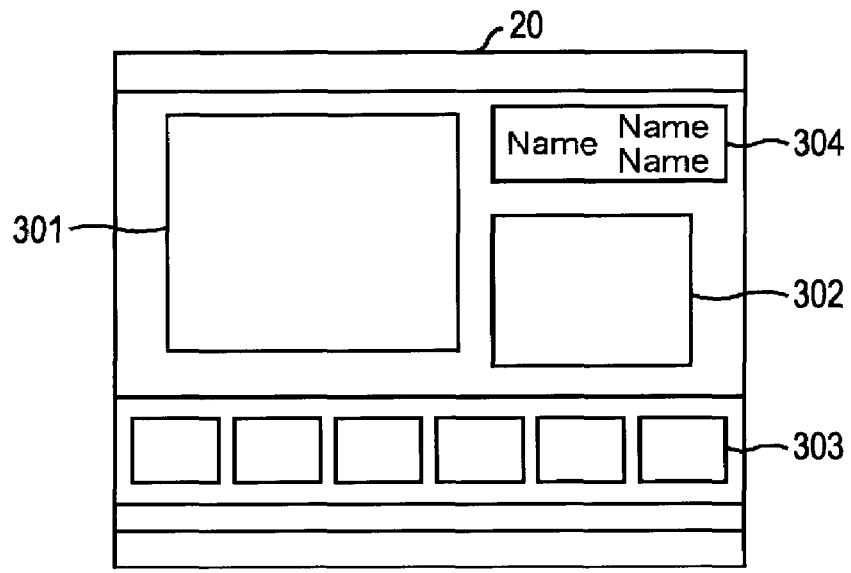
FIG. 21 illustrates an arrangement of display areas on the LCD screen in the photo-time photo share mode.

FIG. 21 illustrates display areas of the screen of the LCD 20 in the photo-time photo share mode. In the photo-time photo share mode, the display areas of the screen of the LCD 20 include a subject image display area 301, an update image display area 302, a history display area 303, and a connection partner name display area 304.

The subject image display area 301 displays the image of the subject to be photographed. The update image display area 302 displays one of image photographed by own apparatus and the image photographed by and acquired from the partner apparatus, whichever is an update image.

The history display area 303 displays the image photographed by own apparatus and the image photographed by and acquired from the partner apparatus in the order of photographing. The connection partner name display area 304 displays a name of a partner connected via the network 2. The name of the partner is a name of a user set in the digital camera 1-2. The name of the partner may be either the name of the user or the name of the partner apparatus.

Figure 22:
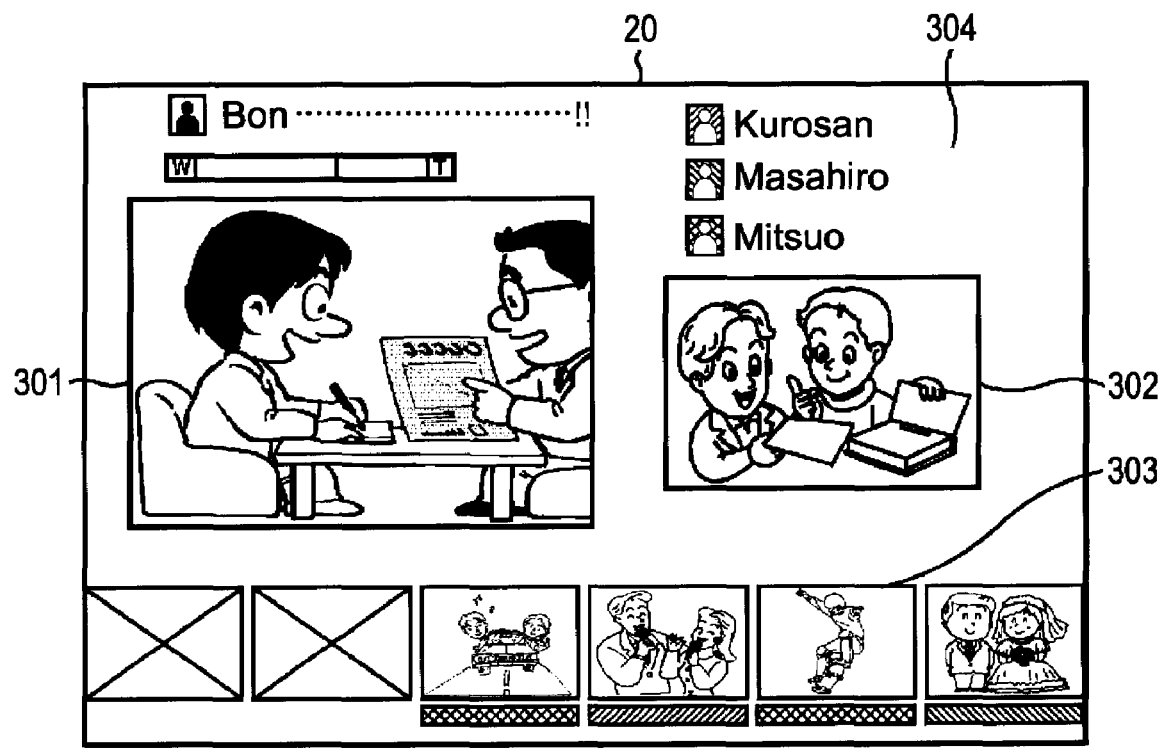
FIG. 22 illustrates a specific example of images displayed on the LCD in the photo-time photo share mode.

FIG. 22 illustrates a specific example of the image displayed in the display areas on the screen of the LCD 20 in the photo-time photo share mode. As shown in FIG. 22, the subject image display area 301 displays an image of persons engaged in a business talk to be photographed. The update image display area 302 displays a new image (photographed later) out of the images photographed by own apparatus or photographed by and acquired from the partner apparatus. The new image here is the one photographed by own apparatus.

As shown in FIG. 22, the history display area 303 displays the images photographed by own apparatus or photographed by and acquired from the partner apparatus in the order of photographing from right to left. As shown, the connection partner name display area 304 displays four frames of image.

As shown in FIG. 22, the connection partner name display area 304 displays the partner names, Kurosan, Masahiro, and Mitsuo to whom own apparatus is connected via the network 2.

Figure 23:
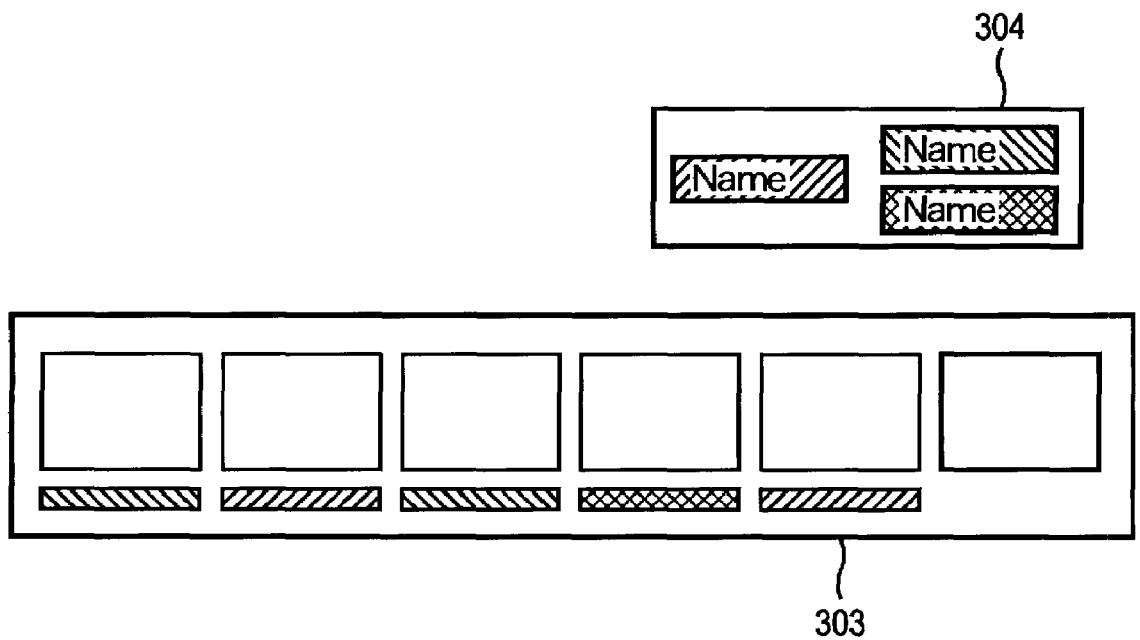
FIG. 23 illustrates a connection partner name display area and a history display area.

As shown in FIG. 23, the names displayed in the connection partner name display area 304 are differentiated in color. Each image displayed on the history display area 303 has the same color as the color of the respective name of the person in the connection partner name display area 304 who has photographed that image. As shown in FIG. 23, the history display area 303 displays under the image a color bar in the same color as the color of the name of the person who has photographed the image.

The person who has photographed the image displayed on the history display area 303 is thus recognized at a glance.

In step S141 of FIG. 20, the display controller 164 makes non-displayable an update image that is the latest image prior to the photographing of images by the digital camera 1-1 or prior to the acquisition of images from the digital camera 1-2 from among the images photographed by the digital camera 1-1 or photographed by and then acquired from the digital camera 1-2.

In step S142, the display controller 164 shifts leftward all images displayed on the history display area 303 by one frame. In this way, the right-most frame becomes blank.

In step S143, the display controller 164 causes the image used to be displayed on the update image display area 302 (the image set to be non-displayable in step S141) to be displayed on the blank right-most frame.

In step S144, the display controller 164 displays the photographed or acquired image on the update image display area 302 and ends the process.

The update image (photographed later) from among the image photographed by own apparatus or photographed by and acquired from the partner apparatus is displayed on the update image display area 302. The images photographed by own apparatus or photographed by and acquired from the partner apparatus are displayed on the history display area 303 in the order of photographing. The order of photographing is recognized at a glance. Since the update image (photographed later) is displayed on the update image display area 302 in a size larger than the history display area 303, the user can view the detail of the update image.

When the recording medium 60 becomes full, in other words, no space is available in the recording medium 60, the photo-time photo share object 122 causes the LCD 20 to display a message notifying that the recording medium 60 is full. The client function process of FIG. 17 and the display process of FIG. 20 are not performed, and the images on the LCD 20 are not updated.

Figure 24:
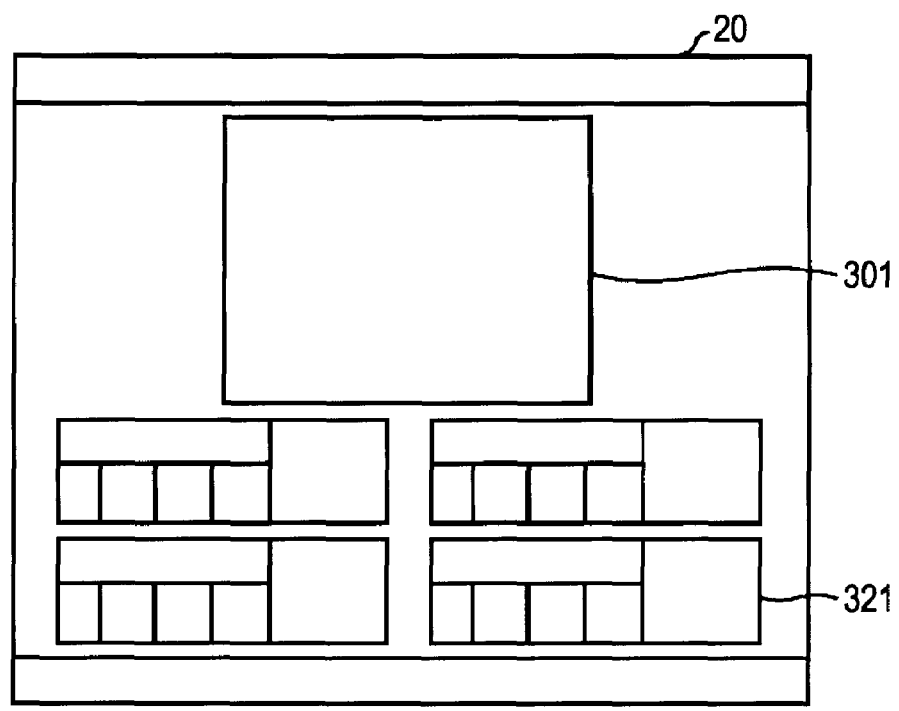
FIG. 24 illustrates another arrangement of display areas on the LCD screen in the photo-time photo share mode.

FIG. 24 illustrates another example of the display areas on the LCD 20 screen in the photo-time photo share mode. During the photo-time photo share mode, a subject image display area 301 and a history display area 321 are arranged on the LCD 20 screen.

The history display area 321 shows the images photographed by own apparatus and the images photographed by and acquired from the partner apparatus on a per device basis in the order of photographing.

Figure 25:
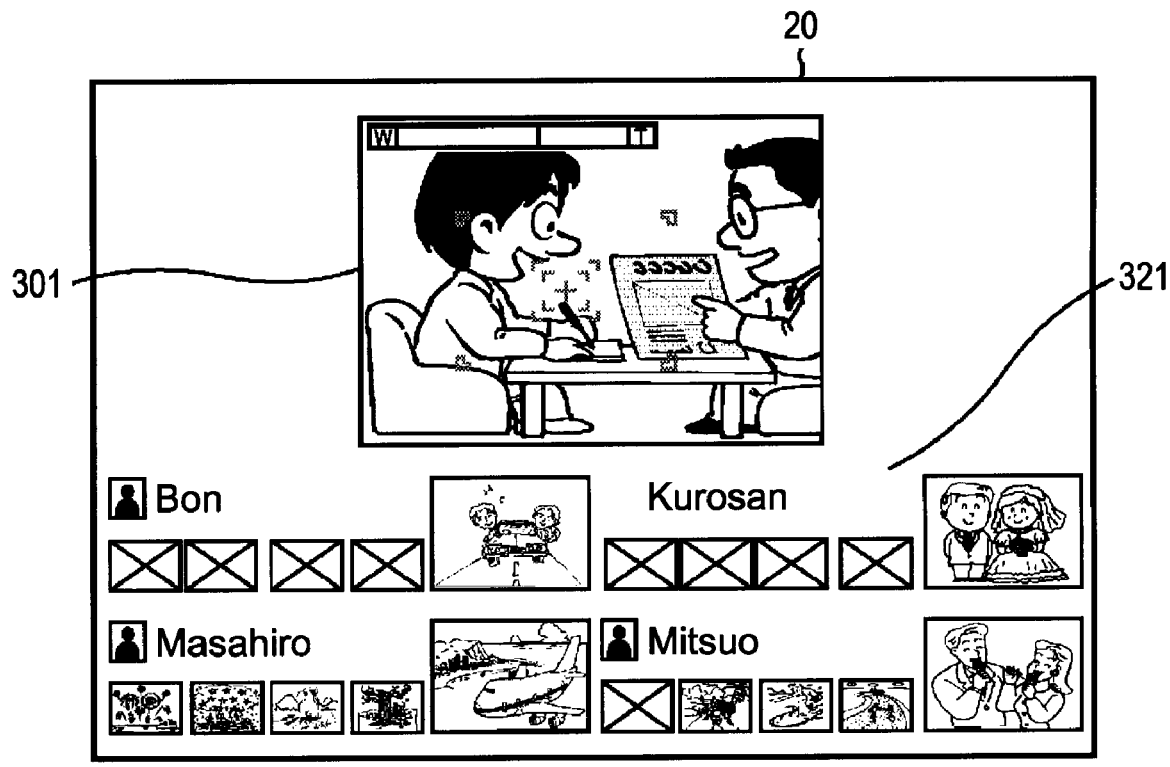
FIG. 25 illustrates another specific example of images displayed on the LCD in the photo-time photo share mode.
Figure 26:
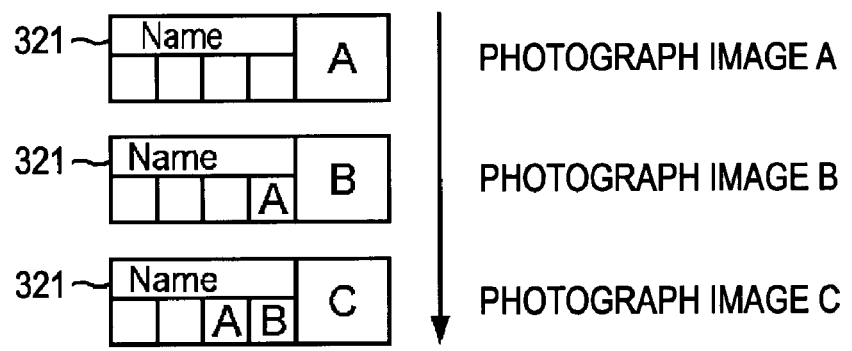
FIG. 26 illustrates the history display area.

FIG. 25 illustrates a specific example of images displayed on the history display area 321 in the LCD 20 screen in the photo-time photo share mode. As shown in FIG. 25, images photographed by own apparatus are horizontally displayed on an upper left portion of the history display area 321 in the order of photographing, images photographed by a partner named Masahiro are horizontally displayed on a lower left portion of the history display area 321 in the order of photographing, images photographed by a partner named Kurosan are horizontally displayed on an upper right portion of the history display area 321 in the order of photographing, and images photographed by a partner named Mitsuo are horizontally displayed on a lower right portion of the history display area 321 in the order of photographing.

When an image A is photographed, the photographed image A is displayed on the rightmost portion of the area of a partner who has photographed the image A in the history display area 321. When the partner having photographed the image A photographs an image B, the photographed image B is displayed on the rightmost portion of the area of the partner who has photographed the image A, to the right of the image A, in the history display area 321.

When the partner having photographed the images A and B photographs an image C, the photographed image C is displayed on the rightmost portion of the area of the partner who has photographed the images A and B, to the right of the image B, in the history display area 321. Thus, the image C is displayed to the right of the image B, and the image B is displayed to the right of the image A.

When the user himself photographs the image A, the photographed image A is displayed on the rightmost portion of own area of the history display area 321. When the user further photographs the image B, the photographed image B is displayed on the rightmost portion of own area of the history display area 321 with the image A displayed to the left of the image B.

When the user further photographs the image C, the photographed image C is displayed on the rightmost portion of own area of the history display area 321 with the image B displayed to the left of the image C and the image A displayed to the left of the image B.

From among the images in the partner area or own area of the history display area 321, the image photographed last is displayed in a larger size.

Figure 27:
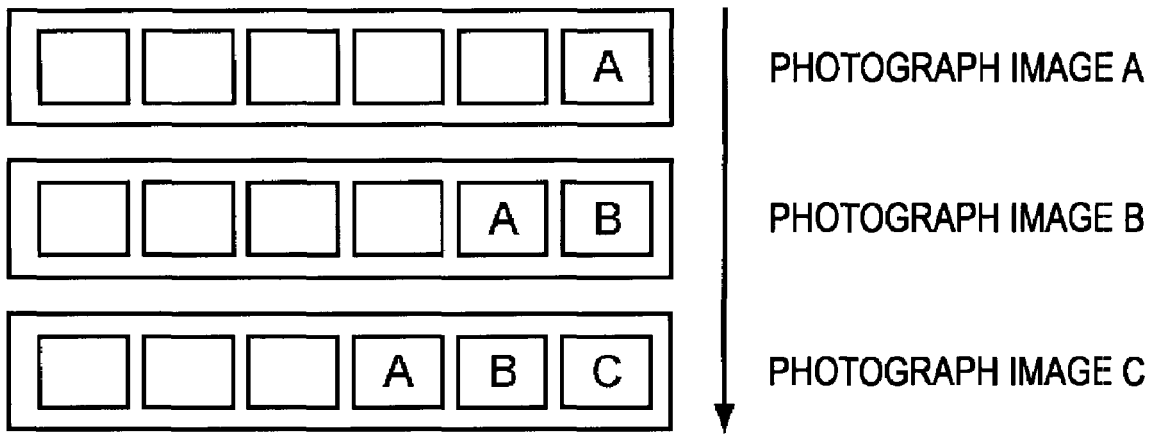
FIG. 27 illustrates the history display area.

Alternatively as shown in FIG. 27, the image photographed last may be displayed in the same size as the images displayed in the partner area or own area of the history display area 321.

Figure 28:
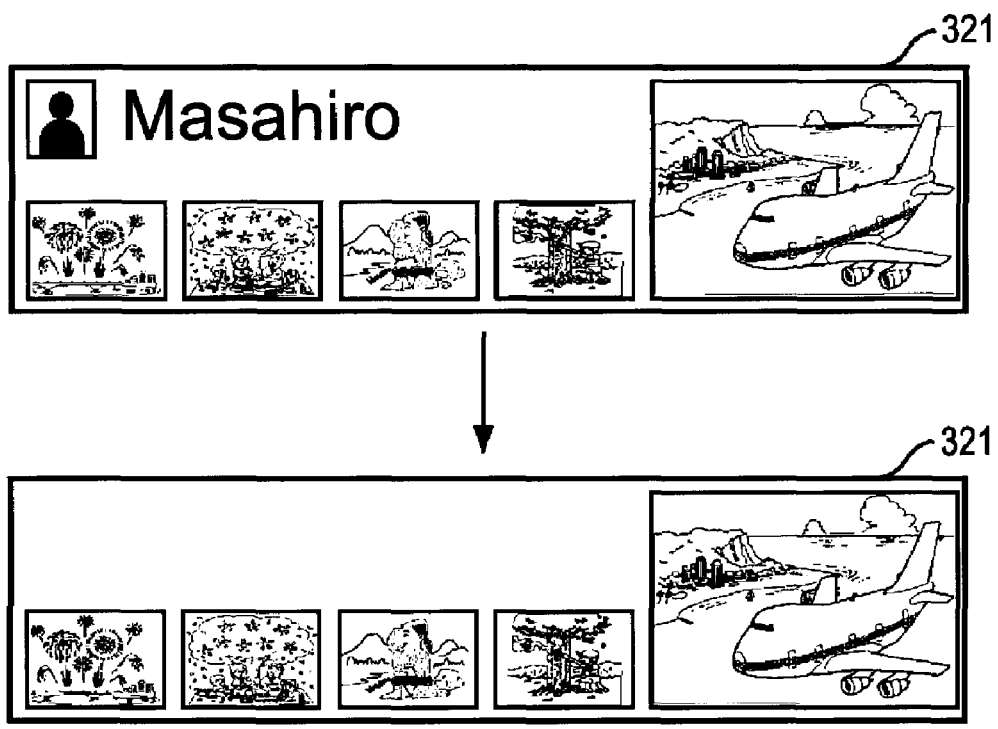
FIG. 28 illustrates images displayed when the connection partner cuts off connection with a network.

As shown in FIG. 28, the name of the partner may be erased from the history display area 321 without displaying an error message if the user performs a cutoff process to the connection with the network 2 or if an increasing distance with the partner cuts off the connection via the network 2.

For example, if the partner named Masahiro displayed on the history display area 321 performs the cutoff process with the network 2 or the connection with the partner via the network 2 is cut off, the name Masahiro is erased from the history display area 321.

The connection status of the partner apparatus interconnected in the photo-time photo share mode is thus immediately recognized. Since no error message is displayed, the user has no difficulty in photographing operation.

The server or the client may select images to be supplied or to be acquired in the photo-time photo share mode. A thumbnail image may be supplied without supplying a photographed original image. Similarly, a thumbnail image may be acquired without acquiring a photographed original image. After acquiring a thumbnail image, the user may determine whether to acquire the corresponding photographed original image.

During the photo-time photo share mode, a plurality of persons may photograph the same subject at the same event and share the photographed images. Since the image photographed by another digital camera 1 connected to own digital camera 1 via the network 2 is shared on the spot, time to share images using a mass storage device subsequent to the event is saved.

The view-time photo share mode is described below. During the view-time photo share mode, the digital camera 1 may operate as a server while also serving as a client. Each of the digital camera 1-1 in the view-time photo share mode and the digital camera 1-2 in the view-time photo share mode connected to the digital camera 1-1 may operate as a server while also operating as a client at the same time.

During the view-time photo share mode, the operation mode of the digital camera 1 as a server is also referred to as an image disclosure mode, and the mode of the digital camera 1 as a client is also referred to as an image acquisition mode. Even in the image disclosure mode, the digital camera 1 operates as a client in the background process. Even in the image acquisition mode, the digital camera 1 operates as a server in the background process.

When the user selects an image, the digital camera 1 as a server in the image disclosure mode discloses an image selected by the user to another digital camera 1 as a client in the image acquisition mode connected to the network 2. The client digital camera 1 in the image acquisition mode acquires a list of images disclosed by the server digital camera 1 connected to the network 2 from the server digital camera 1 in the image disclosure mode, acquires a thumbnail image of the disclosed image, and displays the thumbnail image. When the user selects the displayed thumbnail image, the client digital camera 1 in the image acquisition mode acquires and records the original image of the thumbnail image, namely, the disclosed image from the server digital camera 1.

For example, during the view-time photo share mode, a plurality of digital cameras 1 exchange and share images in accordance with the DLNA standard. During the view-time photo share mode, no other apparatuses than the digital cameras 1 supplying images and acquiring images are required.

With reference to FIGS. 29A-29C and 30A-30D, during the view-time photo share mode, the digital camera 1 operates in one of the image disclosure mode and the image acquisition mode, i.e., as one of the server and the client.

Figure 29A:
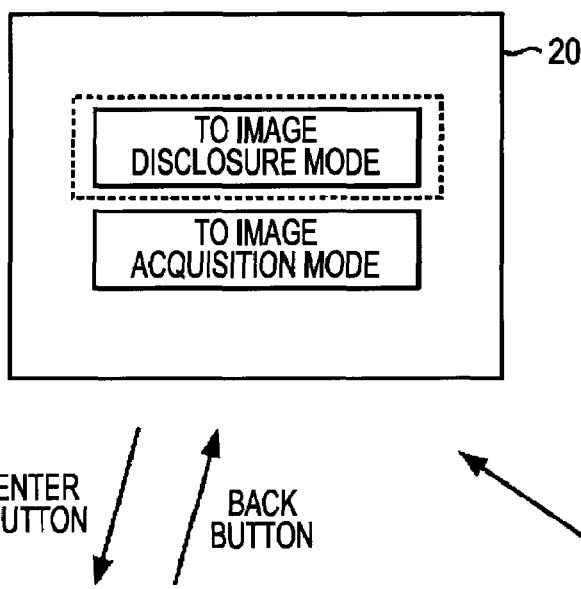
FIGS. 29A-29C illustrate a selection process of one of an image disclosure mode and an image acquisition mode.
Figure 29B:
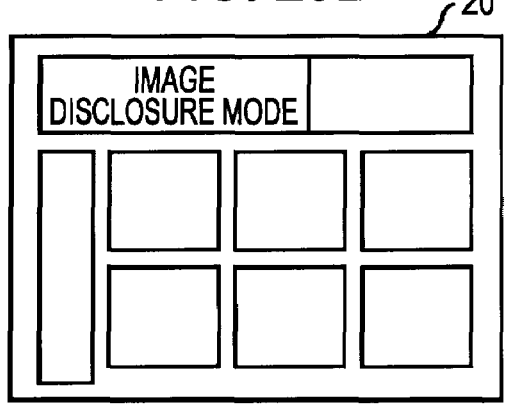
Figure 29C:
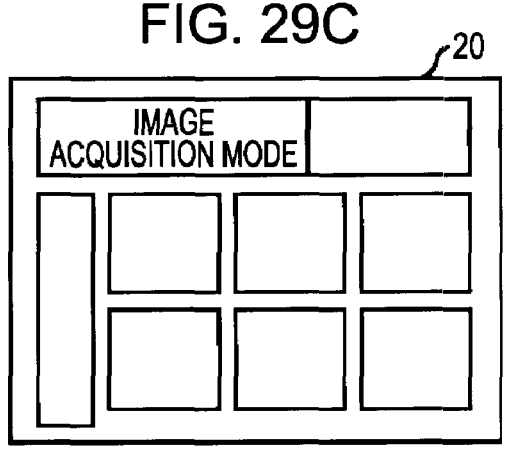
Figure 30A:
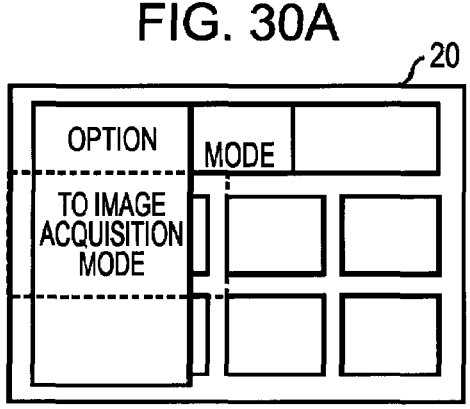
FIGS. 30A-30D illustrate the selection of one of the image disclosure mode and the image acquisition mode.
Figure 30B:
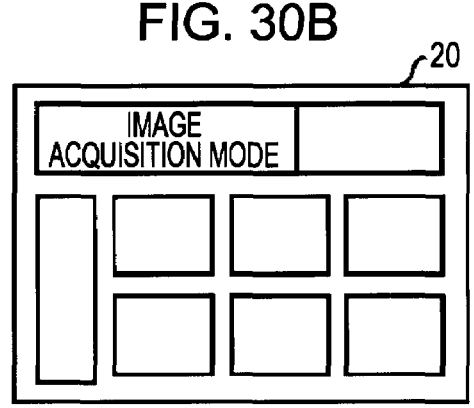
Figure 30C:
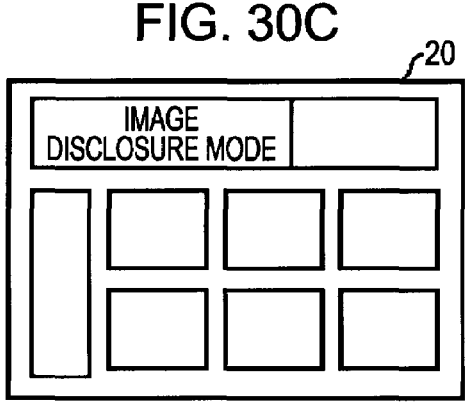
Figure 30D:
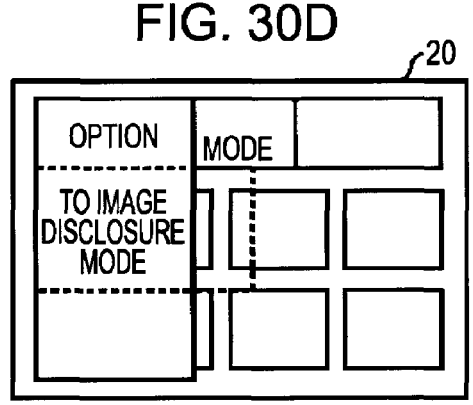

With reference to FIGS. 29A through 29C, the LCD 20 in the digital camera 1 displays a button for selecting the image disclosure mode and a button for selecting the image acquisition mode during the view-time photo share mode. An enter button of the operation buttons 19 may be pressed with the button for the image disclosure mode selected. The digital camera 1 is then transitioned to the image disclosure mode. The LCD 20 displays images in the image disclosure mode. A back button of the operation buttons 19 may be pressed in the image disclosure mode. The LCD 20 displays again the button for selecting the image disclosure mode and the button for selecting the image acquisition mode.

The enter button of the operation buttons 19 may be pressed with the button for the image acquisition mode selected. The digital camera 1 is then transitioned to the image acquisition mode. The LCD 20 displays images in the image acquisition mode. The back button of the operation buttons 19 may be pressed in the image acquisition mode. The LCD 20 displays again the button for selecting the image disclosure mode and the button for selecting the image acquisition mode.

With the digital camera 1 in the image disclosure mode of the view-time photo share mode as shown in FIGS. 30A-30D, the option button 22 might be pressed. The LCD 20 displays an option menu indicating a command to transition to the image acquisition mode. When the enter button of the operation buttons 19 is pressed with the command to transition to the image acquisition mode selected, the digital camera 1 transitions to the image acquisition mode, and the LCD 20 displays an image in the image acquisition mode.

With the digital camera 1 in the image acquisition mode of the view-time photo share mode, the option button 22 might be pressed. The LCD 20 displays an option menu indicating a command to transition to the image disclosure mode. When the enter button of the operation buttons 19 is pressed with the command to transition to the image disclosure mode selected, the digital camera 1 transitions to the image disclosure mode, and the LCD 20 displays an image in the image disclosure mode.

Figure 31:
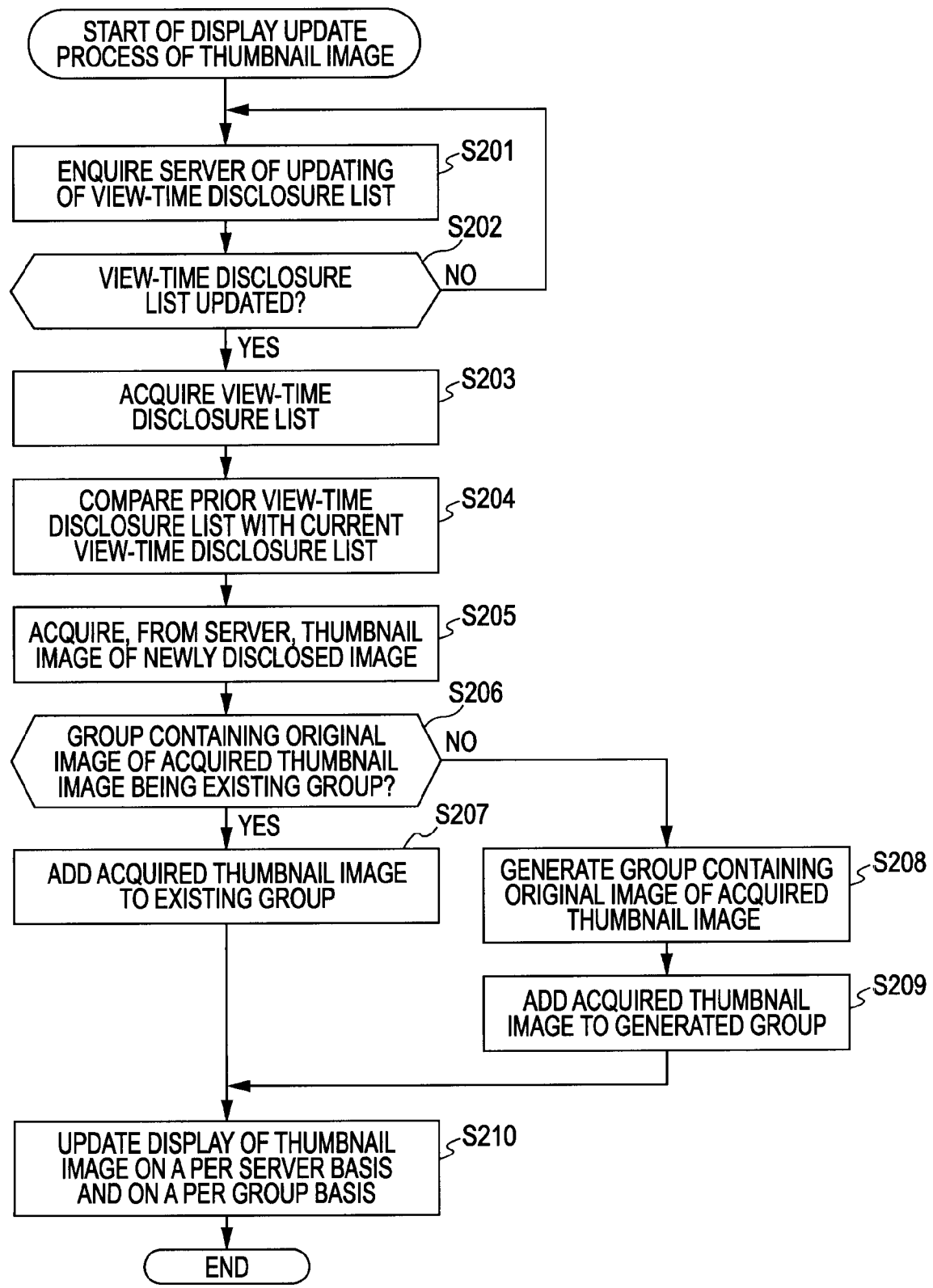
FIG. 31 is a flowchart illustrating an update process of the display of a thumbnail image.

FIG. 31 is a flowchart illustrating a display update process of the thumbnail image in the digital camera 1-1 as a client in the view-time photo share mode. In step S201, the view-time disclosure list acquisition unit 181 in the view-time photo share object 124 inquires the digital camera 1-2 as a server of the updating of the view-time disclosure list via the network 2.

The view-time disclosure list is read in accordance with the DLNA standard.

FIG. 32 illustrates the view-time disclosure list. The view-time disclosure list contains an address in the recording medium 60, corresponding to a content identification ID identifying a predetermined image to be provided to the partner apparatus, and storing the image, an address in the recording medium 60 storing a thumbnail image of the image to be provided to the partner apparatus and information indicating an encoding method of the image to be provided to the partner apparatus. The view-time disclosure list also contains a group name identified by a group ID and a content ID of each image. The group name is arranged for each group ID identifying a group in which the images are sorted.

In the view-time disclosure list of FIG. 32, the address is described by a path composed of a file name of a file storing the photographed image and/or the thumbnail image thereof and a folder storing the file.

The view-time disclosure list of FIG. 32 includes xxxxx/xxxxxxx/xxxxxxxxx.jpg corresponding to a content ID 0000001 as a path (address) storing the thumbnail image, xxxxxxx/xxxxxxx/xxxxxxxxx.jpg as a path (address) storing the image to be provided to the partner apparatus, and xxxxxxxx as information indicating the encoding method of the image ("image type"). The view-time disclosure list of FIG. 32 also includes yyyyy/yyyyyy/yyyyyyyyy.jpg corresponding to a content ID 0000002 as a path (address) storing the thumbnail image, yyyyyyy/yyyyyyy/yyyyyyyyy.jpg as a path (address) storing the image to be provided to the partner apparatus, and yyyyyyy as information indicating the encoding method of the image ("image type"). The view-time disclosure list of FIG. 32 includes zzzzz/zzzzzz/zzzzzzzzz.jpg corresponding to a content ID 0000003 as a path (address) storing the thumbnail image, zzzzzzz/zzzzzzz/zzzzzzzzz.jpg as a path (address) storing the image to be provided to the partner apparatus, and zzzzzzzz as information indicating the encoding method of the image ("image type").

The view-time disclosure list of FIG. 32 contains the group name xxxxxxxxxx for the group ID 0001, the content ID 00001, the content ID 00002, and the content ID 00003. An image identified by the content ID 00001, an image identified by the content ID 00002, and an image identified by the content ID 00003 belong to the group having the group name XXXXXXXXXX identified by the group ID 0001.

The view-time disclosure list of FIG. 32 also contains a group name AAAAAAAAAA corresponding to a group ID 0002 and a content ID 00001. An image identified by the content ID 00001 belongs to the group having the group name AAAAAAAAAA identified by the group ID 0002.

The view-time disclosure list acquisition unit 181 inquires the digital camera 1-2 as the server of the view-time disclosure list via the network 2. The digital camera 1-2 returns to the digital camera 1-1 via the network 2 a reply as to whether the view-time disclosure list is updated. The view-time disclosure list acquisition unit 181 acquires the reply as to whether the view-time disclosure list is updated.

In step S202, the view-time disclosure list acquisition unit 181 determines from the reply from the digital camera 1-2 as the server whether the view-time disclosure list is updated. If it is determined in step S202 that the view-time disclosure list is not updated, the updating of the display of the thumbnail image is not necessary. Processing returns to step S201 to repeat step S201 and step S202.

If it is determined in step S202 that the view-time disclosure list is updated, processing proceeds to step S203. The view-time disclosure list acquisition unit 181 acquires the view-time disclosure list from the digital camera 1-2 via the network 2.

For example, the view-time disclosure list acquisition unit 181 acquires the view-time disclosure list by reading the view-time disclosure list at the address in the memory space of the digital camera 1-2 as the server designed beforehand to store the view-time disclosure list. More in detail, the view-time disclosure list acquisition unit 181 commands the communication driver 103 to read the view-time disclosure list. The communication driver 103 reads the view-time disclosure list from the address in the memory space of the digital camera 1-2 as the server storing the view-time disclosure list. The communication driver 103 supplies the read view-time disclosure list to the view-time disclosure list acquisition unit 181.

The view-time disclosure list acquisition unit 181 requests via the network 2 the digital camera 1-2 as the server to transmit the view-time disclosure list. The digital camera 1-2 as the server transmits the requested view-time disclosure list to the digital camera 1-1 via the network 2. The view-time disclosure list acquisition unit 181 causes the communication driver 103 and the communication I/F 49 to receive the transmitted view-time disclosure list. The view-time disclosure list acquisition unit 181 thus acquires the view-time disclosure list.

In step S204, the thumbnail image acquisition unit 182 in the view-time photo share object 124 compares the previously acquired view-time disclosure list with the currently acquired view-time disclosure list. The thumbnail image acquisition unit 182 extracts, from the currently acquired view-time disclosure list, an address in the view-time disclosure list storing a newly disclosed image and identified by a content ID newly added to the view-time disclosure list, an address storing a thumbnail image of the newly disclosed image, a group ID identifying a group to which the newly disclosed image belongs to, and a name of the group.

In step S205, the thumbnail image acquisition unit 182 acquires the thumbnail image of the newly disclosed image from the digital camera 1-2.

The thumbnail image acquisition unit 182 acquires the thumbnail image of the newly disclosed image by reading the thumbnail image at the address in the memory space of the digital camera 1-2 as the server and storing the thumbnail image of the newly disclosed image. More in detail the thumbnail image acquisition unit 182 commands the communication driver 103 to read the thumbnail image at the address storing the thumbnail image of the newly disclosed image. The communication driver 103 causes the communication I/F 49 to read via the network 2 the thumbnail image at the address in the memory space of the digital camera 1-2 as the server storing the thumbnail image of the newly disclosed image. The communication driver 103 supplies the read thumbnail image to the thumbnail image acquisition unit 182.

By specifying the address in the memory space of the digital camera 1-2 as the server via the network 2, the thumbnail image acquisition unit 182 requests the digital camera 1-2 as the server to transmit the thumbnail image. The digital camera 1-2 as the server transmits the requested thumbnail image to the digital camera 1-1 via the network 2. The thumbnail image acquisition unit 182 causes the communication driver 103 and the communication I/F 49 to receive the transmitted thumbnail image. The communication driver 103 thus acquires the thumbnail image.

In step S206, the sorter 186 in the view-time photo share object 124 determines from the group ID identifying the group of the newly disclosed image extracted in step S204 whether the group of the image resulting in the thumbnail image is an existing group.

If it is determined in step S206 that the group of the image resulting in the thumbnail image is the existing group, processing proceeds to step S207. The sorter 186 adds the thumbnail image acquired in step S205 to the existing group identified by the group ID extracted in step S204. Processing proceeds to step S210. For example, a group list includes a content ID identifying an image and a group ID identifying a group to which an image identified by the content ID belongs. The sorter 186 adds the thumbnail image to the existing group by arranging in the group list a content ID identifying the original image of the acquired thumbnail image and the extracted group ID identifying the existing group in association with each other.

For example, the sorter 186 adds the thumbnail image to the existing group by storing the thumbnail image in a folder having the same name as the group name identified by the extracted group ID.

If it is determined in step S206 that the group of the original image of the thumbnail image is not the existing group, processing proceeds to step S208. The sorter 186 generates a group to which the original image of the acquired thumbnail image belongs to. In step S208, the sorter 186 generates the group to which the original image of the acquired thumbnail image belongs to by arranging the extracted group ID in the group list. The group list contains the content ID identifying the image and the group ID identifying the group to which the image identified by the content ID belongs. The group list includes, in association with the group ID, the group name identified by the group ID.

By generating a folder having the same name as the group name identified by the extracted group ID, the sorter 186 generates the group of the original image of the thumbnail image.

In step S209, the sorter 186 adds the thumbnail image acquired in step S205 to the group generated in step S208. Processing proceeds to step S210. The sorter 186 adds the thumbnail image to the generated group by arranging the group list with the group ID newly arranged in step S208 in association with the content ID identifying the original image of the acquired thumbnail image.

For example, the sorter 186 adds the acquired thumbnail image to the generated group by storing the thumbnail image in a folder having the same name as the group name identified by the group ID extracted in step S209.

In step S210, the display controller 183 in the view-time photo share object 124 updates the display of the thumbnail image on the LCD 20 on a per server basis and on a per group basis. Processing thus ends.

Figure 33:
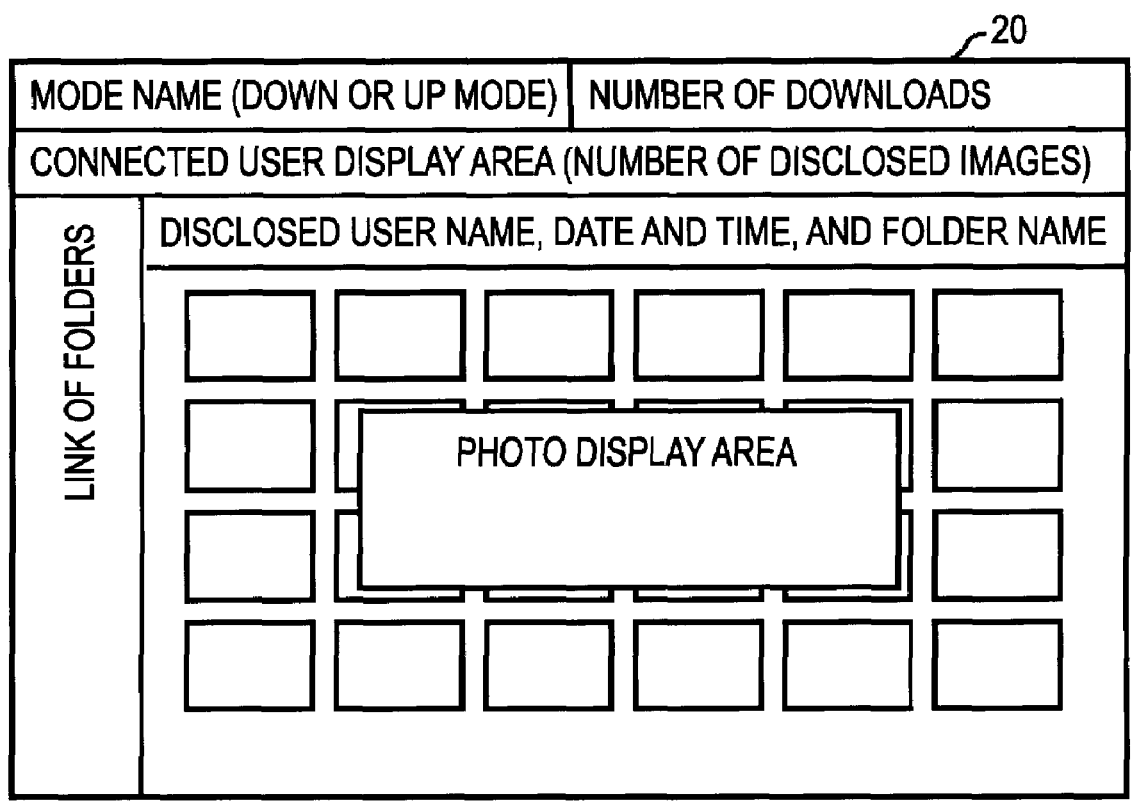
FIG. 33 illustrates the display screen displaying a thumbnail image in the photo-time photo share mode.

FIG. 33 illustrates an example of thumbnail image in the view-time photo share mode. When the thumbnail image is displayed during the view-time photo share mode, the display screen of the LCD 20 displays an area for a mode name of one of the image acquisition mode and the image disclosure mode, an area for the number of received thumbnail images and the number of received images, an area for a partner name, and an area for the thumbnail image. The area for the partner name displays the number of disclosed images on a per partner basis with the partner name labeling the image.

During the image acquisition mode, the area for the thumbnail image displays the thumbnail images on a per server basis and on a group basis, i.e., the thumbnail images linked on a per partner basis and on a per group basis. Displayed to the left of the area for the thumbnail image is an image representing linking of thumbnail images that are displayed to be linked. An image representing linking is similar to an image representing linking of folders. More specifically, the thumbnail images of the images linked to a single group (sorted to a single group) are displayed as if the thumbnail images are stored in a virtual folder linked to that group.

The name of the partner, the date and time of photographing of the image, and the group name (folder name) are displayed above the linking of the thumbnail images on a per partner basis or on a per group basis in the area for displaying the thumbnail image.

For example, a user named John might sort (store) photographs (images) in a group (folder) having a group (folder) name "Nov. 29, 2005, family vacations." When a photograph (image) sorted (stored) in the group (folder) is disclosed, the LCD 20 of a digital camera 1 of another user connected to the digital camera 1 of John's displays "John—Nov. 29, 2005, family vacations" as a group (folder) name of a group (folder) into which the thumbnail images acquired from the digital camera 1 of John's are sorted (stored).

Figure 34:
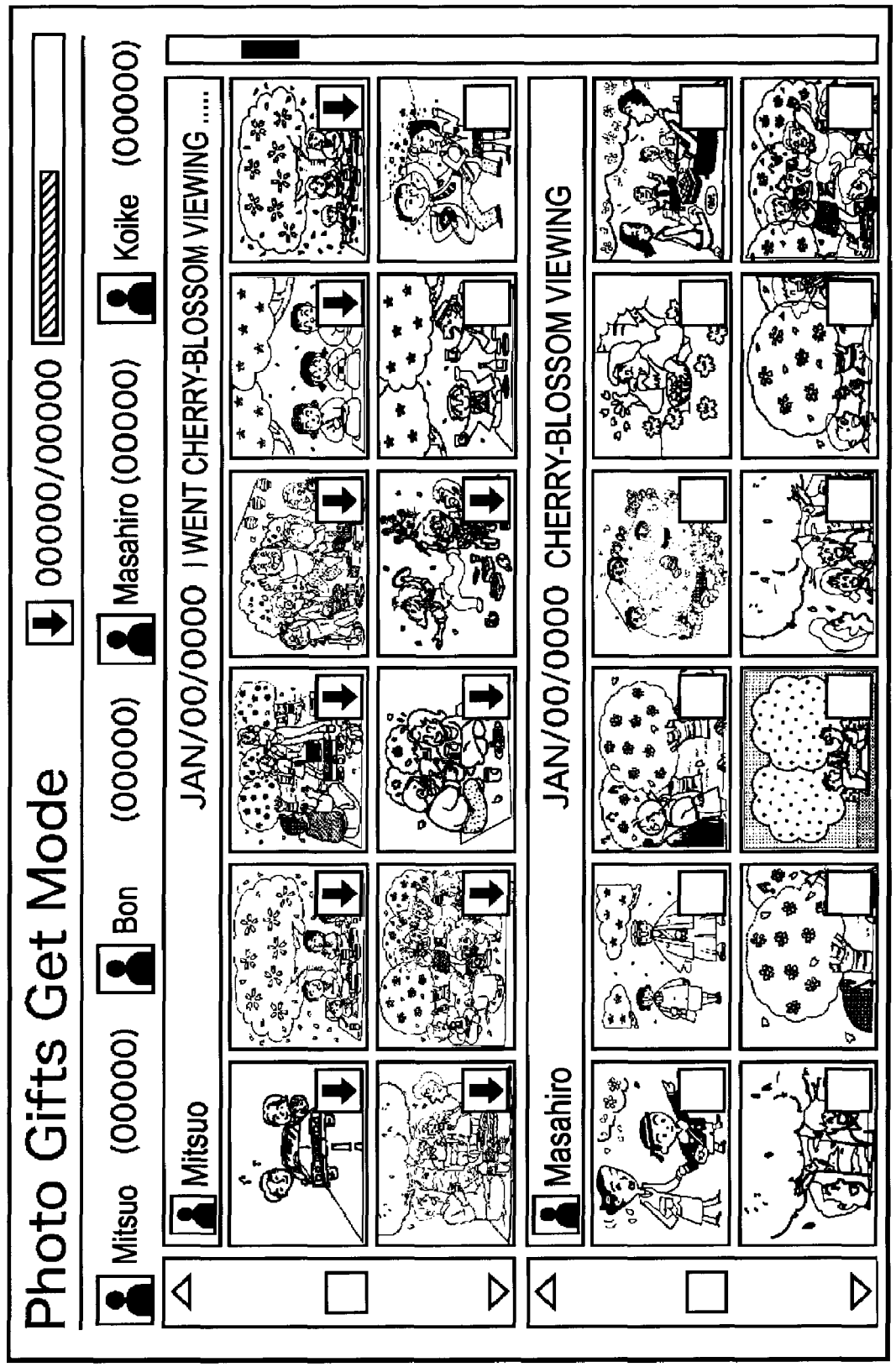
FIG. 34 illustrates the display screen displaying a thumbnail image in the image acquisition mode.

FIG. 34 illustrates a specific example of the thumbnail images in the image acquisition mode of the view-time photo share mode. As shown in FIG. 34, a mode name "photo gifts get mode" indicating the image acquisition mode is displayed on an area for a mode name. As shown in FIG. 34, an area displaying the number of received thumbnail images and the number of received images also displays a bar graph indicating a ratio of the number of received thumbnail images to the number of received images together with the number of received thumbnail images and the number of received images.

As shown in FIG. 34, the area for the partner name displays "Mitsuo," "Bon," "Masahiro," and "Koike."

As shown in FIG. 34, thumbnail images are displayed in the area for displaying the thumbnail image to be linked to a server having the name "Mitsuo," and a group "I went cherry-blossom viewing." Thumbnail images are also displayed to be linked to a server having the name "Masahiro," and a group "Cherry-blossom viewing."

The groups in the area for displaying the thumbnail image are displayed in the order of group addition in the updating of the view-time disclosure list.

For example, a thumbnail image may be added to the group generated in step S208. In step S210, the display controller 183 in the view-time photo share object 124 displays the thumbnail images linked to the generated group below the thumbnail images linked to another group in the area for the thumbnail image.

If the thumbnail image is added to the existing group in step S207, the display controller 183 in the view-time photo share object 124 displays the thumbnail image to be linked to that group in step S210.

The thumbnail image may be sorted by server name or group name, and the thumbnail images may be displayed according to the order of sorting results.

The linking of the thumbnail images is indicated by a center check box and an upward pointing triangle and a downward pointing triangle above and below the center check box, arranged to the left of the linked thumbnail images. When the upward pointing triangle is selected by the operation unit 46, the linked thumbnail images (thumbnail images of the group) are scrolled upward. When the downward pointing triangle is selected by the operation unit 46, the linked thumbnail images (thumbnail images of the group) are downward scrolled.

As shown in FIG. 34, a scroll bar arranged to the right of the area for the thumbnail image can be used to scroll the displayed thumbnail images by a link of the thumbnail images. More specifically, if the scroll bar is shifted upward, one link of thumbnail images is shifted downward in the area for the thumbnail image, and an upper link of thumbnail images is displayed in the area for the thumbnail image. If the scroll bar is shifted downward, one link of thumbnail images is shifted upward in the area for the thumbnail image, and lower link of thumbnail images is displayed in the area for the thumbnail image.

As shown in FIG. 34, a check box attached to each thumbnail image is used to receive (acquire) the original image of the thumbnail image and indicate the receiving status (acquisition status) of the original image. The check box will be described in detail later.

Figure 35:
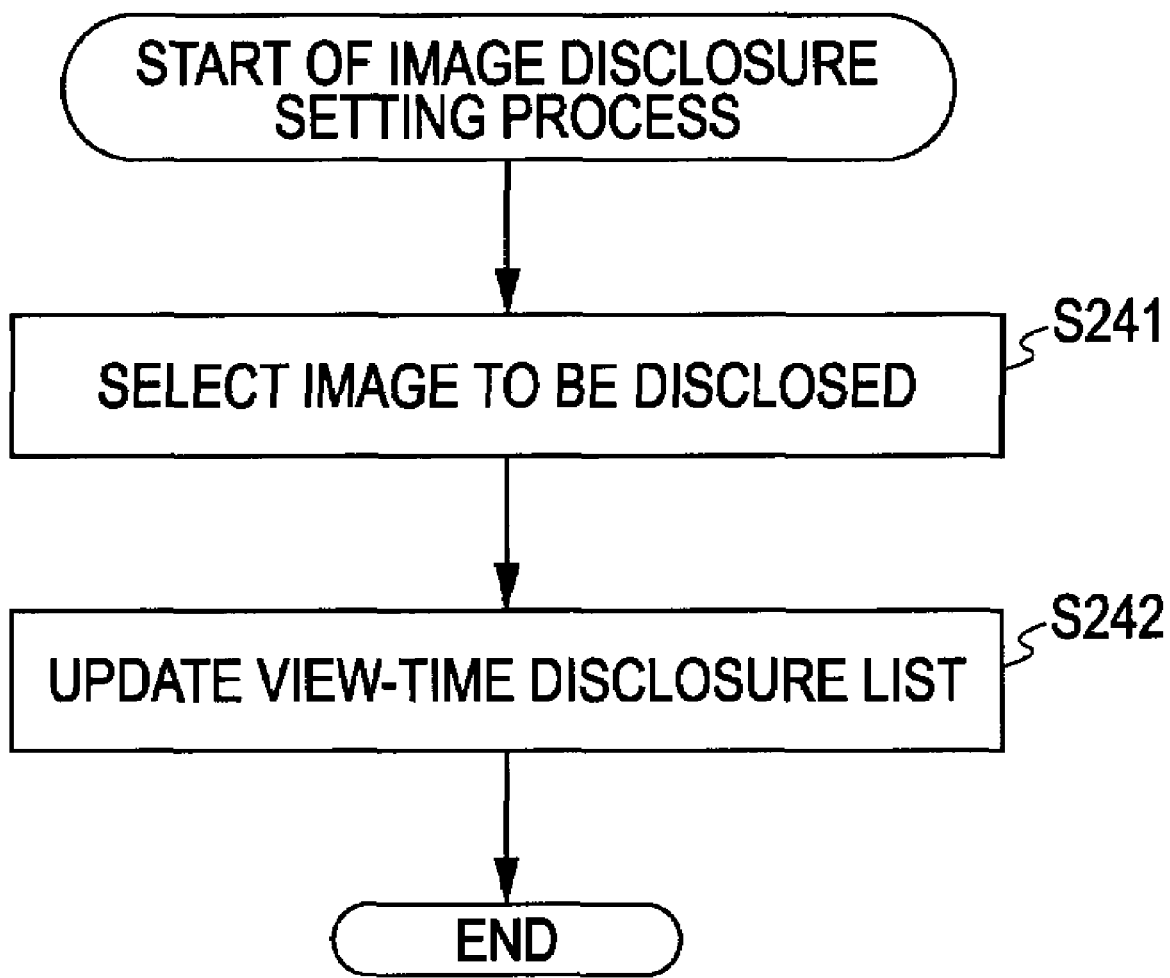
FIG. 35 is a flowchart of an image disclosure setting process.

FIG. 35 is a flowchart of an image disclosure setting process of the digital camera 1-1 as the server in the view-time photo share mode. In step S241, the selector 184 in the view-time photo share object 124 selects an image to be disclosed.

Figure 36:
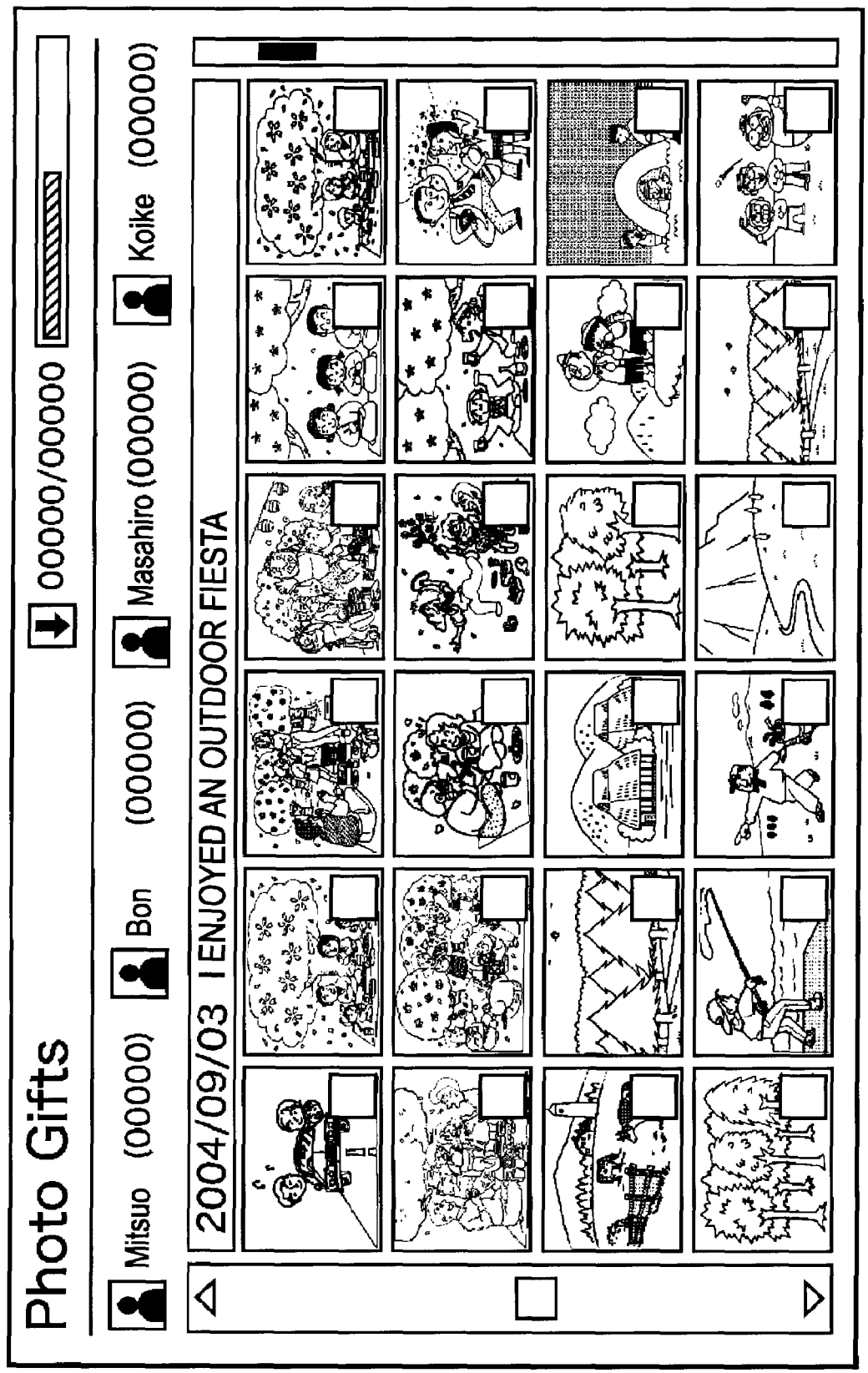
FIG. 36 illustrates a specific display screen displaying a thumbnail image in an image disclosure mode.

FIG. 36 illustrates a specific example of thumbnail images in the image disclosure mode of the view-time photo share mode. As shown in FIG. 36, an area for a mode name displays a mode name "Photo Gifts" indicating the image disclosure mode. As shown in FIG. 36, an area displaying the number of received thumbnail images and the number of received images also displays a bar graph indicating the ratio of the number of received thumbnail images to the number of received images in the background process as a client together with the number of received thumbnail images and the number of received images.

As shown in FIG. 36, the area for the partner name displays "Mitsuo," "B on," "Masahiro," and "Koike."

As shown in FIG. 36, thumbnail images are linked to a group "I enjoyed an outdoor fiesta" in the area for displaying the thumbnail image.

The linking of the thumbnail images is indicated by a center check box and an upward pointing triangle and a downward pointing triangle above and below the center check box, arranged to the left of the linked thumbnail images. When the upward pointing triangle is selected by the operation unit 46, the linked thumbnail images are scrolled upward. When the downward pointing triangle is selected by the operation unit 46, the linked thumbnail images are downward scrolled.

As shown in FIG. 36, a scroll bar arranged to the right of the area for the thumbnail image can be used to scroll the displayed thumbnail images by a link of the thumbnail images. More specifically, if the scroll bar is shifted upward, one link of thumbnail images is shifted downward in the area for the thumbnail image, and an upper link of thumbnail images is displayed in the area for the thumbnail image. If the scroll bar is shifted downward, one link of thumbnail images is shifted upward in the are for the thumbnail image, and a lower link of thumbnail images is displayed in the area for the thumbnail image.

As shown in FIG. 36, a check box is attached to each thumbnail image.

If the check box of a thumbnail image is not checked as shown in FIG. 37, the original image of the thumbnail image is not disclosed. By checking the check box of the thumbnail image, the original image of the thumbnail image is disclosed.

By checking the check marked check box, the disclosure of the original image of the thumbnail image is canceled.

As shown in FIG. 35, the selector 184 in the view-time photo share object 124 selects in step S241 an image to be disclosed as an original image of a thumbnail image having a check marked check box.

In step S242, the view-time disclosure list generating and updating unit 187 in the view-time photo share object 124 updates the view-time disclosure list. Processing thus ends. For example, in step S242, the view-time disclosure list generating and updating unit 187 adds to the view-time disclosure list the content ID for identifying the image selected in step S241, the address storing the image, the address storing the thumbnail image of the image, and the information indicating the encoding method of the image. In this case, the view-time disclosure list generating and updating unit 187 organizes the view-time disclosure list by adding to the view-time disclosure list the group ID identifying the group of the image in association with the content ID identifying the selected image.

To disclose a new image in a state with no other image disclosed, the view-time disclosure list generating and updating unit 187 generates a view-time disclosure list in step S242. The view-time disclosure list contains the content ID identifying the image selected in step S241, the address storing the image, and the address storing the thumbnail image of the image, and the information indicating the encoding method of the image.

If the image is set to be disclosed in the image disclosure mode, the view-time disclosure list is generated or updated. Another digital camera 1 as the client can acquire the image set to be disclosed.

The acquisition of the original image of the thumbnail image is described below.

Figure 38:
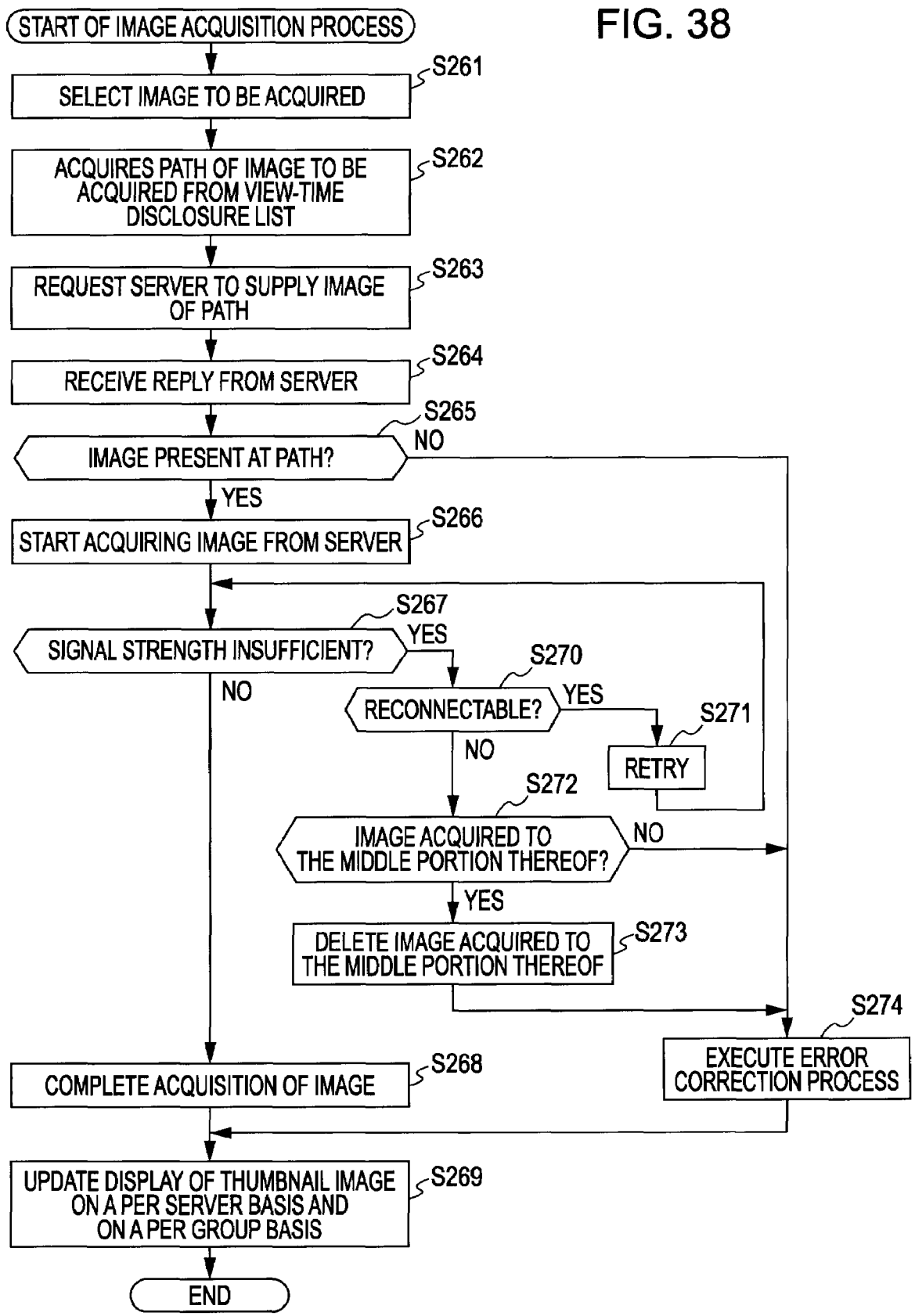
FIG. 38 is a flowchart illustrating of an image acquisition process.

FIG. 38 is a flowchart illustrating an image acquisition process of the digital camera 1-1 as the client in the view-time photo share mode. In step S261, the selector 184 in the view-time photo share object 124 selects an image to be acquired. For example, in step S261, the selector 184 selects, as the image to be acquired, the original image of the thumbnail image having the check box check marked in the image acquisition mode.

Figure 39:
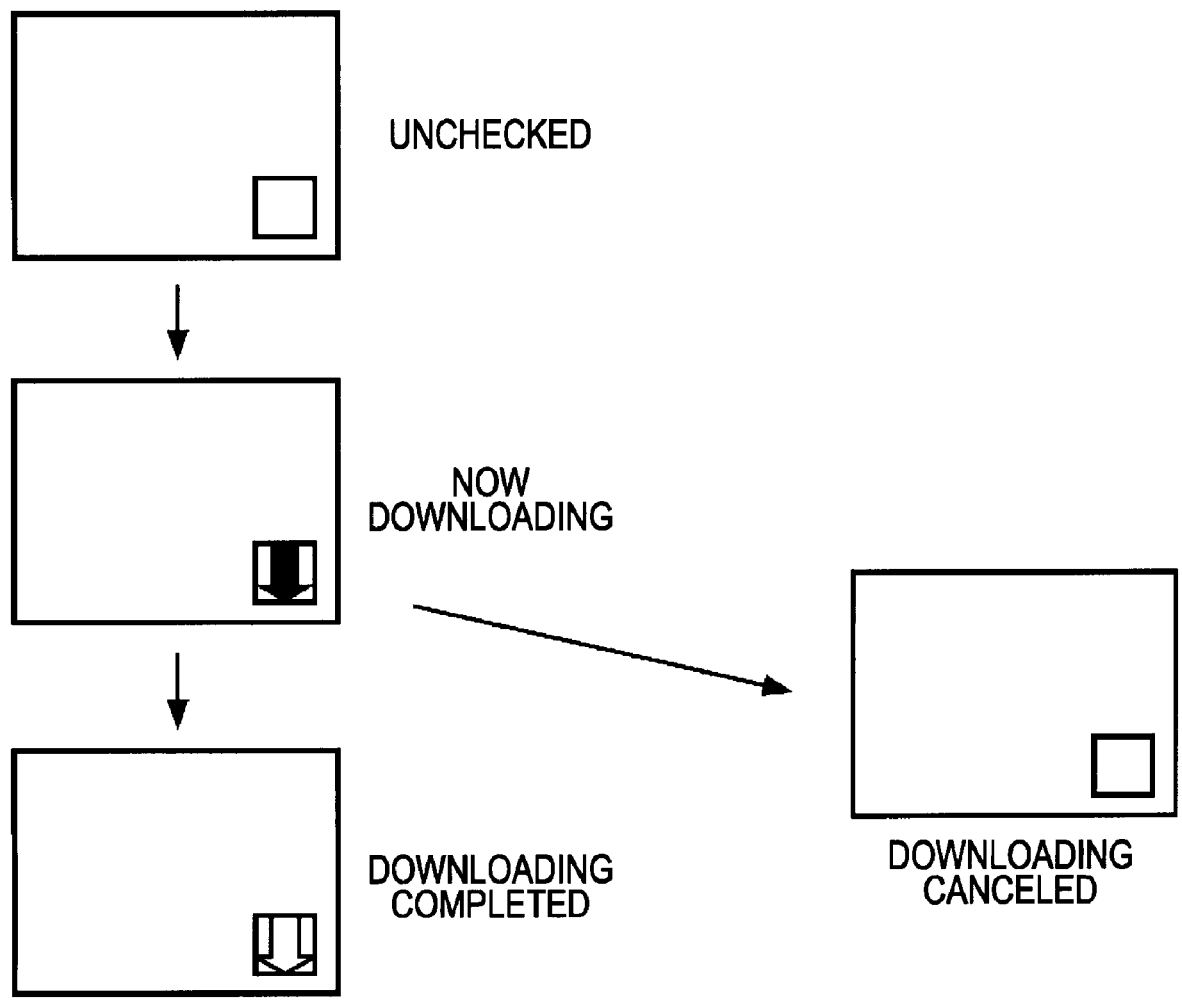
FIG. 39 illustrates how a check box of the thumbnail image is checked in the image acquisition mode.

If the check box of the thumbnail image in the image acquisition mode of the view-time photo share mode is not checked as shown in FIG. 39, the digital camera 1-1 as the client neither selects the image as the original image of the thumbnail image nor acquires the original image of the thumbnail image from the digital camera 1-2 as the server.

If the check box of the thumbnail image in the image acquisition mode of the view-time photo share mode is checked, the digital camera 1-1 as the client selects the image as the original image of the thumbnail image and acquires the original image of the selected thumbnail image from the digital camera 1-2 as the server.

In step S262, the image acquisition unit 185 acquires the path of the acquired image. For example, in step S262, the image acquisition unit 185 acquires from the view-time disclosure list the path of the image as an example of the address storing the original image of the thumbnail image having the check marked check box.

The view-time disclosure list is already acquired in step S203.

In step S263, the image acquisition unit 185 requests, via the network 2, the digital camera 1-2 to supply the image of the path. In step S264, the image acquisition unit 185 causes the communication driver 103 and the communication I/F 49 to receive the reply from the digital camera 1-2 via the network 2.

In step S265, the image acquisition unit 185 determines from the reply from the digital camera 1-2 as the server whether the image is present in the path. If it is determined in step S265 that the image is present in the path, processing proceeds to step S266. The image acquisition unit 185 starts acquiring the image from the digital camera 1-2 as the server via the network 2.

An arrow symbol is displayed in the check box of the thumbnail image while the digital camera 1-1 as the client is acquiring (downloading) the original image of the thumbnail image from the digital camera 1-2 as the server via the network 2. The user of the digital camera 1-1 as the client can know that the original image of the thumbnail image labeled with the arrow symbol is currently being downloaded.

In step S267, the image acquisition unit 185 determines from information from the communication driver 103 whether the signal strength of the radio wave as a transmission medium of the network 2 is sufficient. If it is determined in step S267 that the signal strength of the radio wave is sufficient, the acquisition of the image from the digital camera 1-2 via the network 2 is continuously performed. Upon receiving the entire image, the image acquisition unit 185 ends the acquisition of the image in step S268. The image acquisition unit 185 stores the acquired image onto the recording medium 60. The sorter 186 sorts the acquired image to the group which is sorted by adding the thumbnail image of the image thereto in one of steps S207 and S209.

In step S269, the display controller 183 updates the display of the thumbnail image on a per server basis and on a per group basis. Processing thus ends.

When the acquisition of the original image of the thumbnail image is completed, an arrow symbol is displayed in color different from the color indicating downloading operation on the check box of the thumbnail image. The user of the digital camera 1-1 can thus know completion of the downloading of the original image of the thumbnail image.

If the connection is cut off or the signal strength of the radio wave becomes insufficient, processing proceeds to step S270.

The image acquisition unit 185 determines based on the information from the communication driver 103 whether the digital camera 1-1 is reconnectable via the network 2. If it is determined in step S270 that the digital camera 1-1 is reconnectable via the network 2, processing proceeds to step S271. The image acquisition unit 185 causes the communication driver 103 and the communication I/F 49 to reconnect via the network 2, and retry acquiring the original image. Processing returns to step S267 to repeat step S267 and subsequent steps.

If it is determined in step S270 that the digital camera 1-1 is not reconnectable via the network 2, processing proceeds to step S272. The image acquisition unit 185 determines whether the image has been acquired to the middle portion thereof. If it is determined in step S272 that the image has been acquired to the middle portion thereof, processing proceeds to step S273. The image acquisition unit 185 deletes the image that has been acquired to the middle portion thereof. In step S274, the image acquisition unit 185 and the display controller 183 perform an error correction process, such as causing the LCD 20 to display an error message. Processing proceeds to step S269.

If it is determined in step S272 that the image has not been acquired to the middle portion thereof, processing proceeds to step S274 with step S273 skipped. The error correction process is thus performed.

The image selected with reference to the thumbnail image is acquired.

By re-checking the check marked check box, the acquisition of the original image of the thumbnail image is canceled. As shown in FIG. 39, the arrow symbol displayed in the check box is erased. The check box with the arrow symbol thereof erased can be checked again to acquire the original image of the thumbnail image.

A command to end the view-time photo share mode might be issued from one of the client and the server in the middle of the image acquisition from the server. In that case, a screen to confirm whether to cut off the connection is displayed. The user can quit or continue the acquisition of the image by selecting a "execute cut-off" button (command) or a "cancel cut-off" button (command) displayed on the screen.

The images to be acquired from the server can be individually selected. Alternatively, the linked thumbnail images can be selected together at a time.

When the center check box indicating the linking of the thumbnail images arranged to the left of the linked thumbnail images is checked as shown in FIGS. 40A-40E, the check boxes of all linked thumbnail images are checked, and the original images of the linked thumbnail images are acquired at a time.

When the center check box indicating the linking of the thumbnail images arranged to the left of the linked thumbnail images is checked even with one of the check boxes of the linked thumbnail images checked, the check boxes of all linked thumbnail images are checked, and the original images of the linked thumbnail images are acquired at a time.

All check boxes of the linked thumbnail images might be checked. In that case, the acquisition of the original image of a thumbnail image can be individually canceled by checking the check box of that thumbnail image.

The acquisition of the original images of the linked thumbnail images is canceled at a time by checking the center check box indicating the linking of the thumbnail images.

Figure 41:
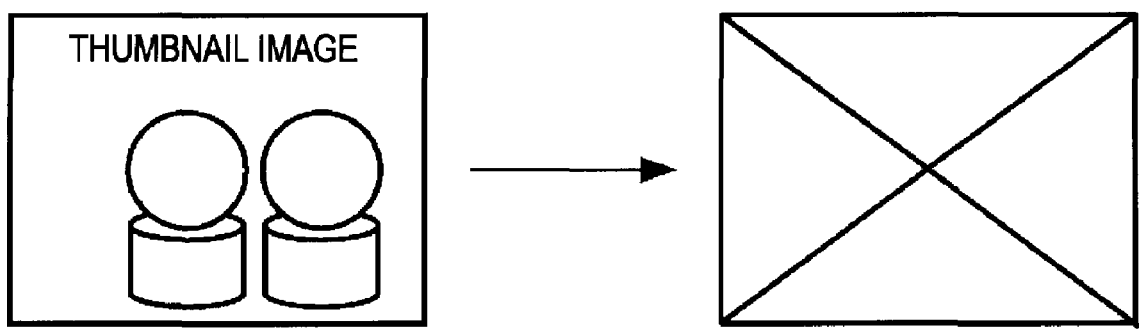
FIG. 41 illustrates an image with the disclosure thereof being canceled.

When the disclosure of the original image of the thumbnail image is canceled, the display of the thumbnail image is not immediately updated. The disclosure of the original image of the thumbnail image updated as described with reference to the flowchart of FIG. 31 might be canceled before the image acquisition process. In step S269 as shown in FIG. 41, the display controller 183 updates the thumbnail image to an image to indicate that the disclosure of the image has been canceled.

The user of the digital camera 1-1 as the client can know that the disclosure of the original image of the thumbnail image has been canceled.

As described above, the digital camera 1 can share (exchange) images recorded on the recording medium 60 on another digital camera 1 connected thereto via the network 2 during the view-time photo share mode. This arrangement eliminates the need for the user to exchange images with the use of a mass storage device.

The view-time photo share mode is described below. The view-time photo share mode is free from a screen switching operation. In other words, an image disclosure operation to the digital camera 1 and an image acquisition operation to the digital camera 1 are performed on a single screen.

During the view-time photo share mode, the LCD 20 displays an image different from the images of FIGS. 29A-29C and 30A-30D.

FIG. 42 is a block diagram illustrating a view-time photo share object 351 forming the application program 105. The view-time photo share object 351 forms the application program 105 together with the mode management object 121, the photo-time photo share object 122 and the photo control object 123. In other words, the view-time photo share object 351 in place of the view-time photo share object 124 forms the application program 105. More specifically, the view-time photo share object 351 is substituted for the view-time photo share object 124 in the application program 105 of FIG. 6. The view-time photo share object 351 includes a program and data required to execute the program.

As shown in FIG. 42, the elements identical to those illustrated in FIG. 6 are designated with the same reference numerals, and the discussion thereof is omitted herein.

During the view-time photo share mode, the view-time photo share object 351 controls transmission of an image to a partner apparatus via the network 2 while controlling reception of an image transmitted from the partner apparatus. The view-time photo share object 351 includes a view-time disclosure list acquisition unit 181, a thumbnail image acquisition unit 182, an image acquisition unit 185, a sorter 186, a view-time disclosure list generating and updating unit 187, a display controller 401, and a selector 402.

The display controller 401 controls displaying of a variety of images on the LCD 20. The display controller 401 causes the LCD 20 to display a first representative image in a first folder to which first content recorded on own recording medium belongs to. The display controller 401 further causes the LCD 20 to display a second representative image in a second folder to which second content recorded supplied from the partner apparatus connected via the network 2 belongs to. The display controller 401 further causes the LCD 20 to display a thumbnail image of one of the first content and the second content of the first folder and the second folder selected by one of the first representative image and the second representative image. More in detail, the display controller 401 divides the display area of the LCD 20 into three areas, and displays the first representative image, the second representative image and the thumbnail image on the respective areas.

The display controller 401 includes a local folder area display controller 451, a public folder area display controller 452, a thumbnail list area display controller 453, a cursor display controller 454, an outline display controller 455, a content display controller 456 and a direct switch 457.

The local folder area display controller 451 controls displaying of the representative image of a folder on the recording medium 60 of own apparatus on the LCD 20. More specifically, the local folder area display controller 451 controls the first representative image of the first folder of the first content recorded on the recording medium 60 of own apparatus on a first area of the entire display screen area. For example, the local folder area display controller 451 controls the first representative image of the first folder of the first content recorded on the recording medium 60 of own apparatus on the first area as an example of local folder area.

The public folder area display controller 452 controls, on the LCD 20, displaying of a representative image of a folder to which content supplied by the partner apparatus belongs. More specifically, the public folder area display controller 452 controls, on a second area of the entire display screen, displaying the second representative image of the second folder of the second content supplied from the partner apparatus connected via the network 2. For example, the public folder area display controller 452 controls, on the second area as an example of public folder area, displaying the second representative image of the second folder of the second content supplied from the partner apparatus connected via the network 2.

The thumbnail list area display controller 453 controls displaying of the thumbnail image of the content on the LCD 20. More specifically, the thumbnail list area display controller 453 controls, on a third area of the entire display screen, displaying the thumbnail image of the content of one of the first folder and the second folder, the representative image of which is selected. For example, the thumbnail list area display controller 453 controls, on the third area as an example of thumbnail list area, displaying the thumbnail image of the content of one of the selected folder.

The cursor display controller 454 controls displaying a cursor on the display screen. The cursor display controller 454 controls displaying the cursor in one of the representative image of the recording medium 60 of own apparatus, the representative image of the folder of the content supplied from the partner apparatus, and the thumbnail image of the content of the selected folder to indicate selected one of the folder and content of the recording medium 60, and the folder and content of the content supplied from the partner apparatus.

For example, the cursor display controller 454 controls displaying the cursor on one of the first representative image, the second representative image and the thumbnail image to indicate which one of the first folder, the second folder, the first content and the second content is selected.

The cursor display controller 454 controls displaying the cursor so that the cursor is shifted from one area to another among the first area, the second area and the third area as a local folder area, a public folder area, and a thumbnail list area, respectively. The cursor is thus displayed on one of the first representative image, the second representative image, and the thumbnail image.

The outline display controller 455 controls displaying an outline indicating whether the folder of the recording medium 60 of own apparatus or the folder of the content supplied from the partner apparatus is selected. For example, when the representative image displayed in the local folder area is selected by the cursor, the outline display controller 455 causes the LCD 20 to display an outline surrounding the local folder area and the thumbnail list area. When the representative image displayed in the public folder area is selected, the outline display controller 455 causes the LCD 20 to display an outline surrounding the public folder area and the thumbnail list area. When the first representative image is selected by the cursor, the outline display controller 455 controls displaying an outline surrounding the first area and the third area displaying the thumbnail image of the first content. When the second representative image is selected by the cursor, the outline display controller 455 controls displaying an outline surrounding the second area and the third area displaying the thumbnail image of the second content.

The content display controller 456 controls displaying the content. For example, the content display controller 456 controls displaying the content having the thumbnail image selected by the cursor. The content displayed here is one of a still image or a moving image.

When the local folder corresponding to the representative image displayed in the local folder area is selected, the direct switch 457 may select, without shifting the cursor on the screen, the public folder corresponding to the representative image displayed in the public folder area in response to a predetermined instruction from the user, such as the pressing of a predetermined switch by the user. Furthermore, when the public folder corresponding to the representative image displayed in the public folder area is selected, the direct switch 457 may select the local folder corresponding to the representative image displayed in the local folder area.

The selector 402 selects the thumbnail image displayed in the thumbnail list area in response to an operation of the user. For example, when the first representative image of the first folder of the first content recorded on the recording medium 60 of own apparatus and displayed in the local folder area is selected, the thumbnail image of the first content belonging to the first folder of the selected first representative image is displayed in the thumbnail list area. The selector 402 selects the thumbnail image responsive to the user operation from among the thumbnail images displayed in the thumbnail list area. The selector 402 selects the thumbnail image displayed in the thumbnail list area in response to an operation of the user. For example, when the second representative image of the second folder of the second content supplied from partner apparatus connected via the network 2 and displayed in the public folder area is selected, the thumbnail image of the second content belonging to the second folder of the selected second representative image is displayed in the thumbnail list area. The selector 402 selects the thumbnail image responsive to the user operation from among the thumbnail images displayed in the thumbnail list area.

The selector 402 includes a disclosure image selector 458 and an acquisition image selector 459.

The disclosure image selector 458 selects an image to be disclosed from among the first content as images recorded on the recording medium 60 of own apparatus. For example, the disclosure image selector 458 selects the image to be disclosed as the first content having the thumbnail image thereof selected.

The acquisition image selector 459 selects an image to be acquired from the partner apparatus from among the second content as images to be supplied from the partner apparatus connected via the network 2. For example, the acquisition image selector 459 selects an image from the partner apparatus as the second content having the thumbnail image thereof selected.

FIG. 43 is a flowchart of an image display process of the digital camera 1-1 as the client. In step S301, the local folder area display controller 451 in the display controller 401 in the view-time photo share object 351 displays a list of representative images of the local folder in the local folder area. The local folder refers to the first folder to which the first content recorded on the recording medium 60 of own apparatus belongs.

Figure 44:
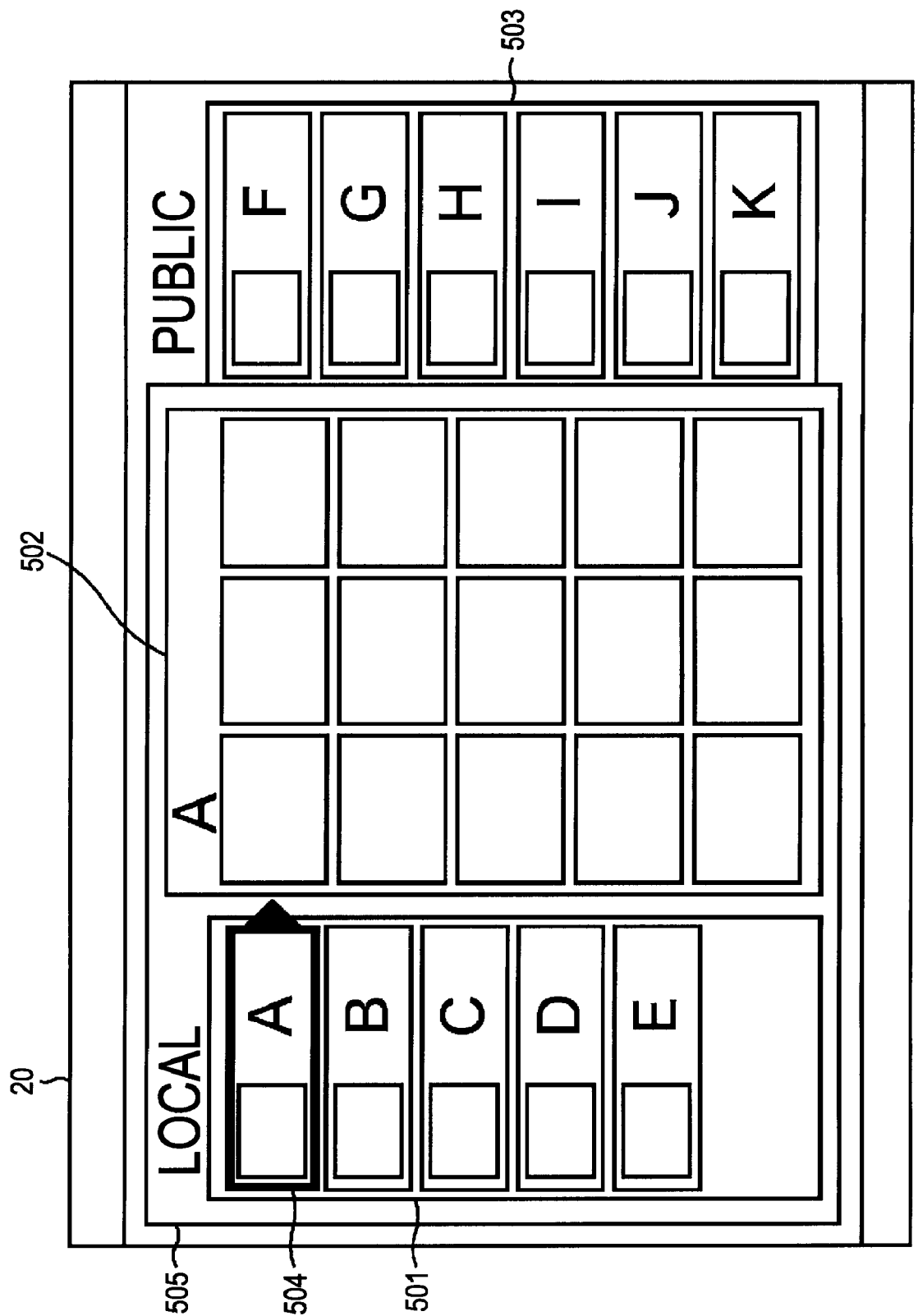
FIG. 44 illustrates an LCD screen.

FIG. 44 illustrates an example of screen of the LCD 20. As shown in FIG. 44, the LCD 20 screen includes a local folder area 501, a thumbnail list area 502, a public folder area 503, and a cursor 504.

As shown in FIG. 44, the local folder area 501 is arranged on the left portion of the LCD 20 screen. One representative image is displayed on a per local folder area basis in the local folder area 501. As shown in FIG. 44, each square displayed to the left of each of the letters A-E in the local folder area 501 represent a representative image. The letters A-E are names of local folders.

As shown in FIG. 44, the thumbnail list area 502 is arranged in the center of the LCD 20 screen interposed between the local folder area 501 and the public folder area 503. When a representative image displayed in the local folder area 501 is selected, the thumbnail image of the content belonging to the local folder having the representative image selected is displayed in the thumbnail list area 502. When the cursor 504 is placed on the representative image of the local folder A, the representative image of the local folder A is selected. The thumbnail image of the content belonging to the local folder A is displayed in the thumbnail list area 502.

As shown in FIG. 44, the public folder area 503 is arranged in the left portion of the LCD 20 screen. One representative image is displayed on a per public folder basis in the public folder area 503. The public folder refers to the second folder to which the second content supplied from the partner apparatus connected via the network 2 belongs. More in detail, the second folder may be a folder storing the second content or a virtual folder related to a single group to which the second content is sorted.

As shown in FIG. 44, a square arranged to the left of each of the letters F-K represents a representative image. The letters F-K are names of public folders.

When the representative image displayed in the public folder area 503 is selected, the thumbnail image of the content belonging to the public folder having the representative image selected is displayed in the thumbnail list area 502. For example, if the cursor 504 is placed in the representative image of the public folder F, the representative image of the public folder F is selected. The thumbnail image of the content belonging to the public folder F is displayed in the thumbnail list area 502.

As shown in FIG. 44, an outline 505 surrounds the local folder area 501 and the thumbnail list area 502 when the representative image displayed in the local folder area 501 is selected by the cursor 504. The outline 505 surrounds the public folder area 503 and the thumbnail list area 502 when the representative image displayed in the public folder area 503 is selected.

In this way, the user can recognize at a glance whether the thumbnail list area 502 displays the thumbnail image of the content belonging to the local folder or the thumbnail image of the content belonging to the public folder.

In step S301, the local folder area display controller 451 displays the thumbnail images of any images stored in the local folder as representative images from among the images photographed and stored on the recording medium 60 in the digital camera 1-1. More specifically, the representative image of the local folder is the thumbnail image of an image photographed earliest from among the images contained in the local folder, namely, the thumbnail image of an image having the oldest photograph time indicated by metadata or the thumbnail image of an image specified by the user.

In step S302, the public folder area display controller 452 in the display controller 401 in the view-time photo share object 351 displays all representative images of the public folder in the public folder area 503.

In step S302, for example, the public folder area display controller 452 displays, as the representative image of the public folder in the public folder area 503, a predetermined thumbnail image on a per public folder basis from among the thumbnail images acquired from the digital camera 1-2 as the partner apparatus via the network 2 and disclosed by the digital camera 1-2.

In step S303, the thumbnail list area display controller 453 in the display controller 401 in the view-time photo share object 351 determines whether the local folder or the public folder is focused on. More specifically, the thumbnail list area display controller 453 determines whether the local folder or the public folder is focused on depending on whether the cursor 504 is placed on the representative image of the local folder area 501 or the representative image of the public folder area 503. If it is determined in step S303 that the local folder or the public folder is focused on, processing proceeds to step S304. The thumbnail list area display controller 453 in the display controller 401 in the view-time photo share object 351 displays, in the thumbnail list area 502, the thumbnail image of the image (content) stored in the focused one of the local folder and the public folder.

The user of the digital camera 1-1 can thus know the image stored in the focused one of the local folder and the public folder.

If it is determined in step S303 that the cursor 504 is placed in the thumbnail list area 502 but not focused on none of the local folder and the public folder, processing proceeds to step S305. The thumbnail list area display controller 453 displays together the thumbnail images of the images as the content stored in one of the local folder and the public folder on which the cursor 504 was focused prior to the movement of the cursor 504 to the thumbnail list area 502. Processing thus ends.

The user of the digital camera 1-1 as the client can thus know the image stored in one of the local folder and the public folder on which the cursor 504 was focused immediately prior to the movement. The user can thus perform a variety of operations on the thumbnail images displayed together in the thumbnail list area 502.

Figure 45:
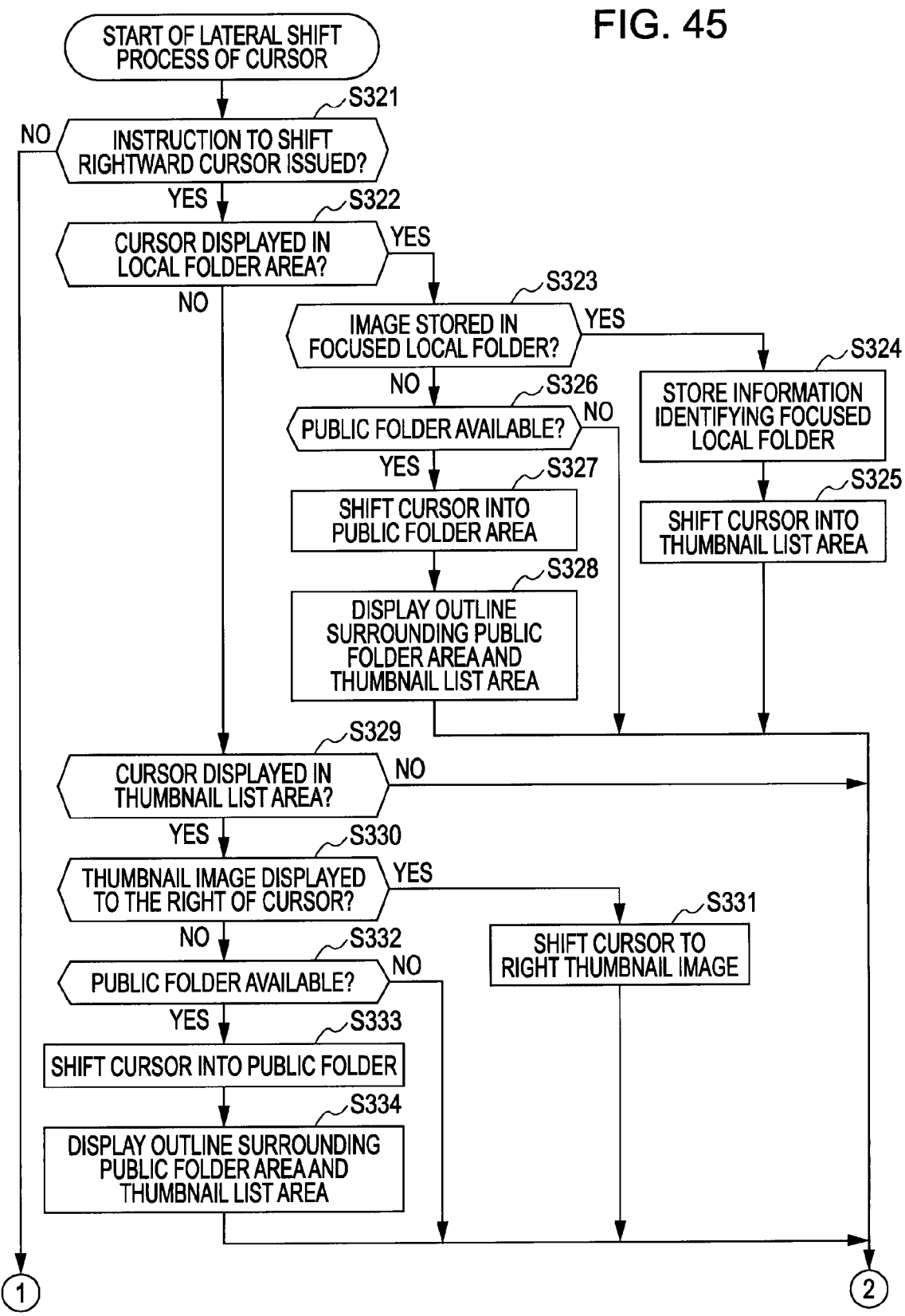
FIG. 45 is a flowchart illustrating a lateral shift process of a cursor.
Figure 46:
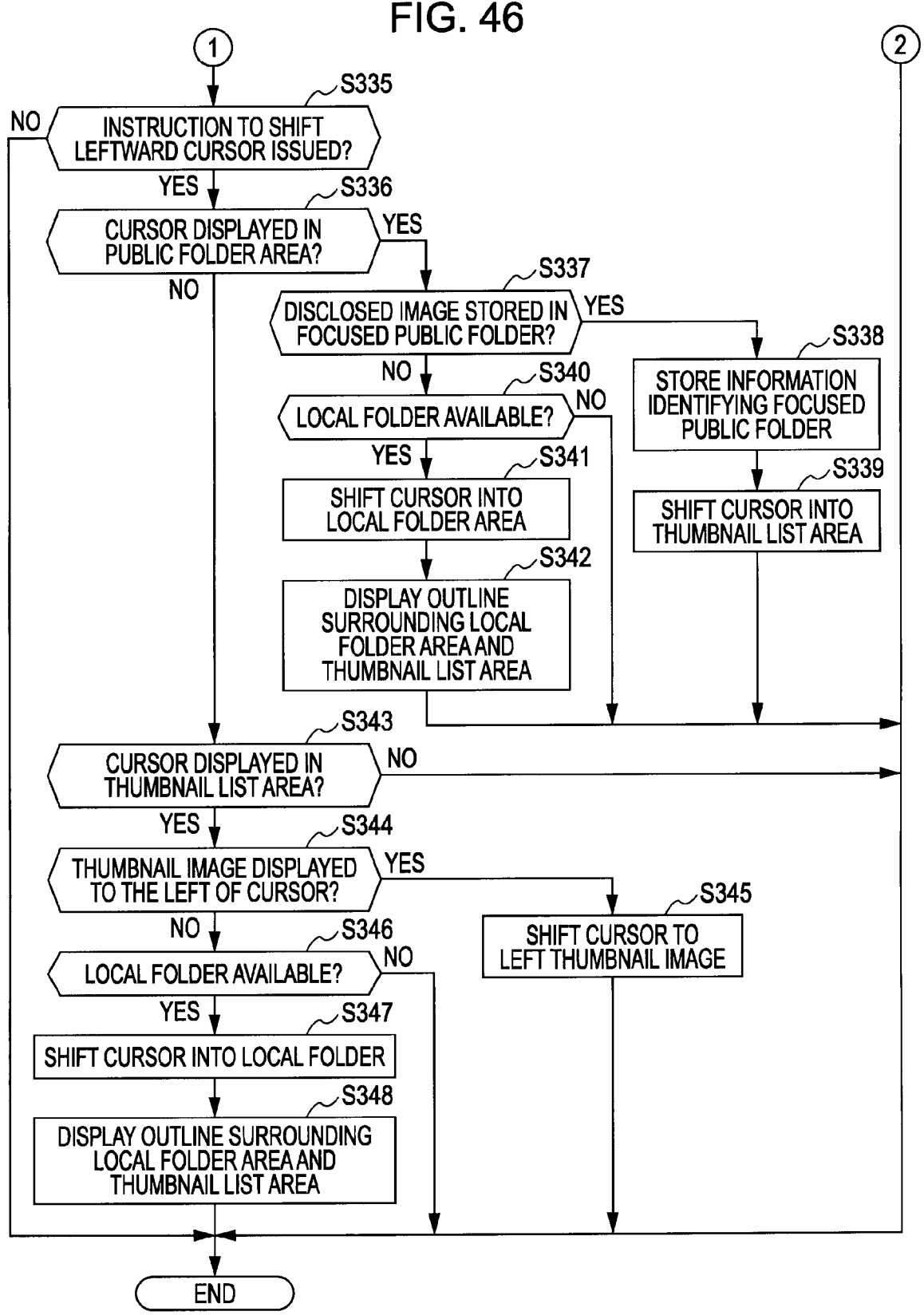
FIG. 46 is a flowchart illustrating the lateral shift process of the cursor.

FIGS. 45 and 46 are flowcharts of a lateral shifting of the cursor 504 on the LCD 20 screen in the digital camera 1-1 as the client. In step S321, the cursor display controller 454 determines whether an instruction to shift the cursor 504 rightward has been issued. For example, in response to a signal supplied from the operation button 19 in the operation unit 46 operated by the user, the cursor display controller 454 determines in step S321 whether the instruction to shift rightward the cursor 504 has been issued. If it is determined in step S321 that the instruction to shift rightward the cursor 504 has been issued, processing proceeds to step S322.

In step S322, the cursor display controller 454 determines whether the cursor 504 is displayed in the local folder area 501. For example, the cursor display controller 454 determines in step S322 whether the cursor 504 is displayed on any of the representative images in the local folder displayed in the local folder area 501. If it is determined in step S322 that the cursor 504 is displayed in the local folder area 501, processing proceeds to step S323.

In step S323, the cursor display controller 454 determines whether the image as the content is stored in the focused local folder, namely, the local folder with the representative image thereof pointed by the cursor 504. If it is determined in step S323 that the image is stored in the focused local folder, processing proceeds to step S324.

In step S324, the cursor display controller 454 stores information identifying the focused local folder. The cursor display controller 454 supplies the thumbnail list area display controller 453 with the information identifying the focused local folder. For example, in step S324, the cursor display controller 454 stores a group (folder) name as the information identifying the local folder. Processing proceeds to step S325.

Since the thumbnail image of the content stored in the focused local folder in step S304 is displayed in the thumbnail list area 502, the cursor display controller 454 shifts in step S325 the cursor 504 into the thumbnail list area 502 to display the cursor 504 on any of the thumbnail images. Processing thus ends.

Upon determining in step S323 that no image is stored in the focused local folder, the cursor display controller 454 proceeds to step S326. The cursor display controller 454 determines, based on the view-time disclosure list acquired by the view-time disclosure list acquisition unit 181, whether a public folder is present. If it is determined in step S326 that a public folder is present, no thumbnail image is displayed in the thumbnail list area 502 but a representative image is displayed in the public folder area 503. Processing proceeds to step S327. The cursor display controller 454 shifts the cursor 504 from the local folder area 501 to the public folder area 503. In step S328, the outline display controller 455 displays the outline 505 that surrounds the public folder area 503 and the thumbnail list area 502. Processing thus ends.

If it is determined in step S326 that no public folder is present, no thumbnail image is displayed in the thumbnail list area 502. Since no representative image is displayed in the public folder area 503, the cursor 504 cannot be shifted from the local folder area 501. Steps S327 and S382 are skipped. Processing thus ends with the cursor 504 remaining unshifted.

If it is determined in step S322 that the cursor 504 is not displayed in the local folder area 501, processing proceeds to step S329. The cursor display controller 454 determines whether the cursor 504 is displayed in the thumbnail list area 502. For example, in step S329, the cursor display controller 454 determines whether the cursor 504 is displayed in any of the thumbnail images displayed in the thumbnail list area 502. If it is determined in step S329 that the cursor 504 is displayed in the thumbnail list area 502, processing proceeds to step S330.

In step S330, the cursor display controller 454 determines whether the thumbnail image is displayed to the right of the cursor 504. If it is determined in step S330 that the thumbnail image is displayed to the right of the cursor 504, processing proceeds to step S331. The cursor display controller 454 shifts the cursor 504 to the right thumbnail image. Processing then ends.

If it is determined in step S330 that no thumbnail image is displayed to the right of the cursor 504, processing proceeds to step S332. The cursor display controller 454 determines whether a public folder is present. If it is determined in step S332 that a public folder is present, no thumbnail image is displayed to the right of the cursor 504 in the thumbnail list area 502 and a representative image is displayed in the public folder area 503. Processing proceeds to step S333. The cursor display controller 454 shifts the cursor 504 from the thumbnail list area 502 to the public folder area 503. In step S334, the outline display controller 455 displays the outline 505 surrounding the public folder area 503 and the thumbnail list area 502. Processing thus ends.

If it is determined in step S332 that no public folder is present, no thumbnail image is displayed to the right of the cursor 504 in the thumbnail list area 502 and no representative image is displayed in the public folder area 503. The cursor 504 cannot be shifted in the thumbnail list area 502. Since the cursor 504 cannot be moved from the thumbnail list area 502 to the public folder area 503, steps S333 and S334 are skipped. Processing ends with the cursor 504 remaining unshifted.

If it is determined in step S329 that the cursor 504 is not displayed in the thumbnail list area 502, the cursor 504 is displayed in the public folder area 503. The cursor 504 cannot be further laterally rightward moved. Processing thus ends with the cursor 504 remaining unshifted.

If it is determined in step S321 that the instruction to shift rightward the cursor 504 has not been issued, processing proceeds to step S335.

In step S335, the cursor display controller 454 determines whether the instruction to shift leftward the cursor 504 has been issued. For example, in response to a signal supplied from the operation button 19 in the operation unit 46 operated by the user, the cursor display controller 454 determines in step S335 whether the instruction to shift left the cursor 504 has been issued. If it is determined in step S335 that the instruction to shift leftward the cursor 504 has been issued, processing proceeds to step S336.

In step S336, the cursor display controller 454 determines whether the cursor 504 is displayed in the public folder area 503. For example, the cursor display controller 454 determines in step S336 whether the cursor 504 is displayed on any of the representative images in the public folder displayed in the public folder area 503. If it is determined in step S336 that the cursor 504 is displayed in the public folder area 503, processing proceeds to step S337.

In step S337, the cursor display controller 454 determines whether the disclosed image as the content is stored in the focused public folder, namely, the public folder with the representative image thereof pointed by the cursor 504. If it is determined in step S337 that the disclosed image is stored in the focused public folder, processing proceeds to step S338.

In step S338, the cursor display controller 454 stores information identifying the focused public folder. The cursor display controller 454 supplies the thumbnail list area display controller 453 with the information identifying the focused public folder. For example, in step S338, the cursor display controller 454 stores a group (folder) name as the information identifying the public folder. Processing proceeds to step S339.

Since the thumbnail image of the content stored in the focused public folder in step S304 is displayed in the thumbnail list area 502, the cursor display controller 454 shifts in step S339 the cursor 504 into the thumbnail list area 502 to display the cursor 504 in any of the thumbnail images. Processing thus ends.

Upon determining in step S337 that no image is stored in the focused public folder, the cursor display controller 454 proceeds to step S340. The cursor display controller 454 determines whether a local folder is present. If it is determined in step S340 that a local folder is present, no thumbnail image is displayed in the thumbnail list area 502 but a representative image is displayed in the local folder area 501. Processing proceeds to step S341. The cursor display controller 454 shifts the cursor 504 from the public folder area 503 to the local folder area 501. In step S342, the outline display controller 455 displays the outline 505 that surrounds the local folder area 501 and the thumbnail list area 502. Processing thus ends.

If it is determined in step S340 that no local folder is present, no thumbnail image is displayed in the thumbnail list area 502. Since no representative image is displayed in the local folder area 501, the cursor 504 cannot be shifted from the public folder area 503. Steps S341 and S342 are skipped. Processing ends with the cursor 504 remaining unshifted.

If it is determined in step S336 that the cursor 504 is not displayed in the public folder area 503, processing proceeds to step S343. The cursor display controller 454 determines whether the cursor 504 is displayed in the thumbnail list area 502. For example, in step S343, the cursor display controller 454 determines whether the cursor 504 is displayed in any of the thumbnail images displayed in the thumbnail list area 502. If it is determined in step S343 that the cursor 504 is displayed in the thumbnail list area 502, processing proceeds to step S344.

In step S344, the cursor display controller 454 determines whether the thumbnail image is displayed to the left of the cursor 504. If it is determined in step S344 that the thumbnail image is displayed to the left of the cursor 504, processing proceeds to step S345. The cursor display controller 454 shifts the cursor 504 to the left thumbnail image. Processing then ends.

If it is determined in step S344 that no thumbnail image is displayed to the left of the cursor 504, processing proceeds to step S346. The cursor display controller 454 determines whether a local folder is present. If it is determined in step S346 that a local folder is present, no thumbnail image is displayed to the left of the cursor 504 in the thumbnail list area 502 and a representative image is displayed in the local folder area 501. Processing proceeds to step S347. The cursor display controller 454 shifts the cursor 504 from the thumbnail list area 502 to the local folder area 501. In step S348, the outline display controller 455 displays the outline 505 surrounding the local folder area 501 and the thumbnail list area 502. Processing thus ends.

If it is determined in step S346 that no public folder is present, no thumbnail image is displayed to the left of the cursor 504 in the thumbnail list area 502 and no representative image is displayed in the local folder area 501. The cursor 504 cannot be shifted in the thumbnail list area 502. Since the cursor 504 cannot be moved from the thumbnail list area 502 to the local folder area 501, steps S347 and S348 are skipped. Processing ends with the cursor 504 remaining unshifted.

If it is determined in step S343 that the cursor 504 is not displayed in the thumbnail list area 502, the cursor 504 is displayed in the local folder area 501. The cursor 504 cannot be further laterally leftward moved. Processing thus ends with the cursor 504 remaining unshifted.

If it is determined in step S335 that the instruction to shift leftward the cursor 504 has not been issued, processing ends.

The above-described process is described below with reference to the LCD 20 screen.

A representative image of the local folder may be displayed in the local folder area 501, and a representative image of the public folder may be displayed in the public folder area 503 with the cursor 504 displayed in the representative image of a local folder A in the local folder area 501. In step S304 of FIG. 43, the thumbnail list area display controller 453 displays together the thumbnail images of the images (content) stored in the focused local folder A. For example, the thumbnail list area 502 includes three columns of thumbnail images.

The outline 505 surrounds the local folder area 501 and the thumbnail list area 502.

Figure 47A:
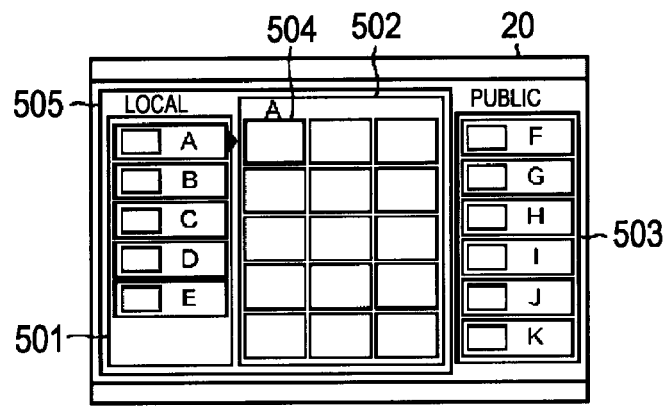
FIGS. 47A-47D illustrate cursor shifting.

When the user issues the instruction to shift rightward the cursor 504 using the operation buttons 19 in the operation unit 46, the cursor 504 is displayed to point to the left thumbnail image of the thumbnail images displayed in the thumbnail list area 502 as shown in FIG. 47A. The outline 505 is continuously displayed to surround the local folder area 501 and the thumbnail list area 502.

The cursor 504, shifted from the local folder area 501 to the thumbnail list area 502, may be moving within the thumbnail list area 502. In step S305 of FIG. 43, the thumbnail list area display controller 453 continuously displays in the thumbnail list area 502 the thumbnail images as content stored in the local folder A that were focused before the shifting of the cursor 504 into the thumbnail list area 502. The thumbnail images displayed in the thumbnail list area 502 remain unchanged.

Figure 47B:
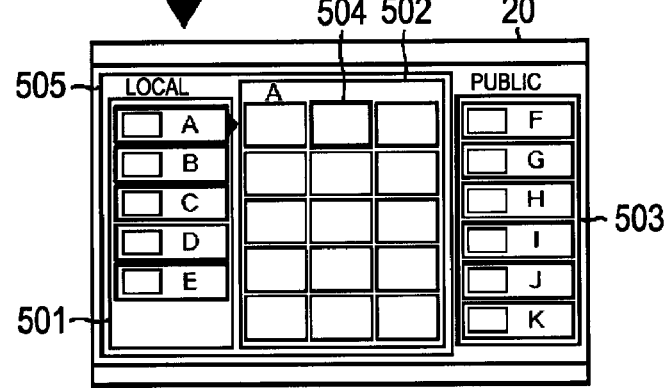

When the instruction to shift rightward the cursor 504 is issued, the cursor 504 is displayed on the second thumbnail image from the left, namely, the center thumbnail image of the top row of three thumbnail images, from among the thumbnail images displayed in the thumbnail list area 502 as shown in FIG. 47B. In this case, the outline 505 continuously surrounds the local folder area 501 and the thumbnail list area 502.

Figure 47C:
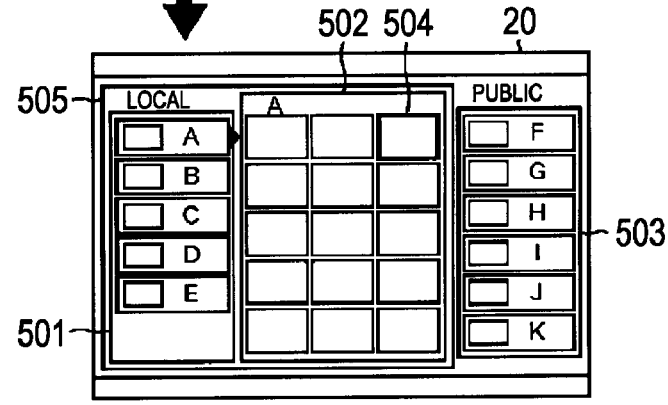

When the instruction to shift further rightward the cursor 504 is issued, the cursor 504 is displayed on the third thumbnail image from the left, namely, the rightmost thumbnail image of the top row of three thumbnail images, from among the thumbnail images displayed in the thumbnail list area 502 as shown in FIG. 47C. In this case, the outline 505 continuously surrounds the local folder area 501 and the thumbnail list area 502.

Figure 47D:
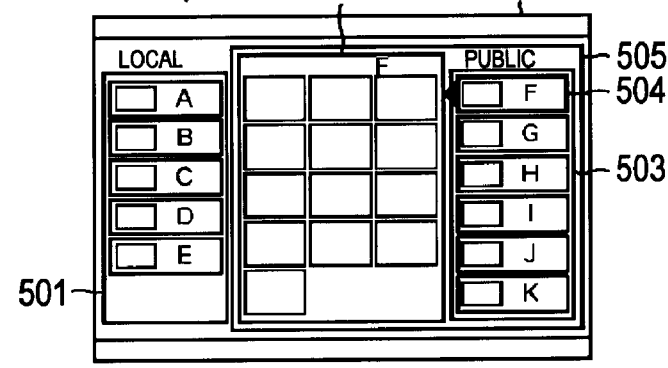

When the instruction to shift further rightward the cursor 504 is issued, the cursor 504 is shifted into the public folder area 503 and displayed on the representative image of a public folder named F as shown in FIG. 47D. In step S304 of FIG. 43, the thumbnail list area display controller 453 continuously displays in the thumbnail list area 502 the thumbnail images as content stored in the public folder with the cursor 504 placed on the representative image thereof, namely in the local folder F. The thumbnail images displayed in the thumbnail list area 502 are thus changed. The outline 505 is displayed to surround the public folder area 503 and the thumbnail list area 502.

When the instruction to shift leftward the cursor 504 is issued, the cursor 504 is shifted in the direction opposite of the case shown in FIGS. 47A-47D.

When the instruction to shift laterally rightward or leftward the cursor 504 is issued, the cursor 504 moves across the local folder area 501, the thumbnail list area 502 and the public folder area 503 in response to the instruction.

When the instruction to shift downward the cursor 504 is issued by operating the operation button 19 in the operation unit 46 with the cursor 504 displayed in one of the local folder area 501 and the public folder area 503, the thumbnail image displayed in the thumbnail list area 502 is changed.

Figure 48A:
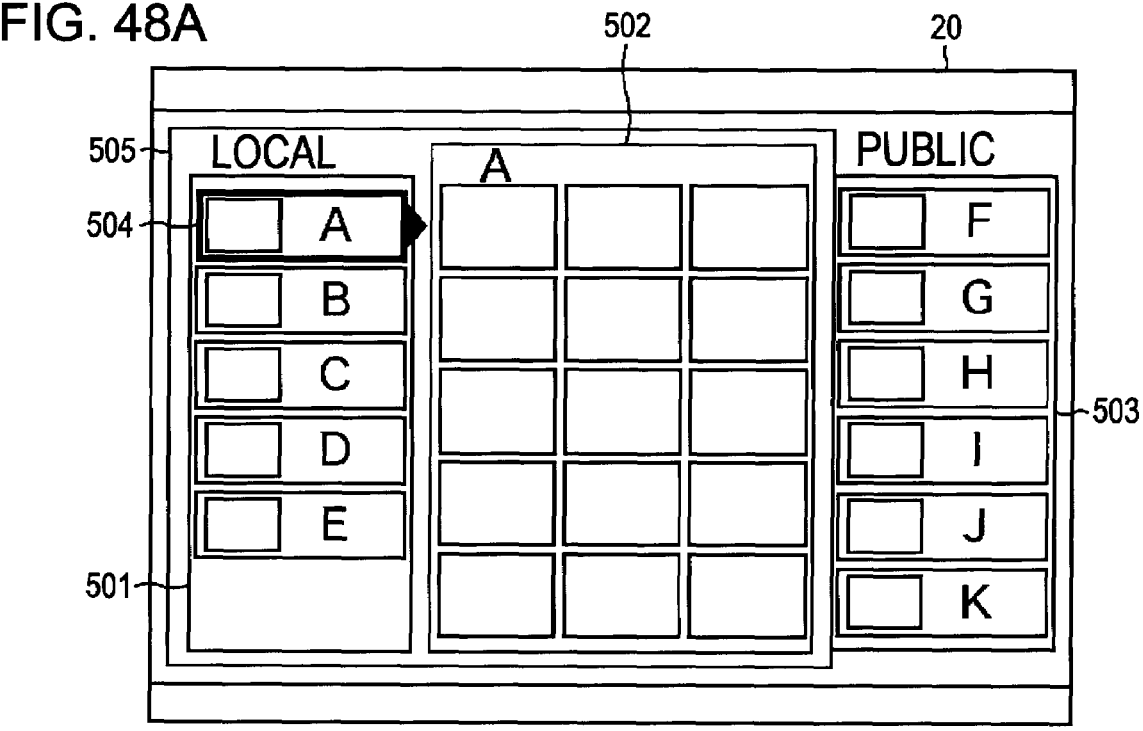
FIGS. 48A and 48B illustrate cursor shifting.
Figure 48B:
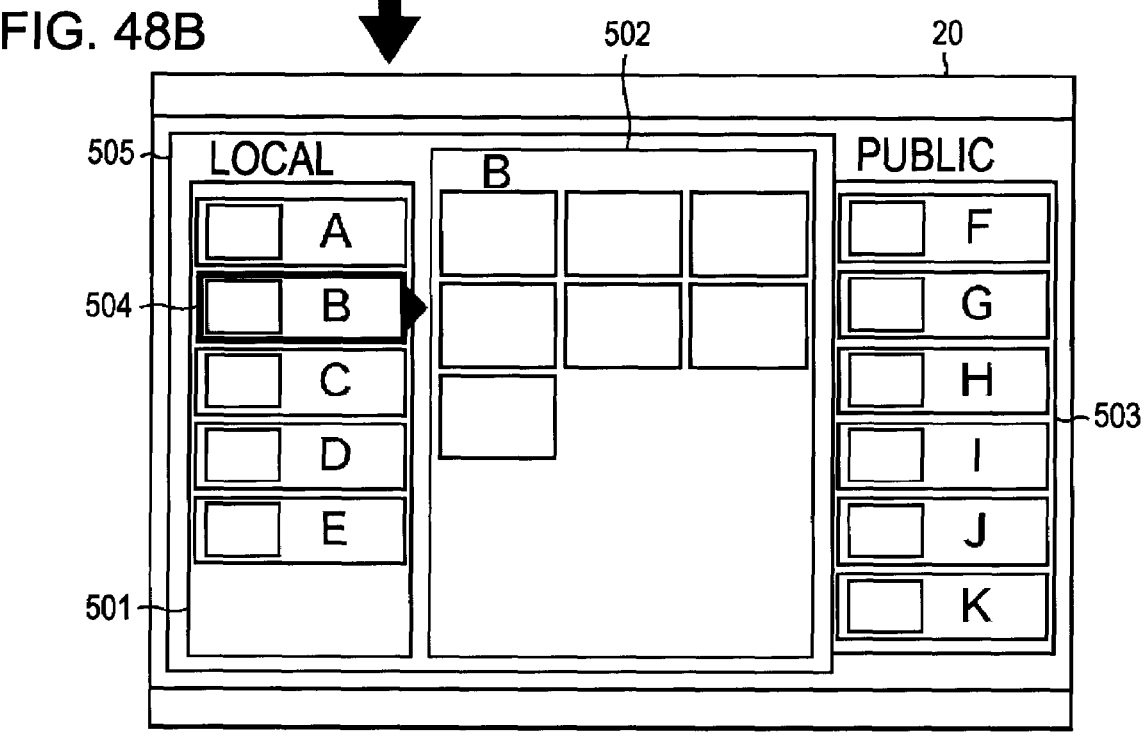

The representative images of the local folders A-E may be shown in the local folder area 501 with the cursor 504 placed on the representative image of the local folder A as shown in FIG. 48A. The thumbnail image of the image (content) stored in the local folder A is displayed in the thumbnail list area 502. When the instruction to shift downward the cursor 504 is issued, the cursor 504 is shifted to the representative image of the local folder B below the representative image of the local folder A. The thumbnail image of the image stored in the local folder B is displayed in the thumbnail list area 502 as shown in FIG. 48B.

Figure 49A:
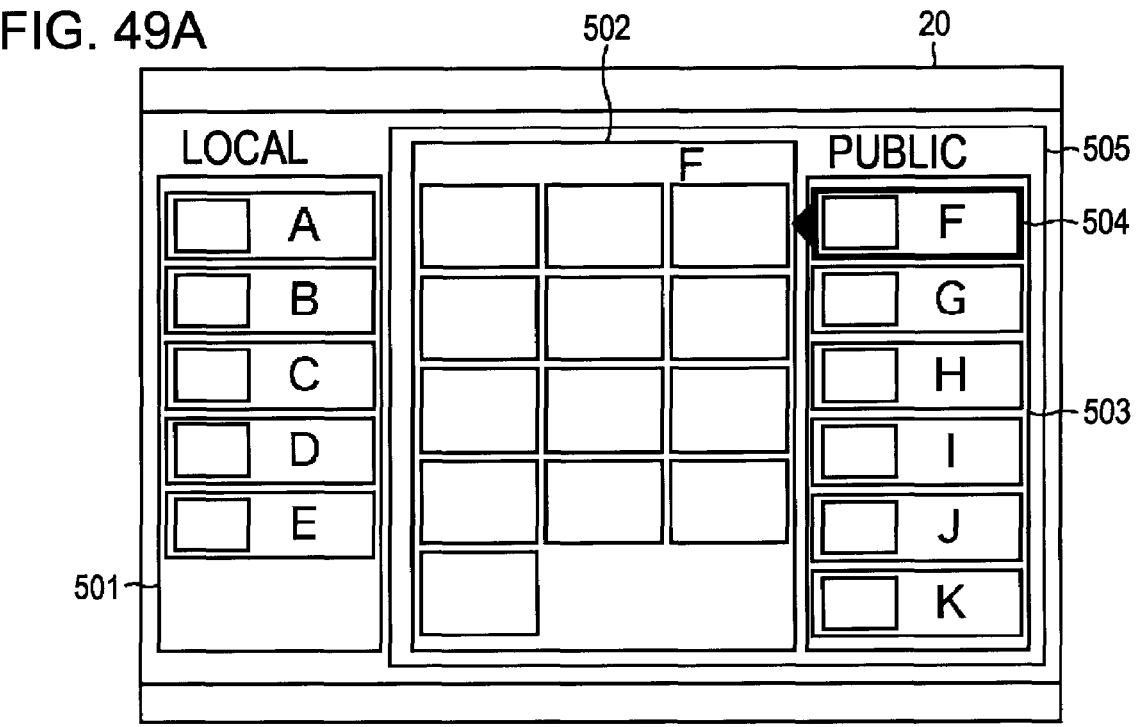
FIGS. 49A and 49B illustrate cursor shifting.
Figure 49B:
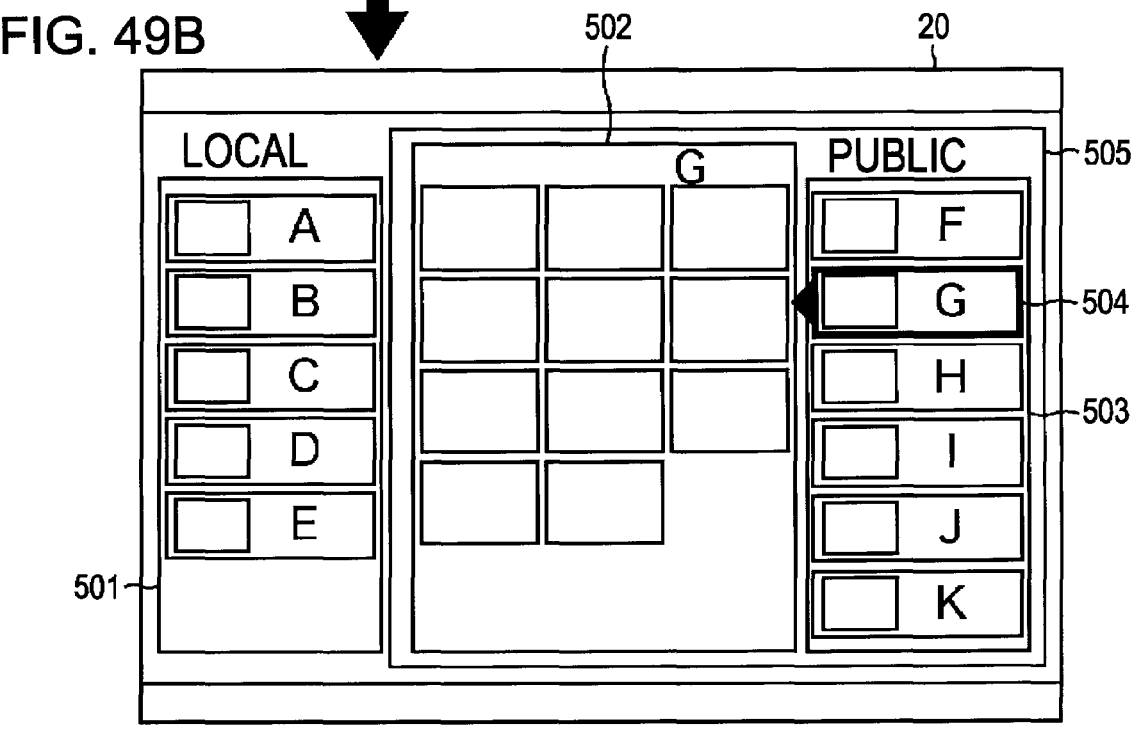

The representative images of the public folders F-K may be shown in the public folder area 503 with the cursor 504 placed on the representative image of the public folder F as shown in FIG. 49A. The thumbnail image of the image (content) stored in the public folder F is displayed in the thumbnail list area 502. When the instruction to shift downward the cursor 504 is issued, the cursor 504 is shifted to the representative image of the public folder G below the representative image of the public folder F. The thumbnail image of the image stored in the public folder G is displayed in the thumbnail list area 502 as shown in FIG. 49B.

The representative image may be displayed on the cursor 504. The instruction to place the representative image on the cursor 504 is issued, the cursor 504 is shifted to the representative image. The local folder or the public folder to be focused is thus switched. The thumbnail image of the content of the newly focused local folder or the newly focused public folder is displayed in the thumbnail list area 502.

Furthermore, the cursor 504 may be shifted upward or downward in the thumbnail list area 502 in response to the user operation on the operation button 19 in the operation unit 46.

Figure 50:
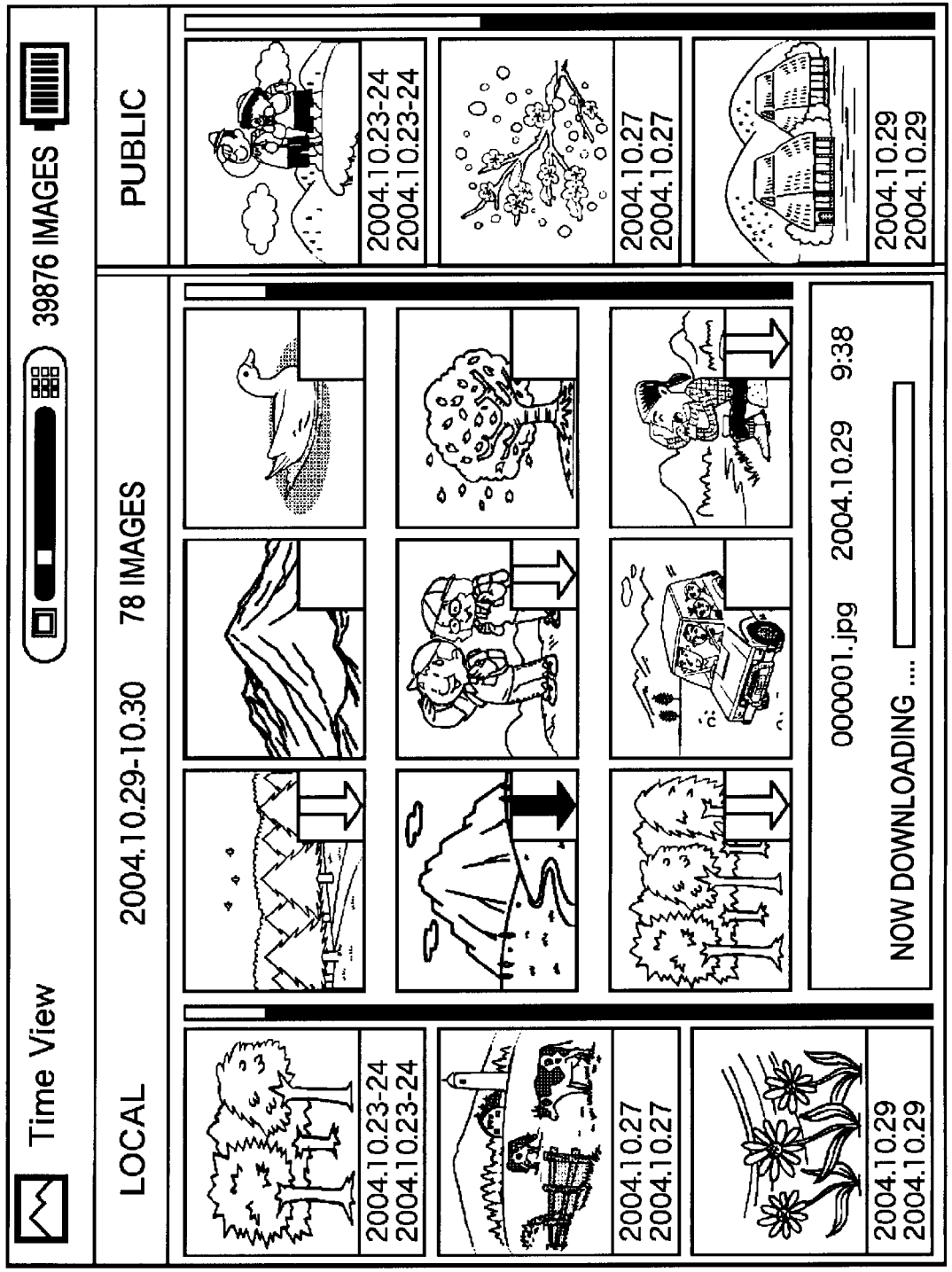
FIG. 50 illustrates the LCD screen that includes a local folder area, a thumbnail list area and a public folder area.

FIG. 50 specifically illustrates the LCD 20 screen including the local folder area 501, the thumbnail list area 502, and the public folder area 503. The local folder area 501 displays the representative image of each local folder together with information relating to each local folder, such as date and time information at which the image stored in the local folder was photographed. As shown in FIG. 50, the thumbnail list area 502 displays the thumbnail image of the content belonging to the focused public folder. The public folder area 503 displays the representative image of each public folder together with date and time information at which the image belonging to the public folder was photographed.

A check box is attached to each thumbnail image of content belonging to the public folder displayed in the thumbnail list area 502. When the check box of the thumbnail image is checked, the original image of the thumbnail image is selected as the one to be acquired. When the check box of the thumbnail image is not checked, the original image of the thumbnail image is not selected as the one to be acquired.

The acquisition image selector 459 selects, as an image to be acquired, the image having the check box of the thumbnail image thereof checked, from among the images supplied from the partner apparatus connected via the network 2.

An arrow symbol is displayed in the check box of the thumbnail image while the original image of the thumbnail image is being acquired (downloaded). The user thus can know that the original image of the thumbnail image having the arrow symbol displayed is currently downloaded.

When the acquisition of the original image of the thumbnail image is completed, an arrow symbol becomes different in color from the arrow symbol for downloading. In this way, the user can know that the original image of the thumbnail image has been downloaded.

As shown in FIG. 50, a message such as the one reading "now downloading" related to the status of the digital camera 1 is displayed in an area below the thumbnail list area 502.

As shown in FIG. 50, a scroll bar is displayed to the right of the local folder area 501 having the representative image of the local folder displayed therewithin. The scroll bar is used to scroll the displayed representative images of the local folder. With the scroll bar moved upward, the representative images move downward in the local folder area 501. Upper representative images of the thumbnail images are displayed in the local folder area 501. With the scroll bar moved downward, the thumbnail images move upward in the local folder area 501. Lower representative images of the thumbnail images are thus displayed in the local folder area 501.

As shown in FIG. 50, a scroll bar is displayed to the right of the public folder area 503 having the representative image of the local folder displayed therewithin. The scroll bar is used to scroll the displayed representative images of the public folder. With the scroll bar moved upward, the representative images move downward in the public folder area 503. Upper representative images are displayed in the public folder area 503. With the scroll bar moved downward, the thumbnail images move upward in the public folder area 503. Lower representative images are thus displayed in the public folder area 503.

Similarly, as shown in FIG. 50, a scroll bar is displayed to the right of the thumbnail list area 502 having the thumbnail images displayed therewithin. The scroll bar is used to scroll the displayed thumbnail images. With the scroll bar moved upward, the thumbnail images move downward in the thumbnail list area 502. Upper thumbnail images are displayed in the thumbnail list area 502. With the scroll bar moved downward, the thumbnail images move upward in the thumbnail list area 502. Lower thumbnail images are thus displayed in the thumbnail list area 502.

In the same manner as shown in FIG. 37, a check box (not shown) is attached to each thumbnail image of content belonging to the local folder displayed in the thumbnail list area 502. When the check box of the thumbnail image is not checked, the original image of the thumbnail image is not disclosed. By checking the check box of the thumbnail image, the original image of the thumbnail image is disclosed.

Re-checking the check marked check box cancels the disclosure of the original image of the thumbnail image.

When the check box of the thumbnail image of the content belonging to the local folder is checked, the disclosure image selector 458 selects, as an image to be disclosed, the original image of the thumbnail image having the check marked check box, recorded on the recording medium 60 of own apparatus.

Figure 51:
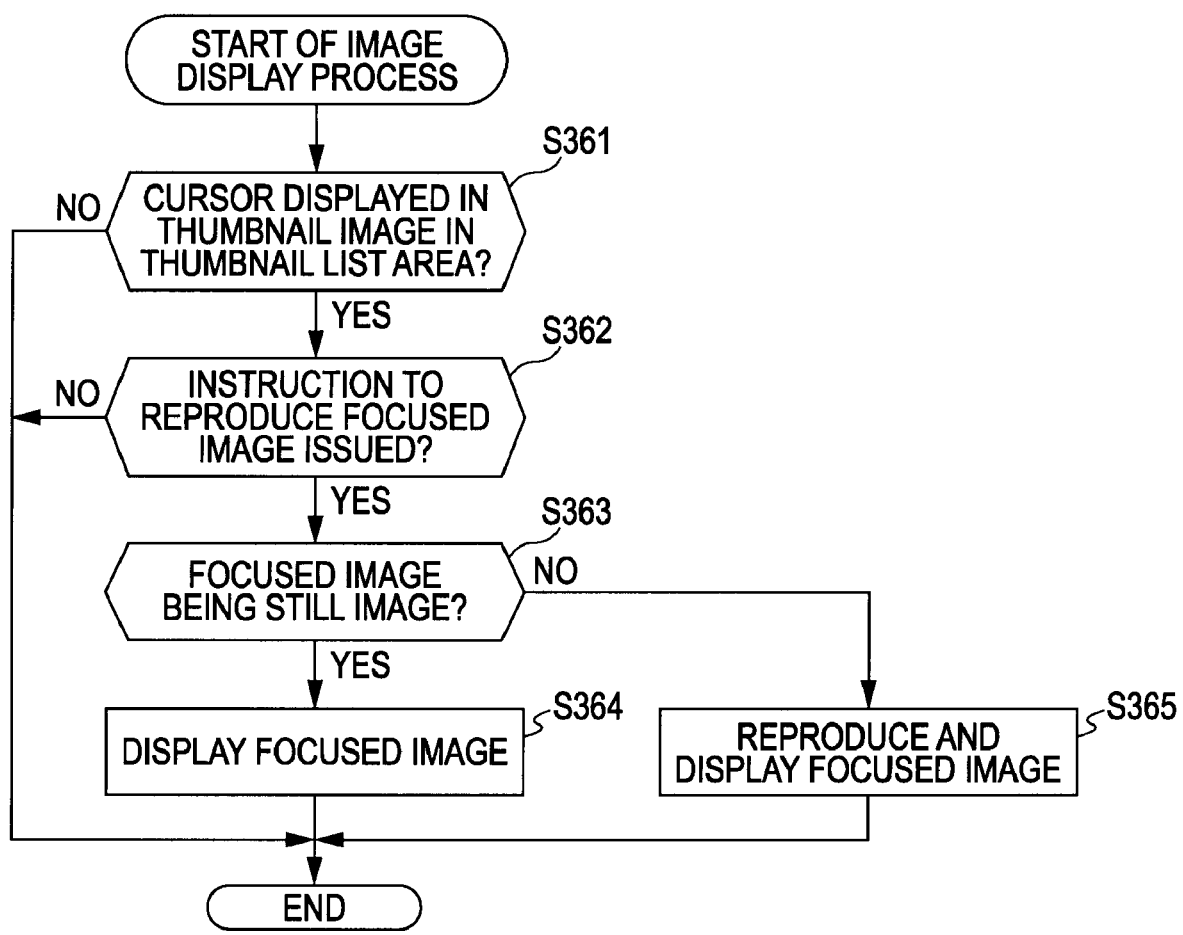
FIG. 51 is a flowchart illustrating an image display process.

FIG. 51 is a flowchart of an image display process of the digital camera 1-1 as the client. In step S361, the content display controller 456 determines, based on data representing the position of the cursor 504 supplied from the cursor display controller 454, whether the cursor 504 is displayed in the thumbnail image on the thumbnail list area 502. If it is determined in step S361 that the cursor 504 is displayed on the thumbnail image in the thumbnail list area 502, processing proceeds to step S362. The content display controller 456 determines whether an command to reproduce the focused image as the original image of the thumbnail image having the cursor 504 displayed thereon has been issued. For example, upon receiving from the operation unit 46 a signal indicating the pressing of one of the operation buttons 19, the content display controller 456 determines in step S362 that the command to reproduce the focused image has been issued.

If it is determined in step S362 that the command to reproduce the focused image has been issued, processing proceeds to step S363. The content display controller 456 determines whether the focused image is a still image or not.

If it is determined in step S363 that the focused image is a still image, processing proceeds to step S364. The content display controller 456 causes the LCD 20 to display the still image. Processing thus ends.

If it is determined in step S363 that the focused image is not a still image, the focused image is a moving image. Processing proceeds to step S365. The content display controller 456 reproduces the moving image as the focused image on the LCD 20. Processing thus ends.

If it is determined in step S361 that the cursor 504 is not displayed on the thumbnail image in the thumbnail list area 502, or if it is determined in step S362 that the command to reproduce the focused image has not been issued, steps S363 through S365 are skipped. Processing thus ends with no image displayed.

Figure 52A:
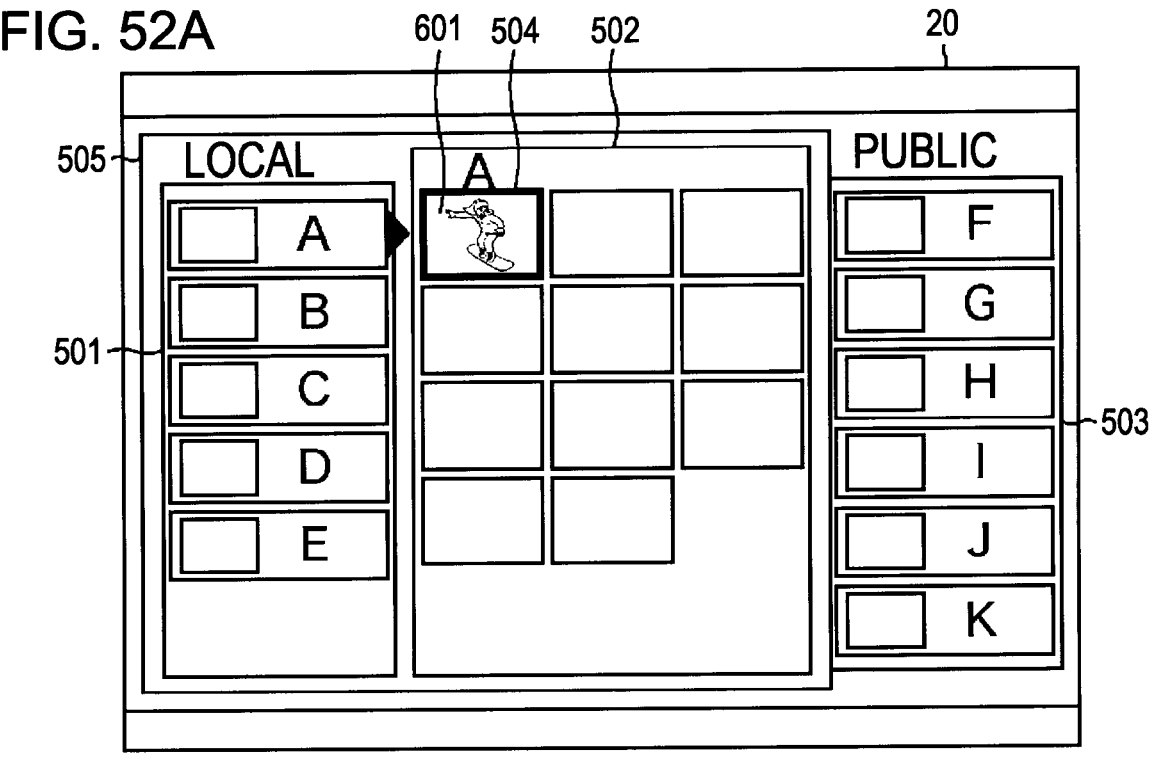
FIGS. 52A and 52B illustrate the LCD screen displaying an image.
Figure 52B:
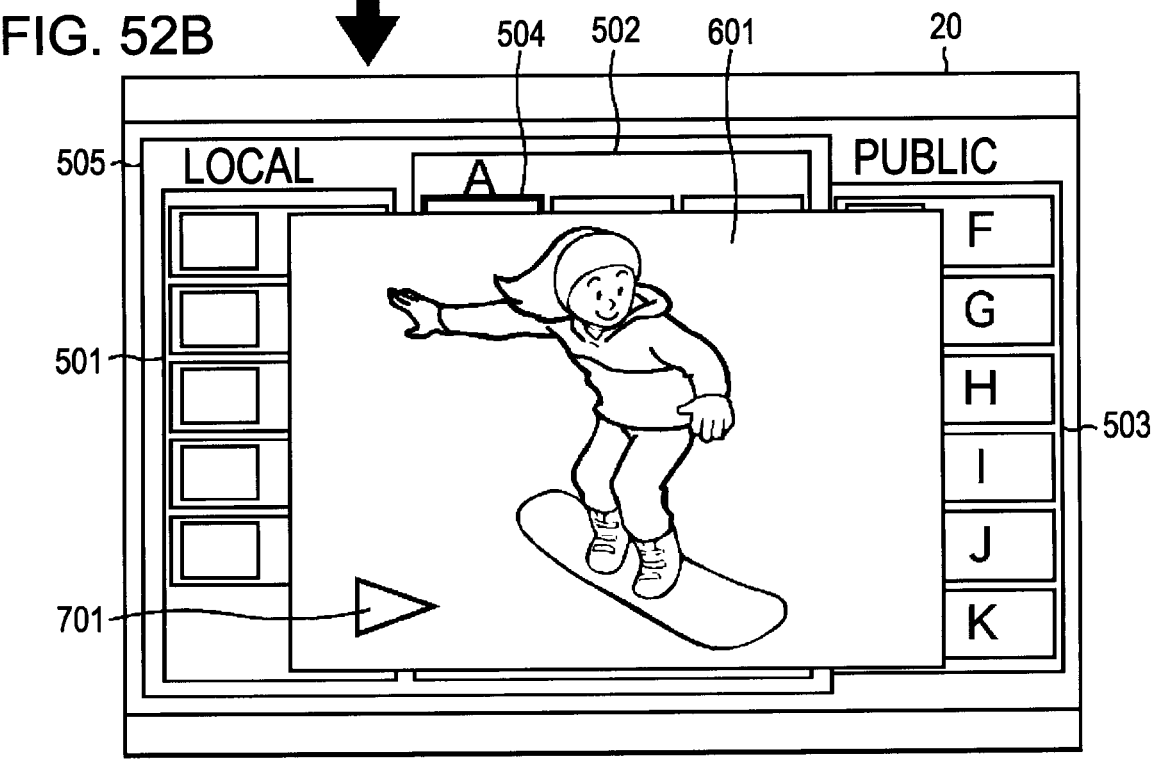

As shown in FIG. 52A, the cursor 504 might be displayed on the thumbnail image in the thumbnail list area 502 and the command to reproduce the focused image might be issued. If the focused image is a moving image 601, the moving image 601 is reproduced. The reproduced image 601 is displayed on and covers the local folder area 501, the thumbnail list area 502 and the public folder area 503. More specifically, the entire moving image 601 appears on the LCD 20 screen in a manner such that the local folder area 501, the thumbnail list area 502 and the public folder area 503 are hidden under the moving image 601 as shown in FIG. 52B. A triangular symbol 701 pointing rightward is displayed in the bottom left corner of the moving image 601 to indicate the reproduction is in progress.

Figure 53:
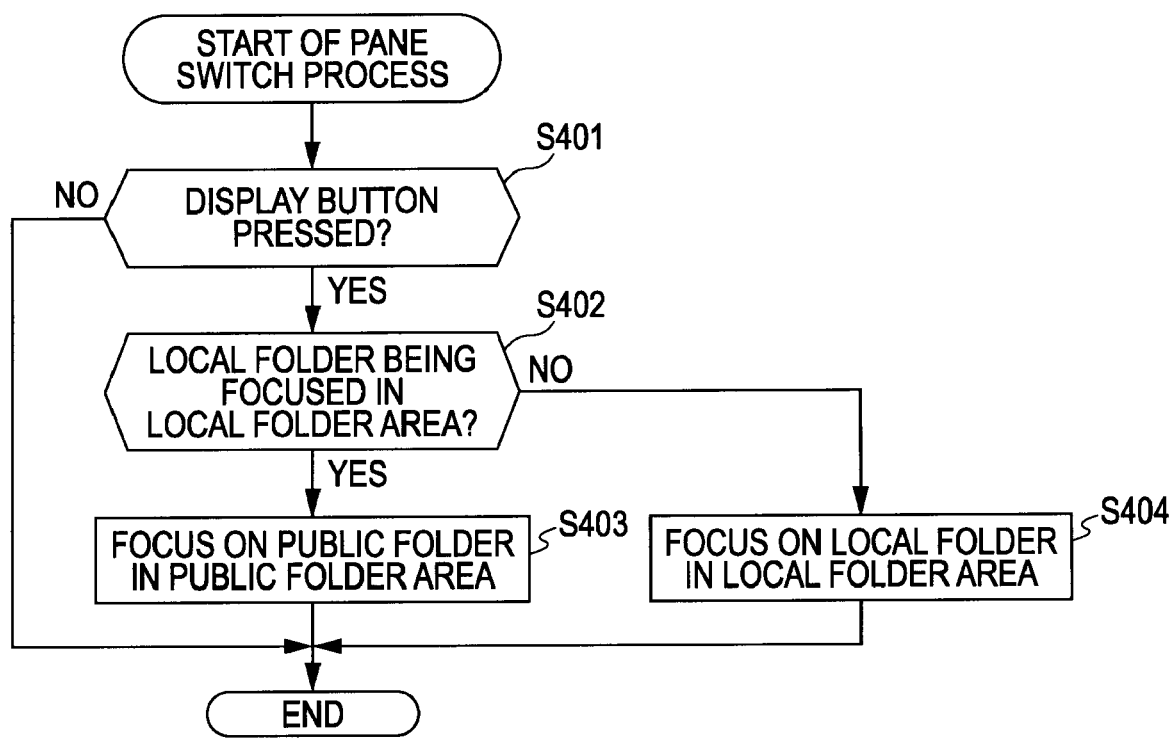
FIG. 53 is a flowchart illustrating a pane switch process.

FIG. 53 is a flowchart illustrating a pane switch process of the digital camera 1-1 as the client. In step S401, the direct switch 457 determines whether a display button in the operation unit 46 has been pressed. If it is determined in step S401 that the display button has been pressed, processing proceeds to step S402. The direct switch 457 determines whether the local folder in the local folder area 501 is focused or not. If it is determined in step S402 that the local folder in the display controller 401 is focused, processing proceeds to step S403. Since the current local folder is focused, the direct switch 457 focuses the public folder in the public folder area 503. Processing thus ends. The cursor 504 is shifted into the public folder area 503.

If it is determined in step S402 that the local folder in the local folder area 501 is not focused, processing proceeds to step S404. Since the public folder is currently focused, the direct switch 457 focuses the local folder in the local folder area 501. Processing thus ends. The cursor 504 is thus shifted into the local folder area 501.

If it is determined in step S401 that the display button has not been pressed, processing ends.

Figure 54A:
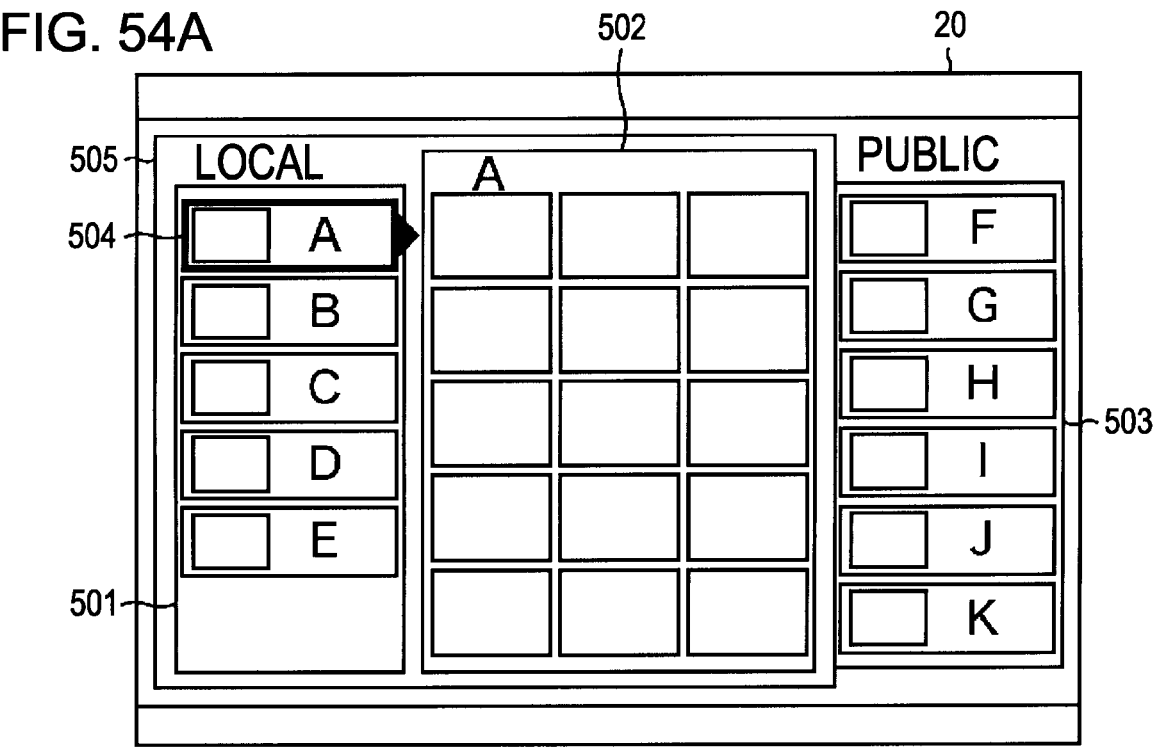
FIGS. 54A and 54B illustrate the LCD screen.
Figure 54B:
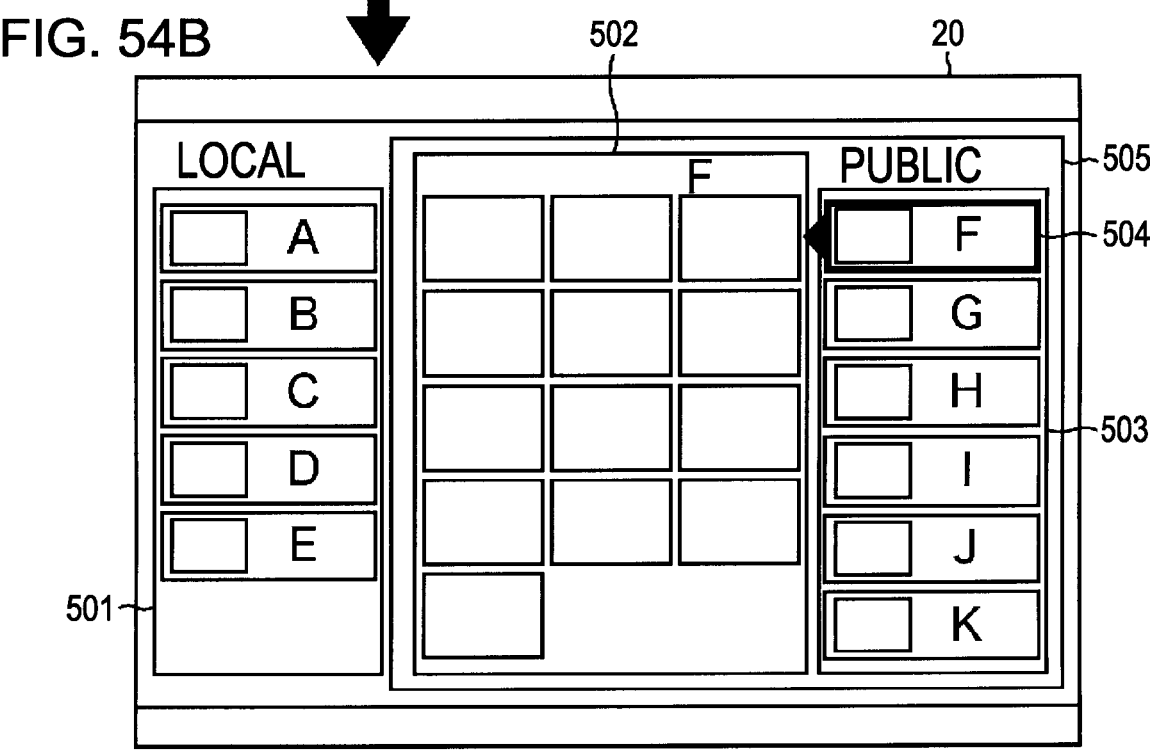

As shown in FIG. 54A, the cursor 504 might be displayed on the representative image in the local folder A in the local folder area 501 and the local folder A might be focused. If the display button is pressed, a public folder F displayed in the same horizontal alignment as the local folder A is focused. The cursor 504 is then shifted into the public folder area 503, and the representative image of the public folder F is then displayed.

Conversely, the cursor 504 might be displayed in the public folder F and the public folder F might be focused. If the display button is pressed, the local folder A displayed in the same horizontal alignment as the public folder F is focused. The cursor 504 is then shifted into the local folder area 501, and the representative image of the local folder A is displayed.

With a simple operation, focusing is switched between the local folder area 501 and the public folder area 503.

In the above discussion, the apparatus shares images with another partner apparatus. Alternatively, the apparatus may share images with a plurality of partner apparatuses.

Figure 55:
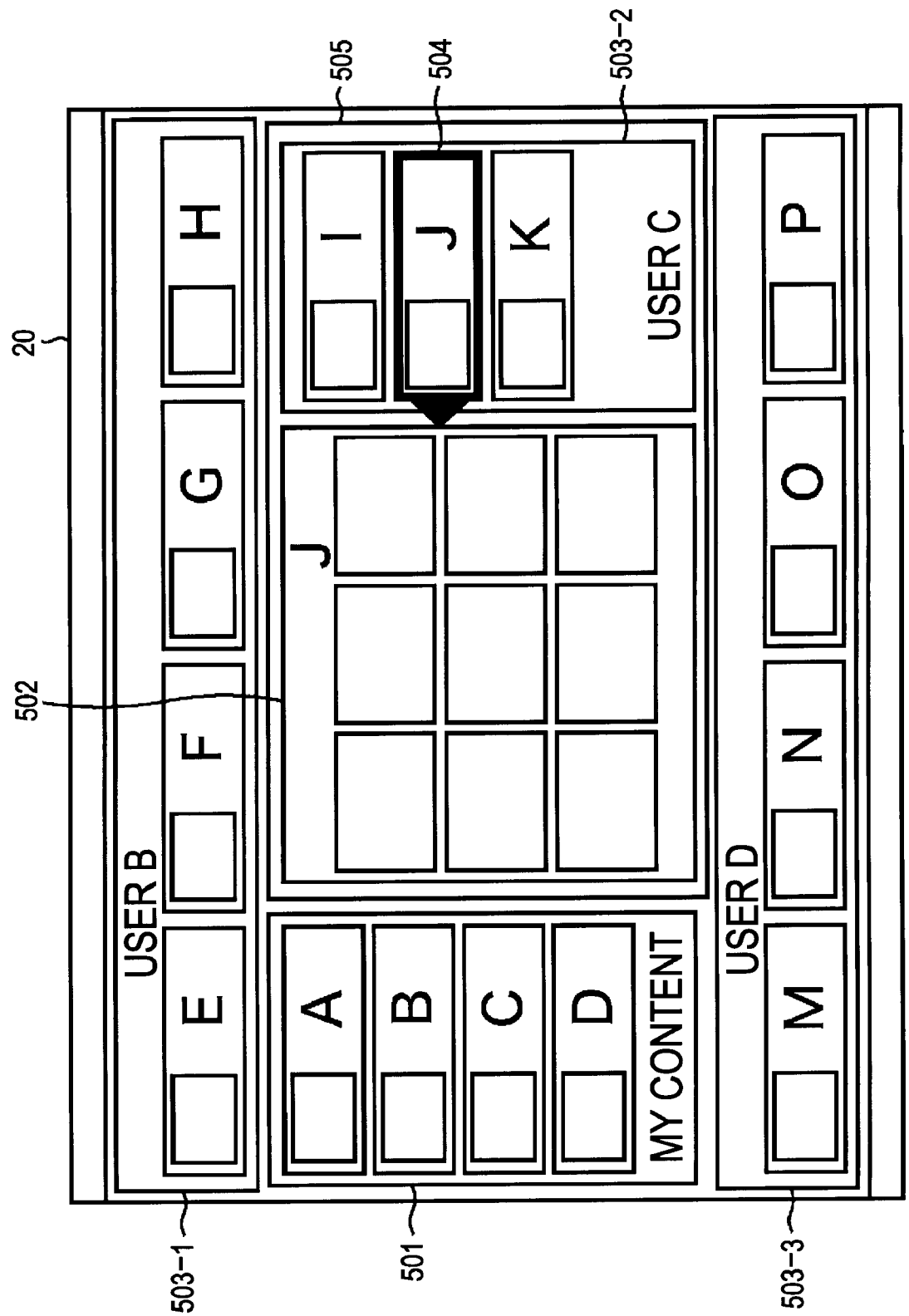
FIG. 55 illustrates the LCD screen.

FIG. 55 illustrates an example of the LCD 20 screen in which one apparatus shares images with three partner apparatuses.

As shown in FIG. 55, the LCD 20 screen includes the local folder area 501, the thumbnail list area 502, public folder areas 503-1 through 503-3, and the cursor 504.

Displayed in the public folder areas 503-1 through 503-4 are respectively a representative image of a public folder having content supplied by a digital camera 1 of a user B, a representative image of a public folder having content supplied by a digital camera 1 of a user C, and a representative image of a public folder having content supplied by a digital camera 1 of a user D.

The local folder area 501 of FIG. 55 displays any of the representative images of the local folders A through D.

For example, the public folder area 503-1 displays any of the representative images of public folder areas E through H. The public folder area 503-2 displays any of the representative images of public folder areas I through K. The public folder area 503-3 displays any of the representative images of public folder areas M through P.

As shown in FIG. 55, the public folder area 503-1 is displayed on the upper side of the LCD 20 screen. The public folder area 503-3 is displayed on the lower side of the LCD 20 screen.

As shown in FIG. 55, the local folder area 501 is displayed below the public folder area 503-1 and above the public folder area 503-3, on the left portion of the LCD 20 screen. The public folder area 503-2 is below the public folder area 503-1 and above the public folder area 503-3, on the right portion of the LCD 20 screen.

As shown in FIG. 55, the thumbnail list area 502 is horizontally interposed between the local folder area 501 and the public folder area 503-2 and vertically interposed between the public folder area 503-1 and the public folder area 503-3.

The thumbnail list area 502 displays the thumbnail images of the images of a focused public folder from among local folders A-D, E-K, and M-P.

The cursor 504 moves across the local folder area 501, the thumbnail list area 502, and the public folder areas 503-1 through 503-3 in response to an instruction from the user.

The user can handle the images available from own apparatus and the images provided by a plurality of partner apparatuses.

When the images are shared via the network, a desired image can be acquired from the partner. The displaying of the first representative image in the first folder on the first area of the display screen is controlled with the first content recorded on the recording medium belonging to the first folder. The displaying of the second representative image in the second folder on the second area of the display screen is controlled with the second content supplied via the network from the partner apparatus connected thereto and belonging to the second folder. The displaying of the thumbnail image of one of the first content and the second content on the third area of the display screen is controlled, with the first content and second content corresponding to one of the first folder and the second folder selected using one of the first representative image and the second representative image. Without the need for complex operations, an image supplied from a partner is checked and an image to be acquired is selected.

In the above discussion, the LCD 20 is used as the display device for displaying a variety of images such as thumbnail images thereon. The display device is not limited to the LCD, and may be one of an organic electro-luminescence (EL) display and a light-emitting diode (LED) display.

In the above discussion, the digital camera 1 photographs the subject and transmits the image of the subject. The present invention is not limited to the digital camera. Any apparatus is acceptable as long as the apparatus can photograph a subject and transmit an image of the subject. For example, the apparatus may be one of a digital video camera, a cellular phone, and a mobile personal computer.

The above-referenced series of process steps may be performed using hardware or software. If the process steps are performed using software, a program of the software may be installed from a recording medium onto a computer built in dedicated hardware or a general-purpose personal computer enabled to perform a variety of functions with a variety of programs installed thereon.

As shown in FIG. 4, a recording medium records the program installed and executed on the computer. The recording media include the recording medium 60 as a package medium, such as one of a magnetic disk (including a flexible disk), an optical disk (such as compact disk read-only memory (CD-ROM)), or digital versatile disk (DVD)), and a semiconductor memory. The recording media also include the flash ROM 83 or a hard disk (not shown), each permanently or temporarily storing the program. The storage of the program onto the program recording medium may be performed via a wired communication medium or a wireless communication medium using the communication I/F 49 such as an interface including a router or a modem, and a local area network, the Internet, or a digital broadcasting satellite.

The process steps describing the program stored on the recording medium may be performed in the time-series order sequence as previously stated. Alternatively, the process steps may be performed in parallel or separately.

In the context of this specification, the system refers to an entire system including at least one apparatus.

It should be understood by those skilled in the art that various modifications, combinations, sub-combinations and alterations may occur depending on design requirements and other factors insofar as they are within the scope of the appended claims or the equivalents thereof.

What is claimed is:

1. A display control apparatus comprising:

first display control means for controlling displaying a first representative image in a first folder on a first area of a display screen with first content recorded on a recording medium thereof belonging to the first folder;

second display control means for controlling displaying a second representative image in a second folder on a second area of the display screen with second content supplied from a partner apparatus connected thereto via a network and belonging to the second folder; and third display control means for controlling displaying, on a third area of the display screen, a thumbnail image of one of the first content and the second content corresponding to one of the first folder and the second folder selected using one of the first representative image and the second representative image, the first display control means, the second display control means, and the third display control means simultaneously displaying the first representative image in the first area, the second representative image in the second area, and the thumbnail image in the third area such that the third display control means displays the thumbnail image on the third area between the first area and the second area.

2. The display control apparatus according to claim 1, further comprising cursor display control means for controlling displaying a cursor indicating that one of the first folder, the second folder, the first content and the second content is selected wherein the cursor is displayed with respect to one of the first representative image, the second representative image and the thumbnail image.

3. The display control apparatus according to claim 2, wherein the cursor display control means controls displaying the cursor so that the cursor shifts from one area to another among the first area, the second area and the third area in order for the cursor to be displayed with respect to one of the first representative image, the second representative image and the thumbnail image.

4. The display control apparatus according to claim 1, further comprising outline display control means for controlling displaying an outline surrounding the first area and the third area having the thumbnail image of the first content displayed thereon when the first representative image is selected by the cursor and controlling displaying an outline surrounding the second area and the third area having the thumbnail image of the second content displayed thereon when the second representative image is selected by the cursor.

5. The display control apparatus according to claim 1, further comprising content display control means for controlling displaying one of the first content and the second content with the thumbnail image thereof selected by the cursor.

6. A display control method of a display control apparatus, comprising:
controlling displaying a first representative image in a first folder on a first area of a display screen with first content recorded on a recording medium thereof belonging to the first folder;
controlling displaying a second representative image in a second folder on a second area of the display screen with second content supplied from a partner apparatus connected thereto via a network and belonging to the second folder; and
controlling displaying, on a third area of the display screen, a thumbnail image of one of the first content and the second content corresponding to one of the first folder and the second folder selected using one of the first representative image and the second representative image; and
simultaneously displaying the first representative image in the first area, the second representative image in the second area, and the thumbnail image in the third area such that the thumbnail image is displayed on the third area between the first area and the second area.

7. A display control apparatus comprising:
a first display control unit controlling displaying a first representative image in a first folder on a first area of a display screen with first content recorded on a recording medium thereof belonging to the first folder;
a second display control unit controlling displaying a second representative image in a second folder on a second area of the display screen with second content supplied from a partner apparatus connected thereto via a network and belonging to the second folder; and
a third display control unit controlling displaying, on a third area of the display screen, a thumbnail image of one of the first content and the second content corresponding to one of the first folder and the second folder selected using one of the first representative image and the second representative image,
the first display control unit, the second display control unit, and the third display control unit simultaneously displaying the first representative image in the first area, the second representative image in the second area, and the thumbnail image in the third area such that the third display control means displays the thumbnail image on the third area between the first area and the second area.

8. The display control apparatus according to claim 7, further comprising a cursor display control unit controlling displaying a cursor indicating that one of the first folder, the second folder, the first content and the second content is selected wherein the cursor is displayed with respect to one of the first representative image, the second representative image and the thumbnail image.

9. The display control apparatus according to claim 8, wherein the cursor display control unit controls displaying the cursor so that the cursor shifts from one area to another among the first area, the second area and the third area in order for the cursor to be displayed with respect to one of the first representative image, the second representative image and the thumbnail image.

10. The display control apparatus according to claim 7, further comprising an outline display control unit controlling displaying an outline surrounding the first area and the third area having the thumbnail image of the first content displayed thereon when the first representative image is selected by the cursor and controlling displaying an outline surrounding the second area and the third area having the thumbnail image of the second content displayed thereon when the second representative image is selected by the cursor.

11. The display control apparatus according to claim 7, further comprising a content display control unit controlling displaying one of the first content and the second content with the thumbnail image thereof selected by the cursor.

* * * * *